United States Patent
Yanagi et al.

(10) Patent No.: US 8,174,713 B2
(45) Date of Patent: May 8, 2012

(54) IMAGE PROCESSING SYSTEM WITH AN INFORMATION TRANSMITTING SYSTEM, IMAGE PROCESSING DEVICE AND DATA PROCESSING PROGRAM THEREFOR

(75) Inventors: Satoru Yanagi, Nagoya (JP); Kazuma Aoki, Kasugai (JP); Masatoshi Kokubo, Ama-gun (JP); Naoki Otsuka, Konan (JP); Makoto Matsuda, Aisai (JP); Masafumi Miyazawa, Nagoya (JP); Kiyotaka Ohara, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1116 days.

(21) Appl. No.: 11/267,596

(22) Filed: Nov. 7, 2005

(65) Prior Publication Data

US 2006/0114498 A1 Jun. 1, 2006

(51) Int. Cl.
  *G06F 3/12* (2006.01)
  *G06F 15/00* (2006.01)
(52) U.S. Cl. ........................................ 358/1.15; 358/1.9
(58) Field of Classification Search .......................... None
  See application file for complete search history.

(56) References Cited

U.S. PATENT DOCUMENTS

| | | | |
|---|---|---|---|
| 5,175,632 A | 12/1992 | Hayashi et al. | |
| 5,909,602 A | 6/1999 | Nakai et al. | |
| 5,946,457 A * | 8/1999 | Nakai et al. | 358/1.13 |
| 6,437,869 B1 * | 8/2002 | Matoba | 358/1.13 |
| 6,701,011 B1 | 3/2004 | Nakajima | |
| 7,003,798 B2 | 2/2006 | Yamakawa et al. | |
| 2001/0023444 A1 | 9/2001 | Torii | |
| 2002/0196452 A1 * | 12/2002 | Komiya | 358/1.1 |
| 2003/0086720 A1 | 5/2003 | Song | |
| 2003/0187965 A1 * | 10/2003 | Enomoto et al. | 709/221 |
| 2004/0151132 A1 | 8/2004 | Terashima et al. | |
| 2004/0160630 A1 | 8/2004 | Iriyama et al. | |
| 2004/0184066 A1 | 9/2004 | Urabe | |
| 2004/0218207 A1 * | 11/2004 | Biundo et al. | 358/1.15 |

(Continued)

FOREIGN PATENT DOCUMENTS

EP 0 782 326 7/1997

(Continued)

OTHER PUBLICATIONS

European Search Report based on European Patent Application 05256879.7.

(Continued)

*Primary Examiner* — King Poon
*Assistant Examiner* — Ming Hon
(74) *Attorney, Agent, or Firm* — Banner & Witcoff, Ltd.

(57) ABSTRACT

In a communication system having a client and a server capable of communicating with each other via a network, the server can transmit a command to the client in response to a command request transmitted from the client to the server. The server may include a replying unit that transmits replying data in response to the command received from the client in such a manner that (a) if there is a command to be transmitted to the client, replying data including the command is transmitted to the client, and (b) if there is not a command to be transmitted to the client, replying data, which does not include a command is transmitted to the client. Further, the replying unit may transmit the replying data without a command to the client when a no-command status lasts a predetermined standby period after receipt of the command request.

15 Claims, 41 Drawing Sheets

U.S. PATENT DOCUMENTS

2005/0257258 A1    11/2005    Kinoshita et al.

FOREIGN PATENT DOCUMENTS

| | | |
|---|---|---|
| JO | 2003-018235 | 1/2003 |
| JP | 9-238215 | 9/1997 |
| JP | 3000747 B2 | 1/2000 |
| JP | 3161031 B2 | 4/2001 |
| JP | 2001282656 | 10/2001 |
| JP | 2002-101150 | 4/2002 |
| JP | 2002-328886 | 11/2002 |
| JP | 2002-328887 | 11/2002 |
| JP | 2003-018181 | 1/2003 |
| JP | 3441038 B2 | 8/2003 |
| JP | 2003-288336 | 10/2003 |
| JP | 2004-227121 | 8/2004 |
| JP | 2004-228686 | 8/2004 |
| JP | 2004-289313 | 10/2004 |
| JP | 2005-327137 | 11/2005 |
| WO | WO 02/08860 | 1/2002 |

OTHER PUBLICATIONS

Japanese Office Action dated May 7, 2008 for Application No. 2004-322935.

Japanese Office Action dated May 7, 2008 for Application No. 2004-322934.

Notification of Reasons of Rejection dated Sep. 30, 2008; Japanese Application No. 2004-322934.

Examination Report issued Jun. 17, 2011 in European counterpart application No. 05256879.7.

Office Action issued Oct. 7, 2008 in corresponding Japanese Application No. JP 2004-322935 and English translation thereof.

* cited by examiner

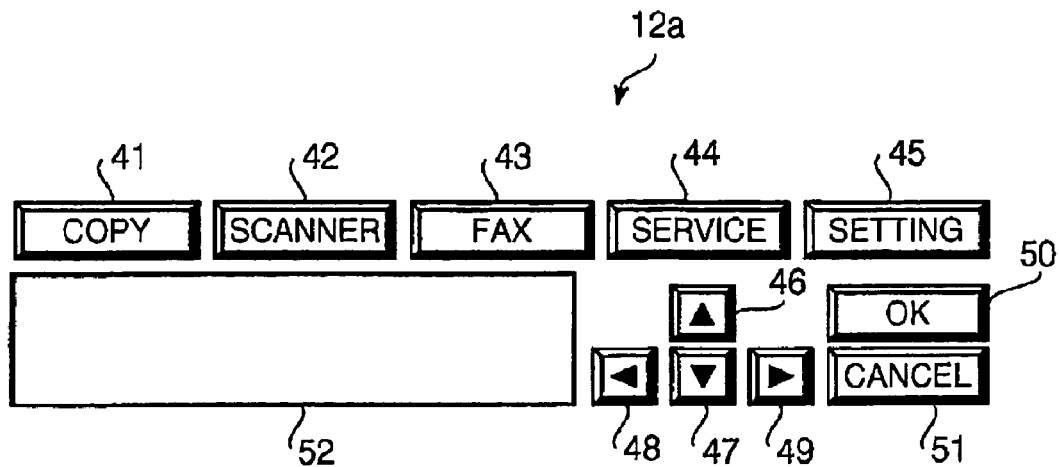

FIG. 2

```
<ID>11111110</ID>
<Title>DIRECTORY SERVICE</Title>
<Type>MENU</Type>
<Num_Link>3</Num_Link>
<Link>
  <Link_Title>DATA STORAGE SERVICE</Link_Title>
  <Link_Location>11111111</Link_Location>
</Link>
<Link>
  <Link_Title>PRINTING SERVICE </Link_Title>
  <Link_Location>11111112</Link_Location>
</Link>
<Link>
  <Link_Title>COPY APPLICATION SERVICES</Link_Title>
  <Link_Location>11111113</Link_Location>
</Link>
```

FIG. 3

```
<ID>11111113</ID>
<Title>COPY APPLICATION SERVICE</Title>
<Type>MENU</Type>
<Num_Link>4</Num_Link>
<Link>
  <Link_Title>COPY WITH WATERMARK</Link_Title>
    <Link_Location>http://suk.example.co.jp/cgi_bin/suktop</Link_Location>
</Link>
<Link>
  <Link_Title>TRANSLATION COPY </Link_Title>
    <Link_Location>http://hon.example.co.jp/cgi_bin/top</Link_Location>
</Link>
<Link>
  <Link_Title>READ ALOUD</Link_Title>
    <Link_Location>http://example.yomiage.com/cgi_bin/yomi</Link_Location>
</Link>
<Link>
  <Link_Title>VOICE-TEXT CONVERSION</Link_Title>
    <Link_Location>http://ototeki.com/cgi_bin/oo</Link_Location>
</Link>
```

FIG. 4

```
<ID>11111110</ID>
<Title>Translation Copy</Title>
<Type>FORM</Type>
<Action>
http://hon.example.co.jp/cgi_bin/service</Action>
<Num_Form_Elem>4</Num_Form_Elem>
<Form_Elem>
  <Form_Type>Select</Form_Type>
  <Form_Data>
    <Disp_Name>Language Selection</Disp_Name>
    <Value_Name>lang</Value_Name>
    <Multi_Select>0</Multi_Select>
    <Num_Option>2</Num_Option>
    <Option>
      <Disp_Select>English → Japanese</Disp_Select>
      <Disp_Value>en_ja</Disp_Value>
      <Default_Select>1</Disp_Select>
    </Option>
    <Option>
      <Disp_Select>Japanese → English</Disp_Select>
      <Disp_Value>ja_en</Disp_Value>
      <Default_Select>0</Disp_Select>
    </Option>
    </Disp_Name>
  </Form_Data>
</Form_Elem>
(Continued on Fig.7)
```

FIG. 6

```
(Continued from Fig.6)
<Form_Elem>
  <Form_Type>Select</Form_Type>
  <Form_Data>
    <Disp_Name>Scanner Setting</Disp_Name>
    <Value_Name>scan_res</Value_Name>
    <Multi_Select>0</Multi_Select>
    <Num_Option>2</Num_Option>
    <Option>
      <Disp_Select>Normal Character</Disp_Select>
      <Disp_Value>300</Disp_Value>
      <Default_Select>1</Disp_Select>
    </Option>
    <Option>
      <Disp_Select>Fine Character</Disp_Select>
      <Disp_Value>600</Disp_Value>
      <Default_Select>0</Disp_Select>
    </Option>
  </Form_Data>
</Form_Elem>
(Continued on Fig.8)
```

FIG. 7

(Continued from Fig.7)
```
<Form_Elem>
  <Form_Type>Select</Form_Type>
  <Form_Data>
    <Disp_Name>Print Setting</Disp_Name>
    <Value_Name>print_res</Value_Name>
    <Multi_Select>0</Multi_Select>
    <Num_Option>3</Num_Option>
    <Option>
      <Disp_Select>Print Speed Priority</Disp_Select>
      <Disp_Value>200</Disp_Value>
      <Default_Select>0</Disp_Select>
    </Option>
    <Option>
      <Disp_Select>Normal</Disp_Select>
      <Disp_Value>300</Disp_Value>
      <Default_Select>1</Disp_Select>
    </Option>
    <Option>
      <Disp_Select>High-resolution</Disp_Select>
      <Disp_Value>600</Disp_Value>
      <Default_Select>0</Disp_Select>
    </Option>
  </Form_Data>
</Form_Elem>
<Form_Elem>
  <Form_Type>Text</Form_Type>
  <Form_Data>
    <Disp_Name>Comment</Disp_Name>
    <Value_Name>comment<Value_Name>
    <Max_Byte>100</Max_Byte>
    <Default_String></Default_String>
  </Form_Data>
</Form_Elem>
```

FIG. 8

IMAGE PROCESSING SYSTEM WITH AN INFORMATION TRANSMITTING SYSTEM, IMAGE PROCESSING DEVICE AND DATA PROCESSING PROGRAM THEREFOR

INCORPORATION BY REFERENCE

This application claims priority from Japanese Patent Applications No. 2004-322934 and No. 2004-322935, both filed on Nov. 5, 2004, the entire subject matters of which are incorporated herein by reference.

BACKGROUND OF THE INVENTION

1. Technical Field

The present invention relates to a data processing system having a server and terminal devices interconnected through a network.

2. Description of Related Art

Conventionally, a system configured such that a client (e.g., a digital copier, a scanner, a multi function peripheral) connected to a LAN (Local Area Network) and a host computer (i.e., a server) are interconnected through a global network (e.g., the Internet). Particularly, there is known a system, wherein the host computer achieves a function that the client does not have instead of the client. An example of such a system is disclosed in Japanese Patent Provisional Publication No. HEI 9-238215.

In a general communication system configured as above, with respect to security, an access from (or through) the Internet to the client side is restricted in order to prevent inappropriate access to the client. For example, the above system is configured such that the LAN and the Internet are connected through a broadband router, from among pieces of data transmitted from the server to the client, ones other than responses to requests transmitted from the client to the server are shielded in accordance with a firewall function of the broadband router. That is, if a user of the server intends to transmit commands or data to the client, the communication may be prevented due to the firewall function of the broadband router.

Therefore, in the above-configured communication system, a command request should be transmitted from the client to the server, and then, as a response to the command request, the server transmits the command/data to the client.

According to such a configuration, however, the server is required to transmit some response to the client, in response to the command request from the client, even if there is no command/data to be transmitted from the server to the client. For example, if a proxy server is provided between the client and the server, the server should reply to the request by the client. If no response is issued by the server within a predetermined timeout period, it is determined that a communication error has occurred even if the server does not have any problem.

Further, if there is a command to be transmitted from the server to the client, it cannot be transmitted until the server receives the command request from the client. Therefore, in comparison with a case where the server can immediately transmit a command, a waiting time period for which the server waits for receipt of the command request from the client should be consumed unnecessarily. Such a waiting period can be shortened by increasing transmission frequency of the command request from the client to the server. However, to increase the transmission frequency results in increase of network traffic, and thus, the frequency cannot be increased unlimitedly.

Alternatively, a firewall setting of the router may be changed in the LAN side so that the command/data can be received through the Internet. However, to change the setting of the router is relatively troublesome, and more importantly, requires the user to change security policy, which may cause a problem.

SUMMARY

Aspects of the invention provide a network system in which a waiting period of the client for receipt of command/data transmitted from the server is reduced.

Further aspects of the invention provide a network system in which command/data can be exchanged smoothly without modifying the setting of a network relaying device (e.g., the broadband router) connecting the LAN and the global network (e.g., the Internet).

BRIEF DESCRIPTION OF THE ACCOMPANYING DRAWINGS

FIG. 2 shows an operation panel of an MFP;

FIG. 3 shows a data structure of top of service definition information according to aspects of the invention.

FIG. 4 shows data structure of service definition information of a copy service according to aspects of the invention.

FIGS. 6-8 show data structure of service I/F information corresponding to a translation copy service according to aspects of the invention.

DETAILED DESCRIPTION

General Overview

Figure 1:
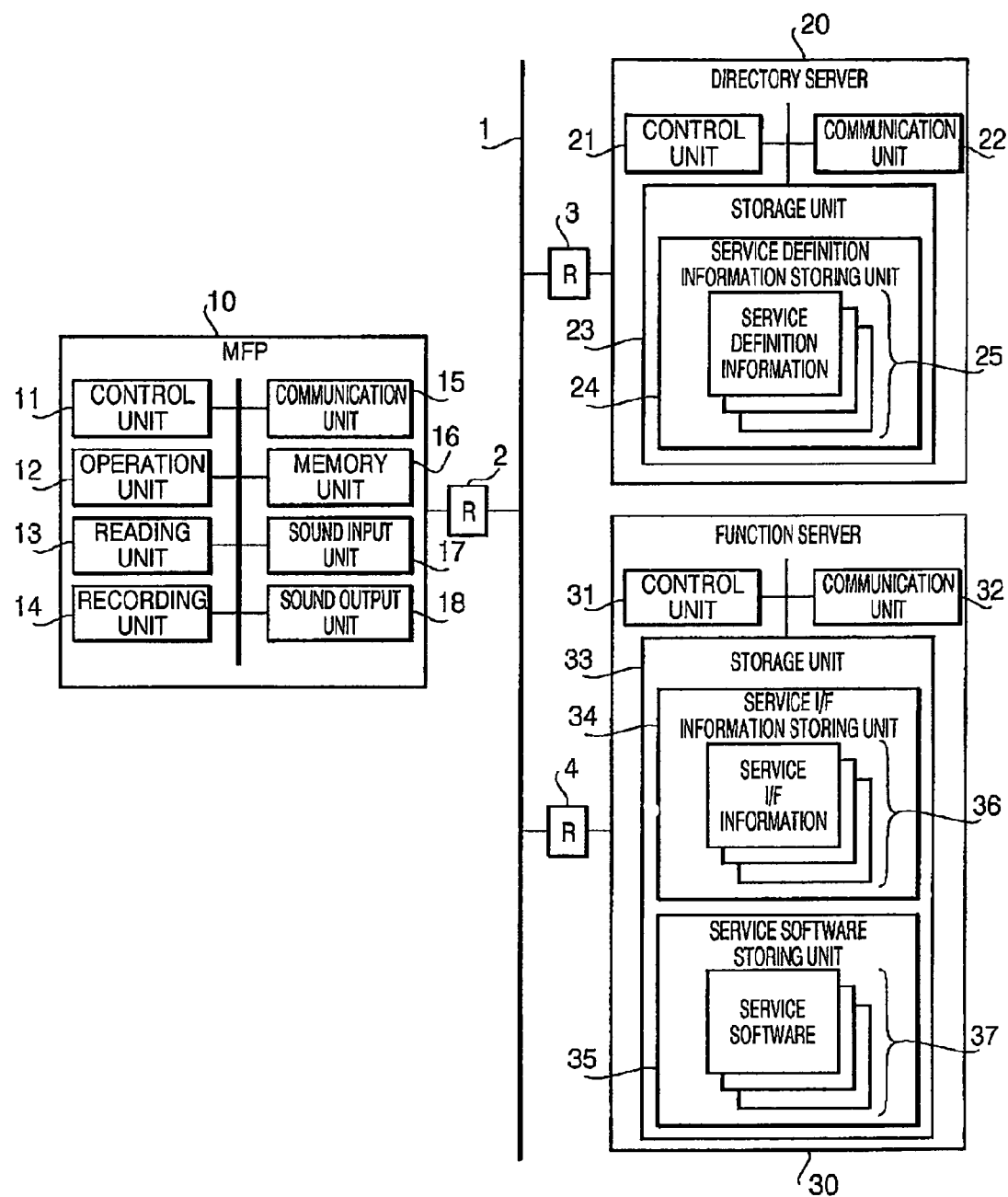
FIG. 1 is a block diagram showing a configuration of the image processing system according to aspects of the invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

According to aspects of the invention, there is provided a communication system having a client and a server capable of communicating with each other via a network, the server being configured to transmit a command to the client in response to a command request transmitted from the client to the server. The server may include a replying unit that transmits replying data in response to the command received from the client in such a manner that (a) if there is a command to be transmitted to the client, replying data including the command is transmitted to the client, and (b) if there is not a command to be transmitted to the client, replying data that does not include a command is transmitted to the client. Further, the replying unit may transmit the replying data without a command to the client when a status that there is no command to be transmitted to the client lasts a predetermined standby period after receipt of the command request.

According to the above configuration, the communication error on the network can be prevented, and further, a time period for awaiting the command transmitted from the server to the client can be shortened.

When a communication is performed through the network, the communication from the network to the client may sometimes be restricted. Therefore, according to the communication system in accordance with aspects of the invention, as a response to the command request by the client, when a command exists, it is transmitted to the client, while there is no command to be transmitted, reply data indicative of there is not command to be transmitted is transmitted to the client if the no-command state has been kept for a predetermined period since the receipt of the command request. Thus, if there is no command when the request is received, the server does not send the reply immediately, but waits for elapse of a predetermined standby period.

Therefore, if the command is generated during the standby period, the server can transmit a reply including the generated command. Therefore, according to such a communication system, the waiting period during which the client waits for receipt of the command from the server can be reduced without increasing the traffic of the network. Further, if the command is not generated during the standby period, the reply data indicating the no-command status is transmitted. Therefore, the communication error can be avoided.

If there is a command to be transmitted to the client, the replying unit transmits the replying data including the command immediately in response to the command request received from the client. That is, if a command is generated during the standby period, the command may be transmitted to the client immediately. With such a configuration, the waiting period of the client can be shortened effectively. In particular, the effect is significant when the standby period is longer. It should be noted that, if the standby period is too long, however, it is determined that the communication error occurs. Therefore, the standby period may be set to sufficiently long but not too long so that the judgment of the communication error can be avoided.

If the client receives the replying data that does not include the command in response to the command request, the client may retransmit the command request to the server.

The standby period may be determined based on a predetermined timeout period. The predetermined timeout period may be defined such that, if no reply to the command request by the client is made by the server within the predetermined timeout period, it is determined that a communication error has occurred.

According to the above communication system, sine the standby period is set based on the timeout period, the waiting time in which the client waits for receipt of a command from the server can be reduced effectively.

In a particular case, the standby period may be shorter than the predetermined timeout period.

The communication system may further include a standby period setting unit that sets a value of the predetermined standby period.

Further, the standby period setting unit may be provided to the client, and the replying unit may use the value set by the standby period setting unit as the value of the predetermined standby period.

In the network, it is general that the client is configured to judge whether the communication error has occurred when there is no reply from the server in response to the request by the client. Therefore, according to the above configuration, when, for example, the server communicates with a plurality of clients, the standby period may be set to appropriate values for respective clients.

The standby period setting unit may automatically set the value of the predetermined standby period based on a period from transmission of the command request to the server to detection of the communication error as the predetermined timeout period has elapsed.

According to the above configuration, even if the client does not know the timeout period (for example, the timeout period is set at a location the client does not know: like a proxy server), the standby period can be set to an appropriate value.

The standby period setting unit may set the value of the predetermined standby period in accordance with an input value by an external inputting operation.

According to such a configuration, when the timeout period is known at the client side (i.e., the user of the client know the timeout period), the timeout period can be set to an appropriate value.

The communication system may further include a communication investigating unit configured to determine that a communication error has occurred if the reply from the server in response to the command request by the client has not been made after elapse of the predetermined timeout period, the predetermined standby period being set in accordance with the predetermined timeout period.

As the investigating unit, a proxy server, a router having a proxy function, a configuration such that a part of the server has a proxy function, etc. It should be noted that the function need not be limited to the proxy function, and any device having a similar function can be used as the investigating unit.

In the meantime, the time period from the transmission of the command by the client to receipt of the reply data from the server varies depending on the congestion degree of the network. That is, the more the congestion in the network is, the longer the period is. Therefore, if the standby period is fixed to a predetermined value, the communication error may occur depending on the congestion degree.

In view of the above, the communication system may further include a communication status detecting unit configured to detect congestion of the network, the replying unit adjusting the predetermined standby period in accordance with the congestion of the network detected by the communication status detecting unit.

With this configuration, the standby period can be adjusted to an optimum period corresponding to the congestion degree of the network.

The communication status detecting unit may be provided to the client, or to the server.

According to aspects of the invention, there is provided a client of a communication system described above.

According to further aspects, there is provided a server of a communication system described above.

According to aspects of the invention, there is also provided a computer program product comprising computer readable instructions that cause a computer to function as a client of a communication system described above.

According to further aspects of the invention, there is provided a computer program product comprising computer readable instructions that cause a computer to function as a server of a communication system described above.

According to aspects of the invention, there is provided an image processing system, which is provided with an image processing device having at least one of (a) an image reading unit configured to read an image and generate image data, and (b) an image forming unit that forms an image represented by the image data, and a service providing device configured to execute a service regarding at least one of (a) image data generated by the image reading unit, and (b) image data representing an image to be formed by the image forming unit. The image processing device and the service providing device may be connected to a network so as to communicate with each other, the image processing device and the service providing device may exchange information with each other as a predetermined message is attached to request information transmitted from the image processing device to the service providing device, and to response information transmitted from the service providing device to the image processing device as a response to the request information.

Here, the "image processing device" may include an image forming unit (printer), an image reading unit (scanner), a facsimile unit, a copying unit, and an MFP (Multi Function Peripheral) having some or all of the above functions. Further, "the service regarding the image data generated by the image reading unit" may include a various image data processing (e.g., enlargement/reduction, color inversion, translation, etc.), a processing for converting text included in the image into voice message, storing the image data in a storage (e.g., a server) which is provided separately from the image processing device, and the like. Further, "the service regarding the image data representing the image to be formed by the image forming unit" may include the image data processing (e.g., enlargement/reduction, color inversion, translation, etc.), conversion of the voice message to a text image, formation of the image data collected on the network, and the like.

The service providing device may be configured as a server on the network. In such a case, the service providing device may be composed of a single server, or a plurality of servers.

The "request information" may include an HTTP request in accordance with HTTP 1.1 (HTTP: Hyper Text Transfer Protocol) for transmitting/receiving data between the image processing device and the service providing device. Further, the "response information" may include HTTP response in accordance with HTTP 1.1. According to aspects of the invention, with messages associating with the request information and response information, commands and replies to the respective commands are exchanged.

The image processing device may include a command requesting unit that transmits control command request information in association with the request information, the control command request information being for requesting the service providing device to transmit a control command that is a control instruction to the image processing device when the service is executed, and a command executing unit that executes a predetermined process in accordance with the control command information. Further, the service providing device may include a service executing unit that executes the service, a command transmitting unit that transmits the control command in association with the response information as a response to the request information transmitted from the command requesting unit. The command executing unit may execute a predetermined process in accordance with the control command information transmitted in association with the response information transmitted from the command transmitting unit.

In the image processing system described above, the control command for controlling the image processing device is transmitted from the service providing device as a response to the request transmitted from the image processing device. With this configuration, even if a global network such as the Internet is used, the service can be executed without requiring the user to change the setting of the network relaying devices having security function.

According to aspects of the invention, the image processing device may be connected to the network via security system that is configured such that, among pieces of data transmitted from the network to the image processing device, the response information which is a response to the request information transmitted from the image processing device to the network is allowed to be transmitted, while the other data is shielded.

It should be noted that the image processing system may include a plurality of image processing devices. In such a case, services requested for by a plurality of image processing devices may be executed simultaneously.

According to aspects of the invention, the image processing device and the service providing device may execute therebetween a session that is a series of communicating procedures from the start of the service to the end thereof. The command requesting unit of the image processing device may transmit at least one of (a) a session ID that is identification information for identifying a the session, and (b) a job ID that is identification information for identifying a job executed by the image processing device in the session, in association with the predetermined request information to be transmitted in the session to the service providing device. Further, the service executing device provided to the service providing device may identify the session based on at least one of the session ID transmitted in association with the request information as transmitted and the job ID transmitted in association with the request information as transmitted, the service executing unit executing a predetermined process corresponding to the identified one of the session and job in accordance with the control command request information associated with the request information.

According to the thus configured image processing system, the service providing device identifies a plurality of sessions based on the session IDs, respectively. Therefore, if a plurality of image processing devices access one service of the service providing device, and a plurality of sessions are executed simultaneously, a plurality of sessions will not be mixed up, and the services in the respective sessions can be executed. Further, when a plurality of jobs that are executed by the image processing device during the session, since the service providing device identifies each job in the session based at least on the job ID, the plurality of jobs will not be mixed up, and respective processes can be executed accurately.

The service executing unit may generate the session ID corresponding to the service and assigns the session ID to the image processing device.

That is, by unifying management of session ID with the service provided device, without a particular process for preventing duplication of the session IDs, unique session IDs can be generated. Therefore, the session IDs can be assigned to the image processing devices promptly. It may be considered to generate the session IDs by the image processing devices. However, in such a case, in each session, it is necessary that whether the generated session IDs are unique is checked by the service provided device. Therefore, in such a case, the process is very complicated. In order to avoid such a complicated process, according to aspects of the invention, the session IDs are generated by the service providing device, and, as described above, as the service providing device identifies each session based on the session IDs, a plurality of sessions will not be mixed up and the services corresponding to the sessions can be executed without fail.

The command transmitting unit may generate the job ID and assigns the job ID to the image processing device by transmitting the job ID to the image processing device.

By unifying the management of the job IDs on the service providing device side, unique job IDs can be generated without executing a particular process for preventing duplication of the job IDs. Therefore, the job IDs can be assigned to the image processing devices quickly. It may be considered to generate the job IDs on the image processing devices. However, in such a case, it becomes necessary to ensure that the generated job IDs are unique by accessing the service providing device, which complicates the entire process. In order to avoid such a complicated process, according to aspects of the invention, the job IDs are generated by the service providing device. Further, as described above, since the service providing device identifies the job in the session based on the session ID and job ID, a plurality of jobs will not be mixed up, and respective processes can be executed without fail.

The command transmitting unit may transmit the response information associating the control command information for finishing the job to the image processing device together with the job ID, and the command executing unit may finish the job corresponding to the job ID transmitted to the image processing device.

According to the above configuration, even if a plurality of jobs are being executed, a job can be identified based on the job ID that is transmitted together with the control command information for terminating the job, and thus, the target job can be terminated without fail.

When request information associating the control command information is to be transmitted to the service providing device, whether the request information is to be transmitted is determined based on the status of the image processing device, and based on the decision, the request information may be transmitted together with the control command information.

Thus, the image processing device may include a transmission judging unit configured to judge whether the control command request information is to be transmitted to the service providing device based on a status of the image processing device, and the command requesting unit may transmit the control command request information to the service providing device when the transmission judging unit determines that the image processing device is in a status where the request information associated with the control command request information is to be transmitted.

Specifically, for example, it is judged that whether a device (e.g., a printer, a scanner and the like, provided to the image processing device) that operates in accordance with the control command information transmitted in association with the response information transmitted from the service providing device is available. If the device is available, the process transmits the request information with the control command request information to the service providing device.

When the device is occupied by another job and is in a busy state (i.e., unavailable), and in spite of such a status, if the request information associating the command request information is transmitted, and has newly received the control command information, it is necessary to temporarily store the control command information in a memory or the like. However, the capacity of the memory is limited, if data having a relatively large size (e.g., image data) together with the control command information and the size of the image data exceeds the capacity of the memory, the reception error may occur on the image processing device side.

According to aspects of the image invention, only when the peripheral devices of the image processing device are available, the request information with the control command request information is transmitted, the limited capacity of memory resources can be saved, and the above-described reception error can be avoided.

The image processing device may be provided with at least one of (a) a sound input unit that receives sound and generates sound data representing the received sound, and (b) a sound output unit configured to output sound represented by the sound data, and the service providing device may execute a service related to at least one of the sound data generated by the sound input unit and sound data transmitted to the sound output unit in response to the request by the image processing device.

Further, the control command information associating with the response information transmitted by the command transmitting unit provided to the service providing device includes a command for controlling one of the sound input unit and the sound output unit provided to the image processing device.

Further, the control command information associating with the response information transmitted by the command transmitting unit may include a command for controlling one of the image reading unit and the image forming unit provided the image processing device.

The image processing device may include an operation unit configured to notify a user of information and to accept an operation of the image processing device by the user, and the control command information associating with the response information transmitted by the command transmitting unit includes a command for controlling the operation unit.

It should be noted that "notify" implies a process for allowing the user of the image processing device to recognize contents of the information regarding the service. Thus, it need not be limited to a visible notification (indication) for the user, and audible notification (indication) should also be included. Further, the "accept an operation" implies not only an actual operation of keys or the like, but also any other operable means including a voice input.

According to aspects of the invention, there is provided an image processing device for an image processing system. The image processing device has at least one of (a) an image reading unit configured to read an image and generate image data, and (b) an image forming unit that forms an image represented by the image data. The image processing system may further include a service providing device configured to execute a service regarding at least one of (a) image data generated by the image reading unit, and (b) image data representing an image to be formed by the image forming unit, the image processing device and the service providing device being connected to a network so as to communicate with each other, the image processing device and the service providing device exchanging information with each other as a predetermined message is attached to request information transmitted from the image processing device to the service providing device, and to response information transmitted from the service providing device to the image processing device as a response to the request information. The image processing device may include a command requesting unit that transmits control command request information in association with the request information, the control command request information being for requesting the service providing device to transmit a control command that is a control instruction to the image processing device when the service is executed, and a command executing unit that executes a predetermined process in accordance with the control command information.

The service providing device may include a service executing unit that executes the service, a command transmitting unit that transmits the control command in association with the response information as a response to the request information transmitted from the command requesting unit. The command executing unit may execute a predetermined process in accordance with the control command information transmitted in association with the response information transmitted from the command transmitting unit.

Aspects of the invention may provided a server functioning as a service providing device for an image processing device.

the image processing system may include an image processing device having at least one of (a) an image reading unit configured to read an image and generate image data, and (b) an image forming unit that forms an image represented by the image data. The service providing device may be configured to execute a service regarding at least one of (a) image data generated by the image reading unit, and (b) image data representing an image to be formed by the image forming unit. The image processing device and the service providing device are connected to a network so as to communicate with each other. The image processing device and the service providing device are configured to exchange information with each other as a predetermined message is attached to request information transmitted from the image processing device to the service providing device, and to response information transmitted from the service providing device to the image processing device as a response to the request information. The image processing device may include a command requesting unit that transmits control command request information in association with the request information, the control command request information being for requesting the service providing device to transmit a control command which is a control instruction to the image processing device when the service is executed, and a command executing unit that executes a predetermined process in accordance with the control command information.

Further, the service providing unit may include a service executing unit that executes the service, and a command transmitting unit that transmits the control command in association with the response information as a response to the request information transmitted from the command requesting unit. The command executing unit may execute a predetermined process in accordance with the control command information transmitted in association with the response information transmitted from the command transmitting unit.

According to further aspects of the invention, there is provided a program product comprising computer readable instructions which cause a computer to function as an image processing device for an image processing system described above.

Further, according to aspects of the invention, there is provided a program product comprising computer readable instructions which cause a computer to function as a server having a function of a service providing device for an image processing system described above.

According to further aspects of the invention, there is provided a program product comprising computer readable instructions which cause a computer to function as a service executing unit and a command transmitting unit for an image processing system.

The image processing system may include the image processing device having at least one of (a) an image reading unit configured to read an image and generate image data, and (b) an image forming unit that forms an image represented by the image data, The image processing system may further include a service providing device configured to execute a service regarding at least one of (a) image data generated by the image reading unit, and (b) image data representing an image to be formed by the image forming unit. The image processing device and the service providing device may be connected to a network so as to communicate with each other, and the image processing device and the service providing device may exchange information with each other as a predetermined message is attached to request information transmitted from the image processing device to the service providing device, and to response information transmitted from the service providing device to the image processing device as a response to the request information. The image processing device may include a command requesting unit that transmits control command request information in association with the request information, the control command request information being for requesting the service providing device to transmit a control command which is a control instruction to the image processing device when the service is executed, and a command executing unit that executes a predetermined process in accordance with the control command information.

The service executing unit and the command transmitting unit may be included in the service providing unit, the service executing unit executing the service, the command transmitting unit transmitting the control command in association with the response information as a response to the request information transmitted from the command requesting unit, and the command executing unit executes a predetermined process in accordance with the control command information transmitted in association with the response information transmitted from the command transmitting unit.

Each of the foregoing programs is composed of a row of sequentially-numbered orders suitable for computer processing, and they are provided to each equipment (device and server) or user utilizing the equipment via recording media such as FD, CD-ROM, and memory card, or communication circuit networks such as the internet. These programs can also be provided to the user pre-installed in the hard disk, memory, etc. of respective equipments.

EMBODIMENTS

Data processing unit (e.g., image processing system) according to embodiments of the invention will be described, referring to the accompanying drawings.

First Embodiment

FIG. 1 is a block diagram showing a configuration of a data processing system according to the invention.

As shown in this drawing, this data processing system includes an MFP (multiple function peripheral) 10, a directory server 20, and a function server 30, which are connected so that a bidirectional communication via a network 1 (in the present embodiment, a Wide Area Network (WAN) such as the Internet) is available. Specifically, the MFP 10, the directory server 20 and the function server 30 are connected to the network 1, respectively, via routers (R) 2, 3 and 4. The router 2 which connects the MFP 10 and the network 1 is a known broadband router. Under the normal setting (default setting), all ports within this broadband router 2 are closed and, when a connection request is made from an internal source to an external destination (from the MFP 10 side to the network 1 side), only a packet which is compatible as a response to this request is allowed to pass. In other words, out of data transmitted from an external source to an internal destination under normal setting, response to a request from an internal source to an external destination is allowed to pass while all others are blocked. Through this, the broadband router 2 functions as a firewall to prevent unauthorized access to the MFP10 from the network 1.

Further, the broadband router 2 has a proxy function. If a response to a request from the MFP 10 is not issued within a predetermined timeout period, the broadband router determines that a communication error has occurred.

The MFP 10 has a phone (voice communication) function, scanner function, printer function, copy function, facsimile function, etc. In the present image processing system, the MFP 10 can utilize numerous types of services related to the foregoing functions via the network 1. Specifically, the function server 30, provided on the network 1, is configured to enable the performance of numerous types of services related to the foregoing functions held by the MFP 10. Furthermore, directory server 20, also provided on the network 1, is configured to enable the provision of information regarding services which can be utilized by the MFP 10 (services which can be performed by the function server 30), via the network, to the MFP 10.

The respective configurations of the MFP 10, the directory server 20, and the function server 30 are explained below.
Configuration of MFP 10

The MFP 10 includes a control unit 11, an operation unit 12, a reading unit 11, recording unit 14, a communication unit 15, a memory unit 16, a sound input unit 17, and a sound output unit 18.

The control unit 11 includes known CPU, ROM, RAM, etc., which are not shown, and controls all parts comprising this MFP 10. Programs for enabling the CPU to perform each process described hereafter (FIG. 12, FIGS. 14-19, FIG. 31 and FIG. 32) are stored in the ROM.

The operation unit 12 receives input operations by the MFP 10 user and displays information to the user. Specifically, the operation panel 12a includes a copy key 41, a scanner key 42, a FAX key 43, a service key 44, a setting key 45, up/down/right/left direction keys 46 to 49, an OK key 50 and a cancel key 51, as a group of keys for receiving input operations by the user. The operation panel 12a also includes a display 52 as a display unit for displaying information to the user.

The reading unit (scanner) 13 reads image recorded (for example, printed) to a sheet-shaped recording medium such as paper and generates image data expressing this image. The recording unit (printer) 14 prints the image expressed by the image data onto a sheet-shaped recording medium such as paper.

The communication unit 15 performs process for transmitting/receiving data via the network 1. The memory unit 16 includes a nonvolatile RAM, not shown, and stores data thereto.

The sound input unit 17 inputs sound from a microphone provided on a handset (receiver), not shown, provided in the MFP 10, and generates sound data (PCM data) expressing this sound. The sound output unit 18 outputs the sound expressed by sound data (PCM data) from a speaker provided on the handset, not shown, or a speaker, not shown, provided on the main body of the MFP 10.
Configuration of Directory Server 20

The directory server 20 includes a control unit 21, a communication unit 22, and a memory unit 23.

The control unit 21 includes known CPU, ROM, RAM, etc., which are not shown, and controls all parts comprising this directory server 20. Programs for enabling the CPU to perform the process described hereafter (FIG. 23) are stored in the ROM.

The communication unit 22 performs process for transmitting/receiving data via the network 1. The memory unit 23 includes a hard disk, not shown, and stores data thereto.

Specifically, the memory unit 23 includes a service definition information memory unit 24 for storing service definition information 25.

The service definition information 25 provides information (service types and request destinations) regarding services which can be performed by the function server 30. Specifically, when received by the MFP 10, the service definition information 25 enables the display 52 provided in the MFP 10 to display a service selection screen (example shown in FIG. 5) showing service types and asks the MFP 10 user to select a service. The directory server 20 classifies and manages the services which can be performed by the function server 30 into three categories: "data storage service", "printing service", and "copy service".

First, the service selection screen shows the foregoing three categories and asks the user to select one category. Next, the service selection screen shows the services included in the selected category and asks the user to select one service. The service definition information 25 corresponding to the service selection screen asking for the selection of category (hereinafter "top service definition information 25") and a plurality of service definition information 25 corresponding to the service selection screen asking for selection of service provided in each category are stored to the service definition information memory unit 24.

Here, a detailed example of service definition information 25 is explained.

FIG. 3 and FIG. 4 show an example of a data structure of the service definition information 25. Specifically, FIG. 3 shows a data structure of the top service definition information 25, and FIG. 4 shows the data structure of service definition information 25 regarding "copy service" which is one of the foregoing three categories. As shown in these drawings, the service definition information 25 is described in XML (eXtensible Markup Language), and the definitions of each tag used in FIG. 3 and FIG. 4 are as shown in Table 1.

when the user presses the OK key 50 on the operation panel 12a. IDs for the service definition information 25 which correspond to respective categories are corresponded to respective items (Link_Location), and when the selection of the item is established, the ID of the service definition information 25 corresponding to this item is received in MFP 10.

Figure 5A:
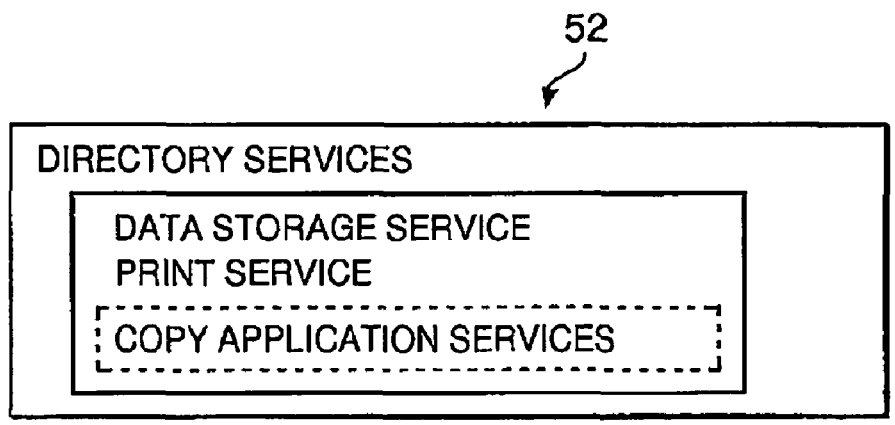
FIGS. 5A-5C show illustrative indications on a service selection window according to aspects of the invention.
Figure 5B:
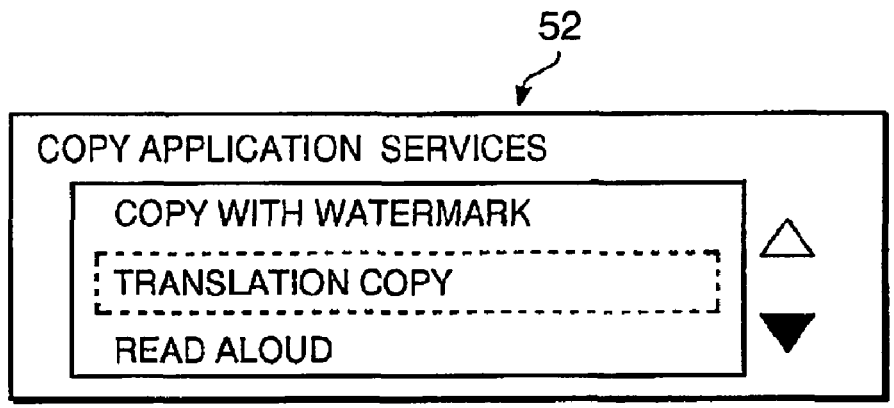

For example, when "copy service" is selected from the service selection screen shown in FIG. 5A, the service definition information 25 in FIG. 4 is received in the MFP 10, and the service selection screen shown in FIG. 5B is displayed in display 52. Specifically, the characters, "copy service", are shown in the upper part of the display 52 as the display title (Title) and characters, "copy with watermark", "translation copy", "manuscript read out", and "voice-text conversion", which are the selectable services (Link_Title), are shown below.

However, because all items cannot be displayed at once due to the size of the display 52, if there are items which have not been displayed in the display 52, the MFP 10 shows up and down arrows (triangles) in the right side of the item display position in the display 52. If there are items in the direction indicated by the arrow, the arrow is black, and if there are no items, the arrow is white, thus enabling the user to determine if items which have not been displayed exist. For example, the down arrow is black in FIG. 5B, indicating that there are other items below "manuscript read out". Therefore, if the cursor is moved down by the down direction key 47 on the operation panel 12a, in the state in FIG. 5B, the entire list of items are scrolled and, as shown in FIG. 5C, the characters, "voice-text conversion" appears below "manuscript read out".

Figure 5C:
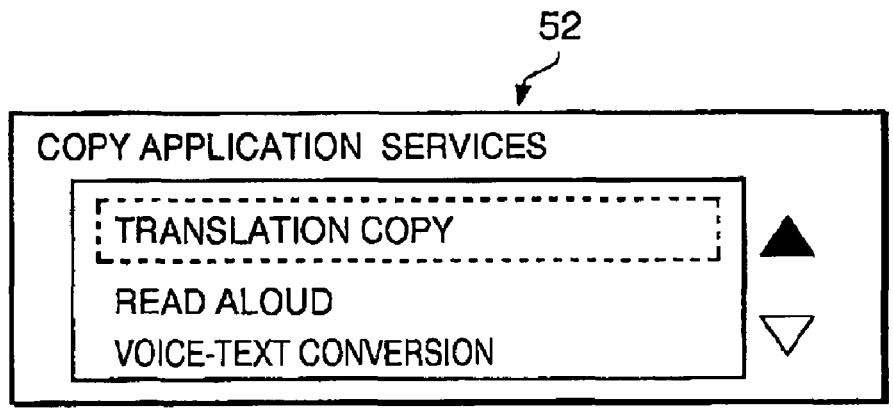

The selection of items is also established by the foregoing operations in the service selection screens shown in FIG. 5B and FIG. 5C. Here, URLs for calling forth respective services are corresponded to respective items (Link_Location), and when the selection of the item is established, the service of the URL corresponding to this item is called forth.

TABLE 1

|  | Data Name | Data Type | Description |
| --- | --- | --- | --- |
| Basic Data | ID | Integer | Identification information of service definition information |
|  | Title | Character string | Displayed title |
|  | Type | 'MENU' or 'Form' | Indicates Body data type. If it is Menu, a list of links to other information is defined; if it is Form, a data entry form is defined. The Type is 'MENU' if information is service definition information. |
| Body data (When Type is "MENU") | Num Link | Integer | Number of Link data |
|  | Link[] | — | Actual Link data |
| Link data | Link_Title | Character string | Displayed character string for explaining service of or information on the link destination |
|  | Link_Location | Character string | URL for calling forth service or ID for other service definition information |

When the top service definition information 25 (FIG. 3) is received by the MFP 10, the service selection screen shown in FIG. 5A is displayed in the display 52 in the operation panel 12a provided by the MFP 10. Specifically, the characters, "Directory Service", are shown in the upper part of the display 52 as the display title (Title) and characters, "data storage service", "printing service" and "copy services", which are the selectable categories (Link_Title), are shown below. If the user operates the up/down direction keys 46 and 47 on the operation panel 12a, the cursor for selecting the item (the broken-line rectangle in FIG. 5A) moves vertically, and the selection of the item designated by the cursor is established Configuration of Function Server 30

The function server 30 includes a control unit 31, a communication unit 32, and a memory unit 33.

The control unit 31 includes known CPU, ROM, RAM, etc., which are not shown, and controls all parts comprising this function server 30. Programs for enabling the CPU to perform the process described hereafter (FIG. 21, FIG. 22, FIGS. 28-30, FIG. 33 and FIG. 34) are stored in the ROM. The control unit 31 is more powerful than the control unit 11 in MFP 10 and can perform process which the control unit 11 has difficulty performing.

The communication unit 32 performs process for transmitting/receiving data via the network 1. The memory unit 23 includes a hard disk, not shown, and stores data thereto. Specifically, the memory unit 23 includes a service I/F information memory unit 34 for storing service I/F information 36 and a service software memory unit 35 for storing service software 37.

The service software 37 enables the performance of numerous types of services. Specifically, numerous types of service software 37 are stored in the service software memory unit 35, and a different service is performed for each service software 37. These services can be, for example, a service related to image data generated by the reading unit 13 in the MFP 10, a service related to sound data generated by the sound input unit 17 in the MFP 10, a service related to image data expressing image printed by the recording unit 14 in the MFP 10, or a service related to sound data expressing sound output by the sound output unit 18 in MFP 10. The process (FIGS. 23-27), described hereafter, are performed based on the service software 37.

The service I/F information 36 enables request to MFP 10 for parameters which must be set in order to perform the service. Specifically, when received by the MFP 10, the service I/F information 36 displays a parameter input screen (example shown in FIG. 8) showing the parameters which should be set in the display 52 in the operation panel 12a provided in MFP 10 and asks the MFP 10 user to set the parameters. Numerous types of service I/F information 36, corresponding respectively to numerous types of services, which can be performed by the function server, are stored in the service I/F information memory unit 34.

Here, a detailed example of the service I/F information 36 is explained.

FIG. 6 and FIG. 7 show an example of the data structure of service I/F information 36. Specifically, the data structure of service I/F information 36 corresponding to a service (translation copy service) for applying an OCR (Optical Character Recognition) process to an image read out by the reading unit 13 in MFP 10, acknowledging the text content of this image, generating image data expressing the translated content of this text, and enabling the recording unit 14 in MFP 10 to print this image, is show. As shown in these drawings, the service I/F information 36 is described in the same mark-up language as the foregoing service definition information 25, and the definitions of each tag used in FIGS. 6-8 are as shown in Table 2. The basic data in Table 2 is the same as that for the service definition information 25 (Table 1).

TABLE 2

| | Data Name | Data Type | Description |
|---|---|---|---|
| Basic Data | ID | Integer | Identification information of service I/F information |
| | Title | Character string | Displayed title |
| | Type | 'MENU' or 'Form' | Indicates Body data type. If it is Menu, a list of links to other information is defined; if it is Form, a data entry form is defined. The Type is 'FORM' if information is service I/F information. |
| | Param_Adm | Integer | Input/output device parameter management type 1: transmit to server 2: manage by MFP |
| Body data (When Type is "FORM") | Action | URL Character string | URL of program for receiving and process input data |
| | Num_Form_Elem | Integer | Number of Form_Elem |
| | Form_Elem[] | — | Type-dependent Form element data |
| Form_Elem data (Form element data) | Form_Type | 'Text' or 'Password' or 'Select' | Type of Form element |
| | Form_Data | — | Type-dependent data |
| Form_Data data ('Text' or 'Password') | Disp_Name | Character string | Character string explaining input items |
| | Value_Name | Character string | Variable name when transmitting as data |
| | Max_Byte | Integer | Maximum number of bytes of character string which can be input |
| | Default_String | Character string | Character string initially shown in the entry area |
| Form_Data data (Select) | Disp_Name | Character string | Character string explaining input items |
| | Value_Name | Character string | Variable name when transmitting as data |
| | Multi_Select | 0 or 1 | 0: Multiple selections prohibited 1: Multiple selections allowed |
| | Num_Option | Integer | Number of selection items |
| | Option[] | — | Information related to selection items (explained hereafter) |
| Option data | Disp_Select | Character string | Displayed character string showing choices |
| | Disp_Value | Character string | Value when transmitting as data when selected |
| | Default_Select | 0 or 1 | 0: Not selected in initial state 1: Selected in initial state |

When the service I/F information 36 shown in FIGS. 6-8 is received by the MFP 10, the parameter input screen shown in FIG. 8A is displayed in the display 52 of the operation panel 12a provided in the MFP 10. Specifically, the characters, "translation copy", are shown in the upper part of the display 52 as the display title (Title), characters, "language selection" are shown below, and the characters, "English→Japanese" and "Japanese→English", which are the selectable parameters (Link_Title), are shown further below. If the user operates the up/down direction keys 46 and 47 on the operation panel 12a in this state, the cursor for selecting the item moves vertically, as in the foregoing service selection screen.

Figure 9A:
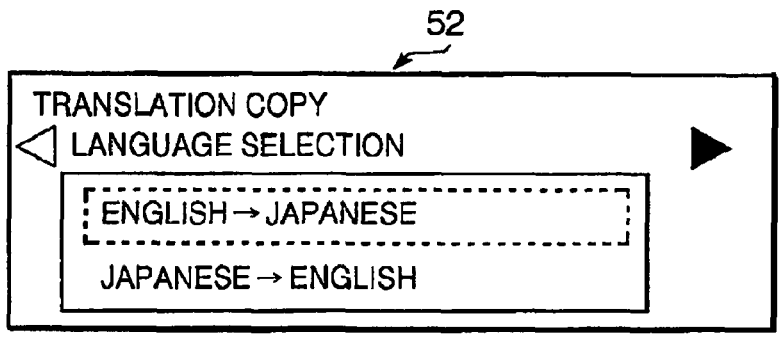
FIGS. 9A-9E show illustrative indications of a parameter input window according to aspects of the invention.

Although, in addition to the foregoing displayed "language selection", the input items (Disp_Name) related to "translation copy" includes "scanner setting", "print setting", and "comments" (refer to FIG. 7 and FIG. 8), all of the input items cannot be shown at once due to the size of the display 52. If there are input items which are not displayed in the display 52, the MFP 10 shows left and right arrows (triangles) in both left and right sides of the item display position in the display 52. If there are items in the direction indicated by the arrow, the arrow is black, and if there are no items, the arrow is white, thus enabling the user to determine if items which have not been displayed exist. For example, the right arrow is black in FIG. 9A, indicating that there are other items to the right of "language selection". Therefore, if the right direction key 49 on the operation panel 12a is pressed in the state in FIG. 9A, screen switches to a parameter input screen of which the input item is "scanner setting".

In the parameter input screen shown in FIG. 9B, the characters, "scanner setting", are displayed as the input item (Disp_Name) below the characters, "translation copy", which are displayed as the display title (Title). Further below, the characters, "normal font" and "small font", are displayed as items showing the selectable parameters (Disp_Select) in the input item "scanner setting".

Figure 10A:
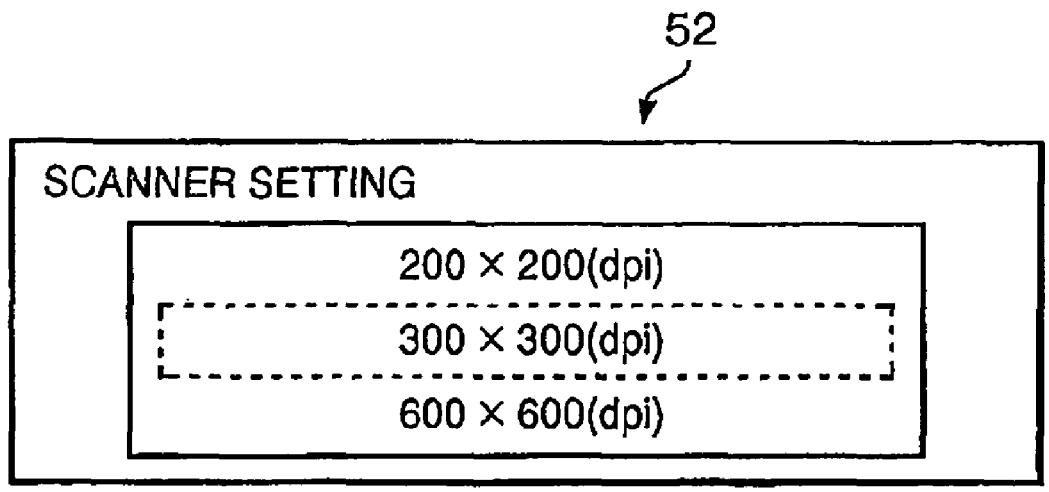
FIGS. 10A and 10B show windows for setting resolutions of the MFP according to aspects of the invention.

"Normal font" means that the resolution (reading resolution), a parameter of the reading unit 13, is set to 300×300 dpi, and "small font" means the resolution is set to 600×600 dpi. In this example, the resolution which can be set in the "scanner setting" is limited to a part of the resolution which can be normally set in the MFP 10. In other words, normally, when an operation for reading out image printed on a sheet of paper is performed in the MFP 10, the resolution of scanner 13 can be selected from 200×200 dpi, 300×300 dpi, and 600×600 dpi, in the setting screen shown in the display 52 of the operation panel 12, as shown in FIG. 10A. On the other hand, the low resolution, 200×200 dpi, cannot be set in the translation copy service because OCR process precision will drop if the image resolution is rough. In order to increase the OCR process precision, reading is limited to black and white in this example.

Figure 9B:
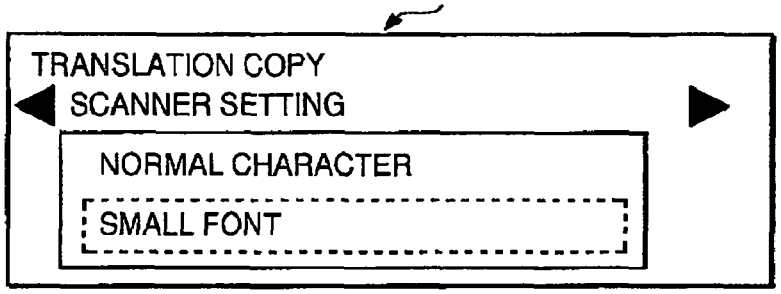
Figure 9C:
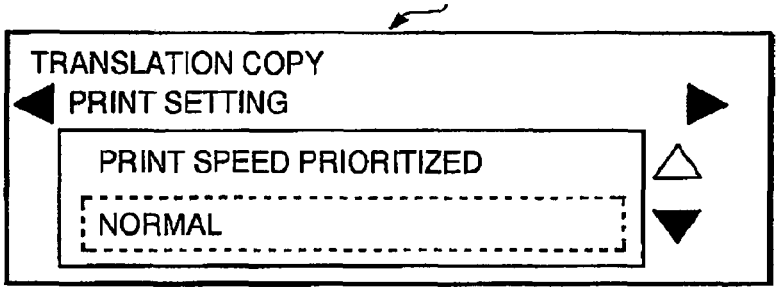

If the right direction key 49 on the operation panel 12a is pressed in the state in FIG. 9B, the screen changes to a parameter input screen of which the input item is "print setting", as shown in FIG. 9C.

In the parameter input screen shown in FIG. 9C, the characters, "print setting" is displayed as the input item (Disp_Name) below the characters, "translation copy", displayed as the display title (Title). Further below, the characters, "printing speed prioritized", "normal", and "high-definition", are displayed as items showing the selectable parameters (Disp_Select) in the input item "print setting".

However, all of the items cannot be shown at once due to the size of the display 52. As in the foregoing service selection screen (FIG. 5B and FIG. 5C), left and right arrows (triangles) are displayed in both left and right sides of the item display position in the display 52. If there are items in the direction indicated by the arrow, the arrow is black, and if there are no items, the arrow is white, thus enabling the user to determine if items which have not been displayed exist. For example, if the cursor is moved down by the down direction key 47 on the operation panel 12a, in the state in FIG. 9C, the entire list of items is scrolled and, as shown in FIG. 9D, the characters, "high-definition" appears below "normal".

Figure 10B:
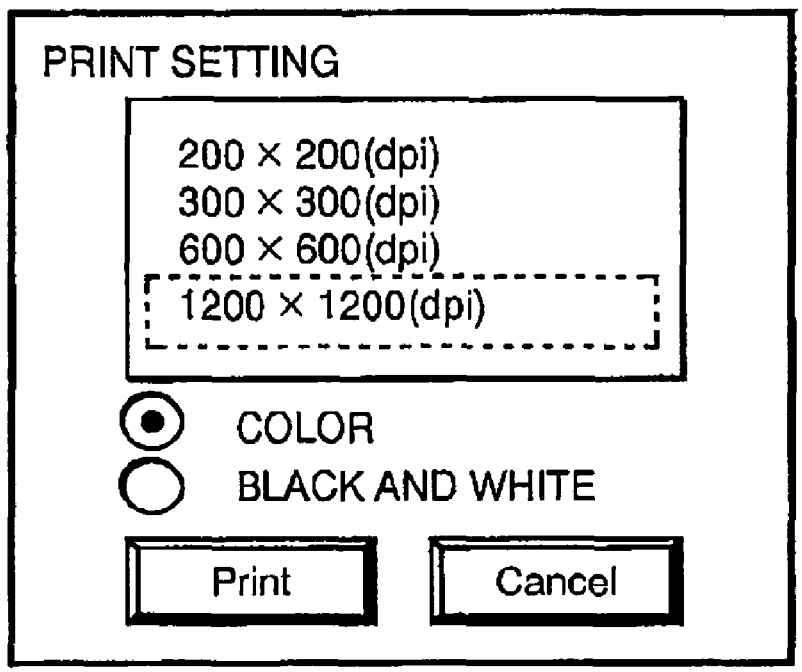

"Printing speed prioritized" means the resolution (printing resolution), a parameter of the recording part 14, is set to 200×200 dpi, "normal" means the resolution is set to 300×300 dpi, and "high-definition", 600×600 dpi. In this example, the resolution which can be set in the "print setting" is limited to a part of the resolution which can be normally set in the MFP 10. In other words, normally, when an operation for instructing the MFP 10 to print out an image is performed by a personal computer, not shown, the resolution of scanner 13 can be selected from 200×200 dpi, 300×300 dpi, 600×600 dpi, and 1200×1200 dpi in the setting screen shown in the display of the personal computer, as shown in FIG. 10B. On the other hand, the high resolution, 1200×1200 dpi, cannot be set in the translation copy service because it is meaningless to set the printing resolution to a value higher than that which can be set as the reading resolution in scanner 13. The printing resolution is allowed to be set to low resolution in response to the need to print quickly, even if resolution is decreased. In addition, because the scanned image is limited to black and white, printing is limited to black and white, as well, in this example.

Figure 9D:
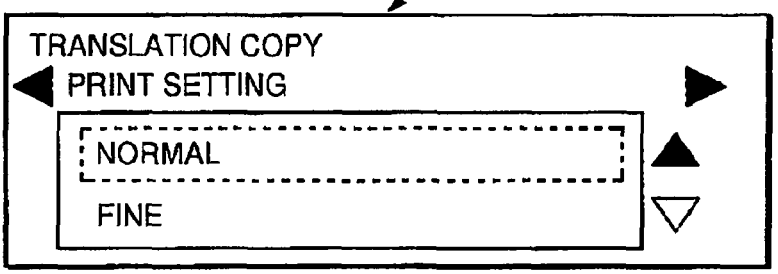
Figure 9E:
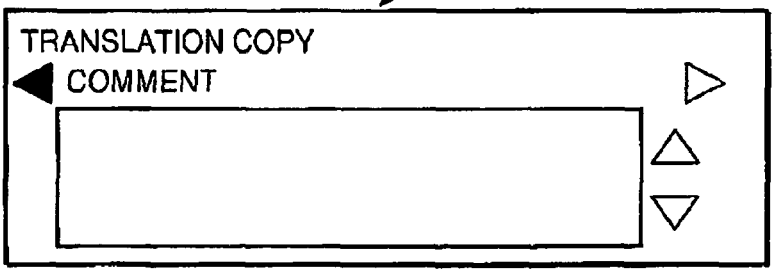

If the right direction key 49 on the operation panel 12a is pressed in the state in FIG. 9C or 9D, the screen changes to a parameter input screen of which the input item is "comments", as shown in FIG. 9E.

In the parameter input screen shown in FIG. 9E, the characters, "comments" is displayed as the input item (Disp_Name) below the characters, "translation copy", displayed as the display title (Title). Further below, a comment entry field is displayed. The contents entered as comments are used in, for example, as the header and footer of the print image.

In this way, parameters regarding each input item in "language selection", "scanner setting", and "print setting" are selected and comments are entered in the parameter input screen (FIG. 9A to FIG. 9E) of the translation copy service. The selection of the item designated by the cursor (the last designated item if the input item is not shown in the display 52) is established, and comment entry is established, when the user presses the OK key 50 on the operation panel 12a. These parameters are transmitted to the URL (Action) of the program which receives and processes input data.

The selectable parameters of an input item can be changed based on the selected parameters of another input item. For example, if "normal font" is selected as the parameter in the scanner setting, the setting of printing resolution to 600×600 dpi can be prevented regardless of the reading resolution being set to 300×300 dpi, if "high-definition" is made not selectable as a parameter in the print setting.

Communication in the Image Processing System

In this image processing system, HTTP1.1 (HTTP: HyperText Transfer Protocol) is used as the communication protocol for transmitting/receiving data between the MFP 10, the directory server 20, and the function server 30. Instructions and responses thereto are mutually transmitted by messages accompanying HTTP request and response.

Instructions which are mutually communicated include instructions from the MFP 10 to respective servers 20 and 30 (server control instruction) and instructions from respective servers 20 and 30 to the MFP 10 (MFP control instruction), and both communications are always made with the MFP 10 as the HTTP communication client (the side which transmits the HTTP request). Therefore, blocking of instructions from respective servers 20 and 30 to the MFP 10 can be prevented, even if the broadband router 2 is used set to its normal setting.

Specifically, the MFP 10 transmits an instruction to the directory server 20 or the function server 30 through a message accompanying the POST command of the HTTP request. On the other hand, respective servers 20 and 30 transmits a MFO control instruction accompanying the HTTP response message for the forgoing inquiry, if there is an MFP control instruction, with regards to the MFP control instruction inquiry by the message accompanying the POST command of the HTTP request from the MFP 10.

Further, according to the image processing system in this embodiment, the function server 30 does not transmit the response to the received request immediately if there is no command (the MFP control instruction) to be transmitted to the MFP 10 when the function server 30 has received the MFP control instruction inquiry (i.e., command request) from the MFP 10. In such a case, the function server 30 waits until a predetermined maximum holding period (i.e., a maximum standby period) has elapsed. If an MFP control instruction is issued before the maximum holding period has elapsed, the function server 30 transmits the MFP control instruction immediately as the response, while if no MFP control instructions are issued before the maximum holding period has elapsed, the function server 30 transmits a response without not command to the MFP 10.

Figure 11:
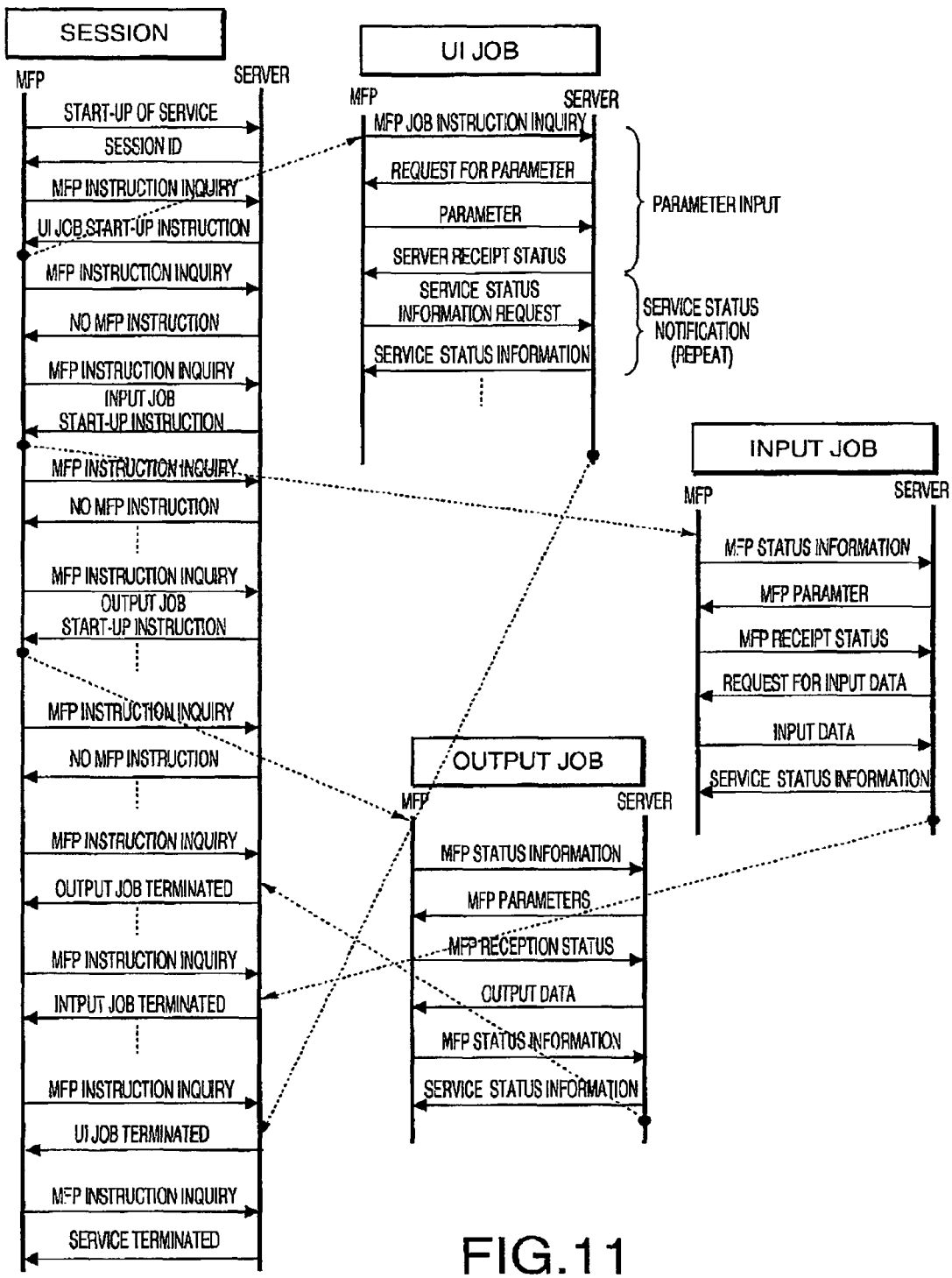
FIG. 11 is a ladder chart explaining a flow of communication between the MFP and the function server according to aspects of the invention.

One example of the communication performed between the MFP 10 and the function server 30 is explained using the ladder chart in FIG. 11.

The MFP 10 and the function server 30 perform a chain of communication processes (session) between service boot and service termination. In this session, first, the MFP 10 requests the function server 30 for service boot. Then, the function server 30 generates a session ID and transmits the session ID to the MFP 10, thereby assigning the same to the MFP 10. Here, session ID is an identifier enabling the function server 30 to designate the session, and in subsequent communication, the MFO 10 transmits session ID along with a request, and the function server 30 designates the session based on this session ID. Thus, the function server 30 can process a plurality of sessions simultaneously.

When session ID is received, subsequently, the MFP 10 regularly performs MFP instruction inquiry (command request) which is an inquiry into instructions to the MFP 10 and receives instructions (command) in the form of response to the inquiry from the function server 30. The function server 30 transmits notice that there are no instructions (no MFP instruction) when there are no instructions which should be sent in response to the MFP instruction inquiry.

In this example, the function server 30 first transmits UI (user interface) job startup instruction to the MFP 10. Here, the UI job startup instruction gives notification when the usage of the UI device (operation panel 12a), provided in MFP 10, starts. Through this, UI job communication process begins between the MFP 10 and the function server 30. This UI job communication process is performed in parallel with the session. In addition, job ID (session-intrinsic identifier) for enabling the function server to designate the job is transmitted along with the UI job startup instruction from the function server 30 to the MFP 10, thereby assigning the job ID to the MFP 10. Then, in the UI job communication process, the MFP 10 transmits session ID and job ID along with the request, and the function server 30 designates the job based on the session ID and job ID. Through this, the function server 30 can process a plurality of jobs simultaneously. The contents of the UI job communication process are described hereafter.

Next, the function server 30 transmits an input job startup instruction to the MFP 10 at a predetermined timing. The input job startup instruction gives notification when the usage of the input device (reading unit 13 or sound input unit 17), provided in MFP 10, starts. Through this, input job communication process begins between the MFP 10 and the function server 30. This input job communication process is performed in parallel with the session. In addition, job ID is transmitted along with the input job startup instruction from the function server 30 to the MFP 10, thereby assigning the job ID to the MFP 10. Then, in the input job communication process, the MFP 10 transmits session ID and job ID along with the request, and the function server 30 designates the job based on the session ID and job ID. The contents of the input job communication process are described hereafter.

Next, the function server 30 transmits an output job startup instruction to the MFP 10 at a predetermined timing. The output job startup instruction gives notification when the usage of the output device (recording unit 13 or sound output unit 17), provided in MFP 10, starts. Through this, output job communication process begins between the MFP 10 and the function server 30. This output job communication process is performed in parallel with the session, as is in the UI job and input job. In addition, job ID is transmitted along with the output job startup instruction from the function server 30 to the MFP 10, thereby assigning the job ID to the MFP 10. Then, in the output job communication process, the MFP 10 transmits session ID and job ID along with the request, and the function server 30 designates the job based on the session ID and job ID. The contents of the output job communication process are described hereafter.

Next, the function server 30 transmits an output job completion instruction, which gives notification of the completion of an output job, to the MFP 10 at a predetermined timing.

Then, the function server 30 transmits an input job completion instruction, which gives notification of the completion of an input job, to the MFP 10 at a predetermined timing.

Next, the function server 30 transmits an UI job completion instruction, which gives notification of the completion of an UI job, to the MFP 10 at a predetermined timing.

Then, the function server 30 transmits a service job completion instruction, which gives notification of the completion of a service, to the MFP 10 at a predetermined timing.

The session contents are as described above.

Next, the UI job communication process is explained.

In the UI job communication process, first, the MFP 10 performs an MFP job instruction inquiry, which is an inquiry into instructions to the MFP 10, to the function server 30. Then, the function server 30 transmits a parameter request to the MFP 10. The parameter request enables the user to set parameters necessary for performing services, and service I/F information 36 is transmitted, along with the parameter request, from the function server 30 to the MFP 10.

When the parameter request from the function server 30 is received, the MFP 10 displays the parameter input screen based on the service I/F information 36 in the display 52 of the operation panel 12a (for example, FIG. 8). Then, the MFP 10 transmits the parameters set by the user to the function server 30.

When the parameters are received from the MFP 10, the function server 30 transmits server reception status, which is notification indicating whether information from the MFP 10 has been received by the function server 30, normally.

Then, after verifying that the function server 30 has received the parameters normally by the server reception status received from the function server 30, the MFP 10 performs a service status information request, which is a request for information related to the service status, to the function server 30.

When the service status information request is received from the MFP 10, the function server 30 transmits service status information, which is notification of the statuses of the function server 30 and service, to the MFP 10.

Subsequently, the transmission of the service status information request and the service status information in response thereto is repeated.

Next, the input job communication process is explained.

In the input job communication process, first, the MFP 10 transmits an MFP status information, which is information related to the status of the MFP 10, to the function server 30. Then, the function server 30 transmits MFP parameters to the MFP 10, as required. The MFP parameters are input device parameters set by the MFP 10 user in the UI job communication process.

When the MFP parameters are received from the function server 30, the MFP 10 transmits MFP reception status, which is notification indicating whether information from the function server 30 has been received by the MFP 10, normally.

Then, after verifying that the MFP 10 has received the parameters normally by the MFP reception status received from the MFP 10, the function server 30 transmits an input data request, which is a request for input data corresponding to the job, to the MFP 10. Input data corresponding to the job is image data generated by the reading unit 13 if the job is a scan job (a job performed in a service related to image data generated by the reading unit 13), or a PCM data if the job is a voice input job (a job performed in a service related to sound data generated by the sound input unit 17).

When an input data request is received from the function server 30, the MFP 10 performs a presentation, etc. asking the user for input operations (image reading operations and voice input operations) and transmits the input data generated as a result to the function server 30.

When input data is received from the MFP 10, the function server 30 transmits service status information, which is a notification of the statuses of the function server 30 and the service, to the MFP 10.

Next, the output job communication process is explained.

In the output job communication process, first, the MFP 10 transmits MFP status information, which is information related to the MFP 10 status, to the function server 30. Then, the function server 30 transmits MFP parameters to the MFP 10, as required. The MFP parameters are output device parameters set by the MFP 10 user in the UI job communication process.

When the MFP parameters are received from the function server 30, the MFP 10 transmits MFP reception status, which is notification indicating whether information from the function server 30 has been received by the MFP 10, normally.

Then, after verifying that the MFP 10 has received the parameters normally by the MFP reception status received from the MFP 10, the function server 30 transmits an output data to the MFP 10. On the other hand, if the MFP parameters are not transmitted, after the MFP status information has been received, the function server 30 transmits output data to the MFP 10. Output data is image data if the job is a print job (a job performed in a service related to image data expressing image to be printed by the recording unit 14), or a PCM data if the job is a voice output job (a job performed in a service related to PCM data expressing voice output by the sound output unit 18).

When an output data is received from the function server 30, the MFP 10 performs output process (printing image and outputting voice), based on the output data, and transmits the MFP status information, which is information related to the status of the MFP 10, to the function server 30.

When the MFP status information is received from the MFP 10, the function server 30 transmits service status information, which is a notification of the statuses of the function server 30 and the service, to the MFP 10.

MFP Process by MFP 10

Figure 12:
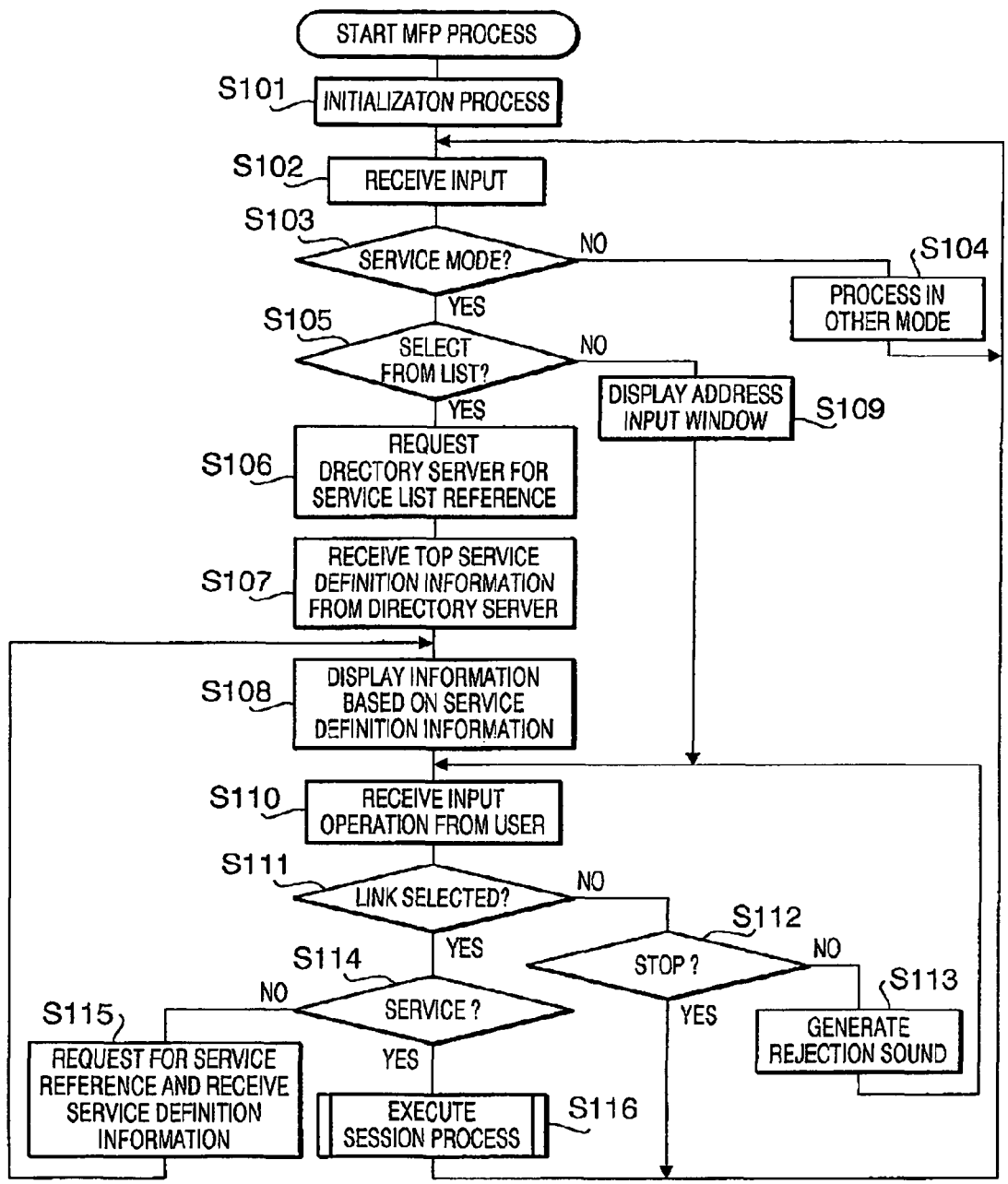
FIG. 12 is a flowchart showing an MFP process according to aspects of the invention.

MFP process performed by the control unit 11 of the MFP⊖ 10 as explained below, referring to the flowchart in FIG. 12. This MFP process begins when power is applied to the MFP 10.

When this MFP process is started, first, the process performs the initialization of the MFP 10 in S101.

Next, in S102, the process receives input to the MFP 10. Here, input to the MFP 10 is input for starting any process in the MFP 10, such as, for example, key input in the operation panel 12a, and input of instructions from a personal computer which is not shown.

Then, in S103, the process determines whether the input received in S102 calls for change of the operation mode to service mode, which requests the function server 30 for service. Specifically, the process determines whether the input received in S102 is the pressing of the service key 44 in the operation panel 12a.

If the process determines in S103 that the input does not call for change to service mode, the process proceeds to S104, performs the process for another operation mode (for example, image print process) according to the input received in S102, and returns to S102.

Figure 13:
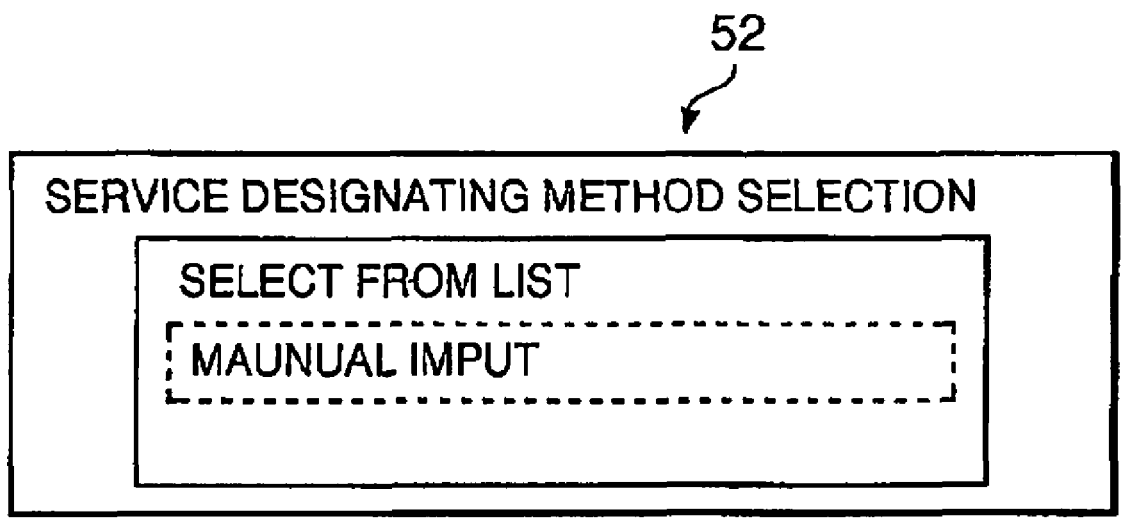
FIG. 13 shows a selection screen for selecting whether a service is selected from a list or by a direct input according to aspects of the invention.

On the other hand, if the process determines in S103 that the input calls for change to service mode, the process proceeds to S105 and determines whether to select the service to be requested from the function server 30 from a list. Specifically, the process selects one out of either a method wherein the service is selected from a list or a method wherein the URL of the request destination of the desired service is directly input as a method wherein the selection screen shown in FIG. 13 is displayed in the display 52 of the operation panel 12 and determines the service to be requested from the function server 30.

If the process determines that the service to be requested from the function server will be selected from a list in S105 ("select from list" is selected), the process proceeds to S106 and requests the directory server 20 for service list reference. Specifically, the process requests the director server 20 for the transmission of the top service definition information 25 (FIG. 3). In this example, the communication destination address (URL) for requesting top service definition information 25 is stored to the memory unit in the MFP 10, beforehand.

Then, in S107, the process receives the top service definition information 25, transmitted from the directory server 20 in response to the request in S106.

Furthermore, in S108, the process displays the service selection screen, based on the service definition information 25 received in S107, in the display 52 of the operation panel 12a (FIG. 5A) and proceeds to S110.

On the other hand, if the process determines in S105 that the service requested from the function server 30 will not be selected from a list ("direct input" is selected), the process proceeds to S109, displays the address input screen for directly entering the URL (not shown) in the display 52 of the operation panel 52, and proceeds to S110.

In S110, the process receives input operations by the user, for determining the service to be requested from the function server 30, in the operation panel 12a.

Next, the process determines whether to the input operation received in S110 is an operation to select a link in S111. Specifically, when the selection operation is performed normally, based on information shown in S108, or when the URL is entered into the address input screen shown in S109 normally, the process determines that the input operation is that for selecting a link.

If the process determines in S111 that the operation is not for link selection, the process proceeds to S112, and determines whether the input operation received in S110 is a termination operation for terminating the service mode.

If the process determines in S112 that the input operation is a termination operation for terminating service mode, the process returns to S102. In other words, process in service mode is completed.

On the other hand, if the process determines in S112 that the input operation is not a termination operation for terminating service mode, the process proceeds to S113 and returns to S101 after sounding a rejection sound (buzzer, etc.). In other words, if the input operation received in S110 is not an operation for link selection or a termination operation, the process notifies the user through the rejection sound.

If the process determines in the foregoing S111 that the operation is that for link selection, the process proceeds to S114 and determines whether the selected URL is the service URL.

If the process determines in this S114 that the URL is not a service URL (it is a service definition information 25 URL), the process proceeds to S115, requests the directory server 20 for service reference (requests transmission of service definition information 25), based on information indicated by Link_Location (information indicated by the URL if the URL is entered directly), and receives the requested service definition information 25 from the directory server 20. Then, the process returns to S108. Through this, a new service selection screen is shown in the display 52 of the operation panel 12a.

On the other hand, if the process determines that the URL is a service URL, the process proceeds to S116 and, after performing the session process (FIGS. 14 and 15), described hereafter, returns to S102.

Session Process by MFP 10

Figure 14:
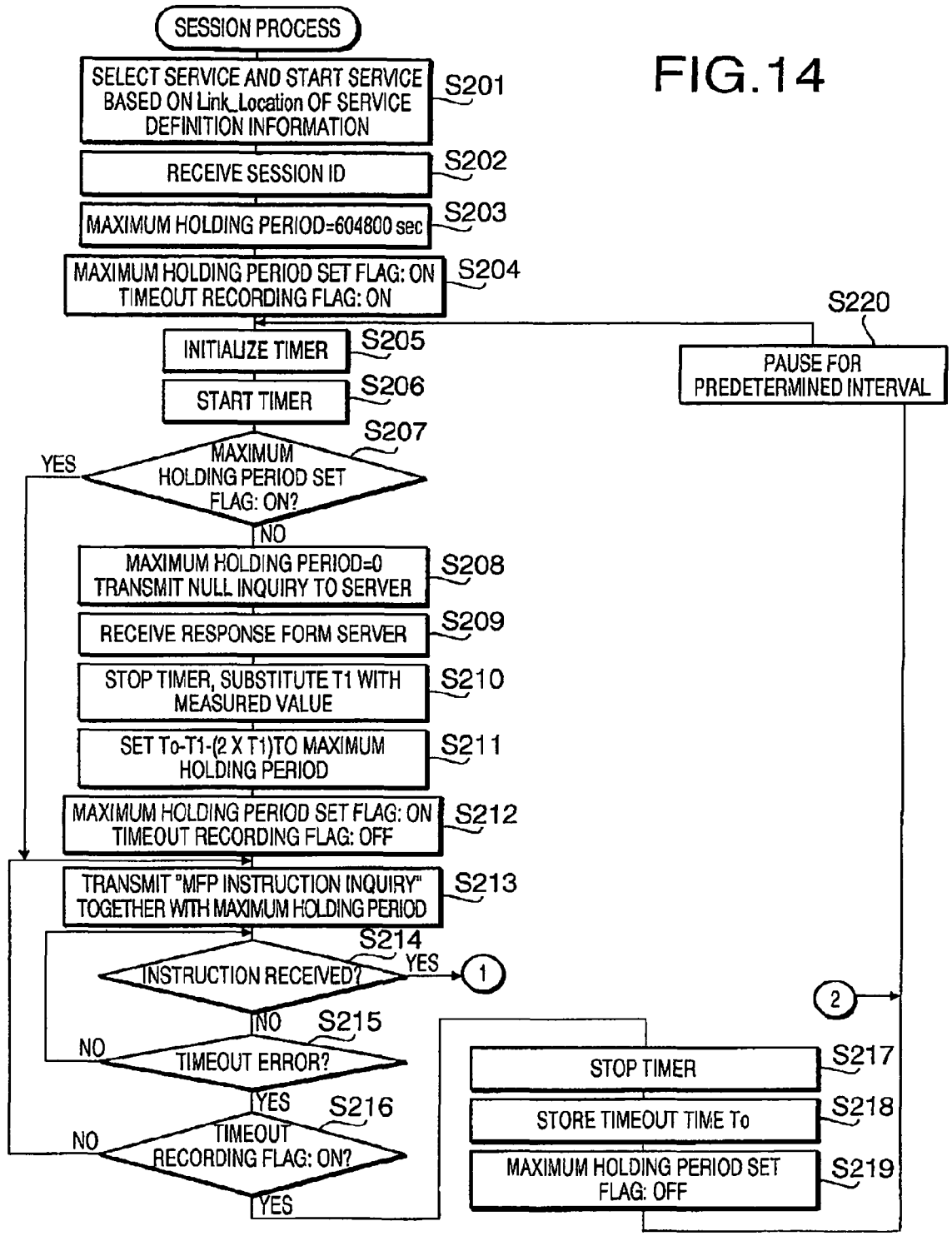
FIGS. 14 and 15 show a flowchart illustrating a session process executed by the MFP according to aspects of the invention.

The session process performed in S116 in the MFP process (FIG. 12) is explained below, using the flowchart in FIGS. 14 and 15.

When this session process is started, first, in S201, the process selects and boots the service to be used, based on the Link_Location of the service definition information 25 (the URL if URL is entered directly). In other words, the process boots the service selected by the user by transmitting a service boot instruction to the service URL.

Next, the process receives a session ID from the function server 30 in S202. The process generates a session ID in S805, in the function server process (FIG. 21), described hereafter, which is performed by the control unit 31 of the function server 30, and transmits the generated session ID in S809.

In S203, the process sets the maximum holding period to 604800 seconds (i.e., one week). Thus, according to the image processing system, the maximum holding time is set by the MFP 10. The holding period 604800 seconds is an example of a time period which is sufficiently greater than the timeout period referred to by the broadband router 2 to determine whether the communication error has occurred.

In S204, the maximum holding period set flag is set to on, and the timeout recording flag is released. Next, in S205, a timer is initialized, and in S206, the timer is started.

In S207, the process judges whether the maximum holding period flag is set. The judging step S207 is repeated during execution of the session process. Only in step S207 immediately after the detection of the first timeout error after the session process is started, the process determines that the maximum holding period set flag is not on, while in other execution of S207 (when the timeout error has not occurred, or when the maximum holding period has been set), the process determines that the maximum holding period set flog is on. Such a result is obtained since the on/off status of the maximum holding period set flag is switched in S204, S212 and S219.

For better understanding of the session process, a process after S207 when the timeout error has not yet been detected, a process immediately after detection of the first timeout error, and a process after S207 executed after the maximum holding period has been set will be described.

Process When Timeout Error has Not Yet Been Detected

In S207 when the timeout error has not yet been detected, since the maximum holding period set flag is set (ON), the process determines that the maximum holding period set flag is on, and proceeds to S213.

In S213, the process transmits "MFP instruction inquiry" which is an inquiry for the instruction directed to the MFP 10 to the function server 30 together with the maximum holding period (604800 seconds) set is S203. Then, the function server 30 executes a response process according to the maximum holding period (i.e., a response process for transmitting a response to the request from the MFP 10 in one week). It should be noted that, in association with the MFP instruction inquiry, the session ID received in S202 is also transmitted.

In S214, the process judges whether an instruction to be transmitted as a response to the "MFP instruction inquiry" transmitted in S213.

If it is determined that the instruction has not been received, the process goes to S215, and judges whether the communication error has occurred as the response to the MFP instruction inquiry transmitted in S213 is issued after the timeout period has elapsed. According to the illustrative embodiment, the process can detect the occurrence of the communication error based on the notification output by the broadband router 2.

If the communication error due to the timeout does not occur (S215: NO), the process returns to S214. Thus, before the communication error due to the timeout occurs, the process waits for the response to the MFP instruction inquiry. Since the maximum holding period is set to a value sufficiently greater than the normally assumed time period (i.e., 604800 seconds), if the response has not been transmitted from the function server 30 for a relatively long period, the timeout period may have elapsed before the response is transmitted from the function server 30, and the communication error occurs. Then, as a result, the process determines that the timeout error has occurred (S215: YES), and proceeds to S216.

In S216, the process judges whether the timeout recording flag is ON. It should be noted that, since the timeout recording flag is set (ON) in S204, the process determines that the timeout recording flag is on and proceeds to S217.

In S217, the process stops the timer which was started in S206.

Then, in S218, the process stores the measured time of the timer stopped in S217 as a timeout measuring time To. That is, with the timer, the process measures the timeout measuring time To. It should be noted, however, the measured time To (hereinafter, simply referred to as timeout time To) of the timeout period is slightly longer than the timeout time set at the broadband router 2 since the timeout time To is add with a time period necessary for communication.

In S219, the process releases the maximum holding period set flag. Then, the process proceeds to S220 to wait for a predetermined interval, and returns to S205. Then, in 205, the process initializes the timer, starts the timer in S205, and proceeds to S207.

In S214, if the process determines that the instruction is received, the process proceeds to S221, and judges whether the received instruction is the job start-up instruction. The job start-up instruction is output in S1003, S1007 and S1011 of the session process (see FIG. 22) which is executed by the control unit 31 of the function server 30. Together with the job start-up instruction, the job ID and the destination URL of the job are also transmitted.

If the process determines in S221 that the instruction is a job startup instruction, the process proceeds to S222, secures resources necessary for job activation, proceeds to S223, and starts the designated job startup process. Then, the process proceeds to S220 and, after waiting for a predetermined interval, returns to S205. Then, in S205, the process initialize the timer, starts the timer in S206, and proceeds to S207.

On the other hand, if the process determines in S221 that the instruction is not a job startup instruction, the process proceeds to S224 and determines whether the instruction received is a job completion instruction. The process transmits job completion instructions respectively in S1019, S1021, and S1023, in the session process (FIG. 24), described hereafter, performed by the control unit 31 of the function server 30. The job ID which corresponds to the job to be completed is transmitted along with the job startup instruction.

If the process determines in S224 that the instruction is a job completion instruction, the process proceeds to S225 terminates the job corresponding to the job ID, and releases the resources. Then, the process proceeds to S220 and, after waiting for a predetermined interval, returns to S205. Then, in S05, the process initializes the timer, starts the timer in S206 and proceeds to S207.

On the other hand, if the process determines in S224 that the instruction is not a job completion instruction, the process proceeds to S226 and determines whether the received instruction indicates "no instructions". In other words, the process determines whether the content transmitted in response to the "MFP instruction inquiry", transmitted in S213, indicates that there are no instructions.

If the process determines in S226 that the receive instruction indicates "no instructions", the process proceeds to S220 and, after waiting for a predetermined interval, returns to S205. Then, in S205, the process initializes the timer, starts the timer in S207, and proceeds to S207.

On the other hand, if the process determines in S226 that the received instruction does not indicate "no instructions", the process proceeds to S227 and determines whether the received instruction is a session completion instruction. The process transmits the session completion instruction in S1026 in the session process (FIG. 24), described hereafter, performed by the control unit 31 of the function server 30.

If the process determines in S227 that the instruction is a completion instruction, this session process is completed.

If the process determines that the received instruction is not the completion instruction (S227: NO), that is, if the received instruction is none of the job start-up instruction, job completion instruction, instruction representing "no instruction" and session completion instruction, the process proceeds to S228, and an instruction error process (e.g., a process displaying an error message on the display 52 of the operation panel 12a). Thereafter, the process finishes the session process.

Process After the Determination Process Immediately After Detection of First Timeout Error The determination process in S207 immediately after the detection of the first timeout error, since the maximum holding period set flag is set (i.e., on) in S219, the process determines the maximum holding period set flag is not on, and proceeds to S208.

In S208, the maximum holding period is set to zero, and the thus set maximum holding set period is transmitted to the function server 30 together with a "null inquiry (i.e., only a request but not an instruction inquiry)". In response to this, the function server executes a response process (i.e., a responding process to immediately respond to the request from the MFP 10) in accordance with the maximum holding period.

Next, in S209, the process receives the response from the function server 30 to the inquiry transmitted in S208. Then, in S210, the process stops the timer started in S206, and the measured time of the timer is substituted in T1. That is, by executing S208-S120, the process measures a communicating period T1 between the MFP 10 and the function server 30.

In S211, the process subtract the communicating period T1 from the time out period To stored in S218, and further subtracts twice of the communicating period T1 therefrom. The resultant value is, then set as the maximum holding period. That is, the maximum holding period=To−T1−2×T1. The reason why the maximum holding period is calculated as above is to set the maximum holding period as long as possible with preventing the communication error due to the timeout. As described above, the timeout period To is, in comparison with the timeout period actually set to the broadband router 2, slightly longer since the time necessary for communication is added. Therefore, if the timeout period To is used as is to represent the maximum holding period, the communication error would occur due to the timeout. By subtracting the communication period T1, the period is close to the actual timeout period. Further, by subtracting twice the communicating period T1, it is ensured that the maximum holding period becomes shorter than the timeout period actually set to the broadband router 2. With this configuration, the effect of preventing the communication error due to the timeout is further improved is further ensured.

In S212, the process sets the maximum holding period set flag, and releases the timeout recording flag.

In S213, the process transmits the "MFP instruction inquiry" to the function server together with the maximum holding period set in S211. Then, in the function server 30, a responding process in accordance with the maximum holding period. It should be noted that, in association with the MFP instruction inquiry, the session ID received in S202 is transmitted.

In S214, the process judges whether an instruction responding to the "MFP instruction inquiry" transmitted in S213 has been received. If the instruction has not been received (S214: NO), the process proceeds to S215, where the process judges whether the communication error has occurred (i.e., the response to the MFP instruction inquiry has not been received for more than the timeout period).

If the process determines that the communication error has not occurred (S215: NO), the process returns to S214. Thus, until the timeout is detected, the process keeps waiting the response to the MFP instruction inquiry. Since the maximum holding period is set shorter than the timeout period To, the response is normally received from the function server 30 before the timeout period To has elapsed. However, if the communication time period is elongated due to the communication condition or the like, the timeout period may elapse and the process determines that the communication error has occurred. In such a case, the process determines the occurrence of the communication error due to the timeout (S215: YES), and control proceeds to S216.

In S216, the process judges whether the timeout recording flag is set (on). Since the timeout recording flag has been released in S212, the process determines that the timeout recording flag is off (S216: NO), and returns to S231. Thus, when the communication error due to the timeout occurs, the MFP instruction inquiry will be transmitted to the function server 30 again.

If the instruction has been received (S214: YES), the process proceeds to S221 of FIG. 15, which therefore proceeds in a manner similar to the "determining process when the timeout error has not been detected" described above.

Process After Maximum Holding Period Has Been Set

Since the maximum holding period is set in S212, when step S207 is executed thereafter, the process determines that the maximum holding period set flag is on (S207: YES), the process proceeds to S213.

In S213, the process transmits the "MFP instruction inquiry" which is an inquiry directed to the MFP 10 is transmitted to the function server 30 together with the maximum holding period (having a value similar to the previous one) set in S211. Then, the function server 30 executes a responding operation in accordance with the maximum holding period. It should be noted that, in association with the MFP instruction inquiry, the session ID received in S202 is also transmitted.

Thereafter, the process proceeds in a manner similar to that in the process after the first timeout error has been detected, which is described above.

As above, according to the session process, by setting the maximum holding period to a sufficiently large value in comparison with the timeout period. With this configuration, the communication error due to the timeout is intentionally caused to measure the timeout period To. Further, by setting the maximum holding period to zero, the communication period T1 is obtained. Then, based on the thus obtained values, the maximum holding period is automatically set, which is transmitted to the function server 30. With this configuration, the waiting time period for receipt of the instruction from the function server 30 is shortened with preventing the communication error.

Designated Job Startup Process Executed by MFP 10

The startup process of a designated job which is started in S223 of the session process (FIG. 15) is explained below, referring to the flowchart in FIG. 16.

When the designated job startup process is started, the process determines in S301 whether the job designated in the job startup instruction is a UI job.

Then, if the process determines that the job designated in the job startup instruction is the UI job, the process proceeds to S302 and, after job ID and job communication destination URL are given and the UI job is started, the process completes the designated job startup process.

On the other hand, if the process determines that the job designated in the job startup instruction is not the UI job, the process proceeds to S303 and determines whether the job designated in the job startup instruction is a scan job.

If the process determines in S303 that the job designated in the job startup instruction is not a scan job, the process proceeds to S304 and determines whether the job designated by the job startup instruction is a voice job.

If the process determines in S304 that the job designated in the job startup instruction is not a voice job, the process proceeds to S306.

On the other hand, if the process determines in S303 that the job designated in the job startup instruction is a scan job or determines in S304 that it is a voice job, the process proceeds to S305 and, after job ID and job communication destination URL are given and the UI job is started, completes the designated job startup process.

In S306, the process determines whether the job designated in the job startup instruction is a print job.

If the process determines in S306 that the job designated in the job startup instruction is not a print job, the process proceeds to S307 and determines whether the job designated in the job startup instruction is a speaker job.

If the process determines in S307 that the job designated in the job startup instruction is not a speaker job or, in other words, the process determines that the job designated in the job startup instruction is neither a UI job, a scan job, a voice job, a print job, or a speaker job, the process completes the startup process of this designated job.

On the other hand, if the process determines in S306 that the job designated in the job startup instruction is a print job or determines in S307 that it is a speaker job, the process proceeds to S308 and, after job ID and job communication destination URL are given and the output job is activated, completes the designated job startup process.

UI Job by MFP 10

Figure 16:
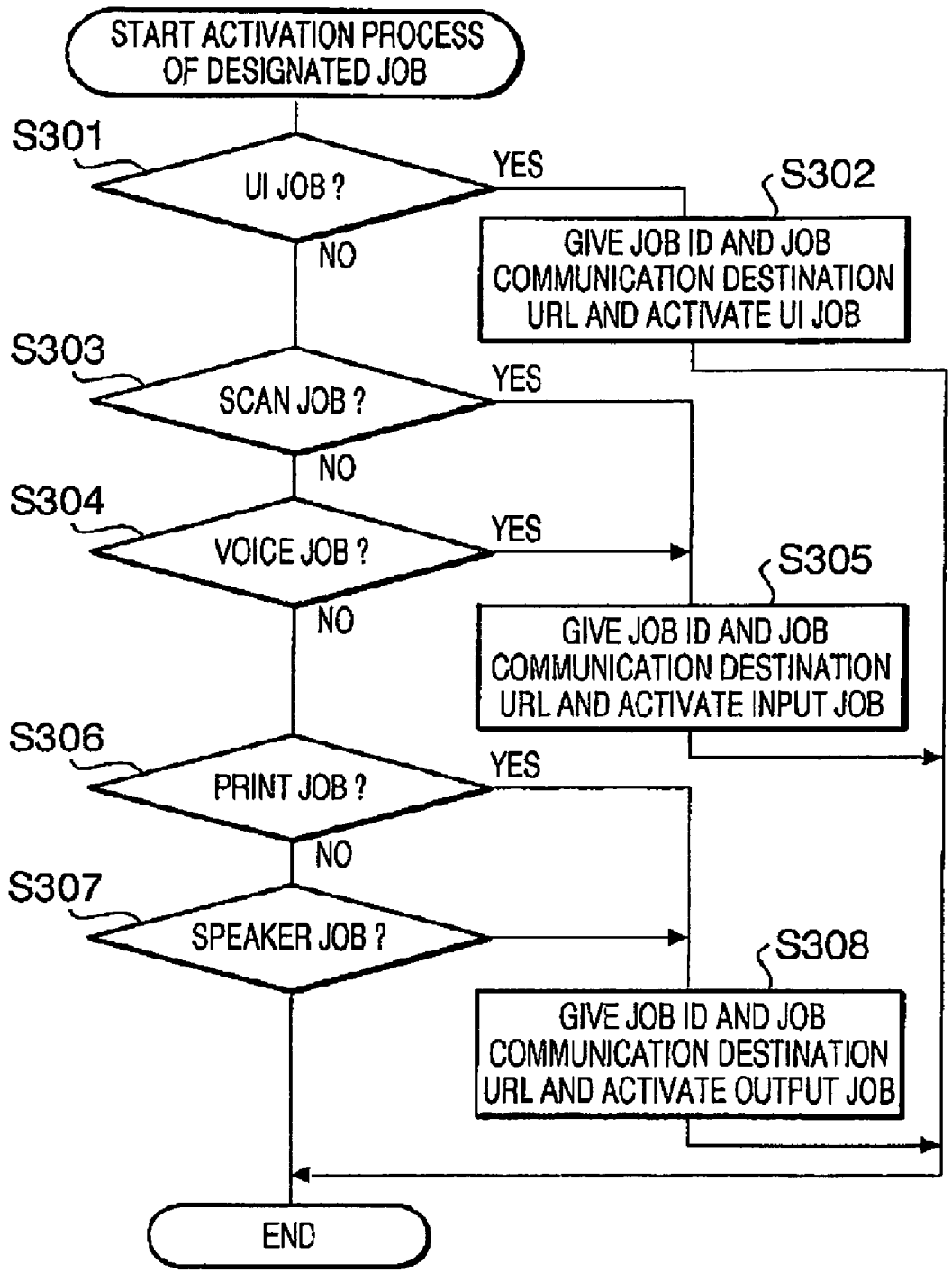
FIG. 16 shows a flowchart illustrating a designated job startup process executed by the MFP according to aspects of the invention.
Figure 17:
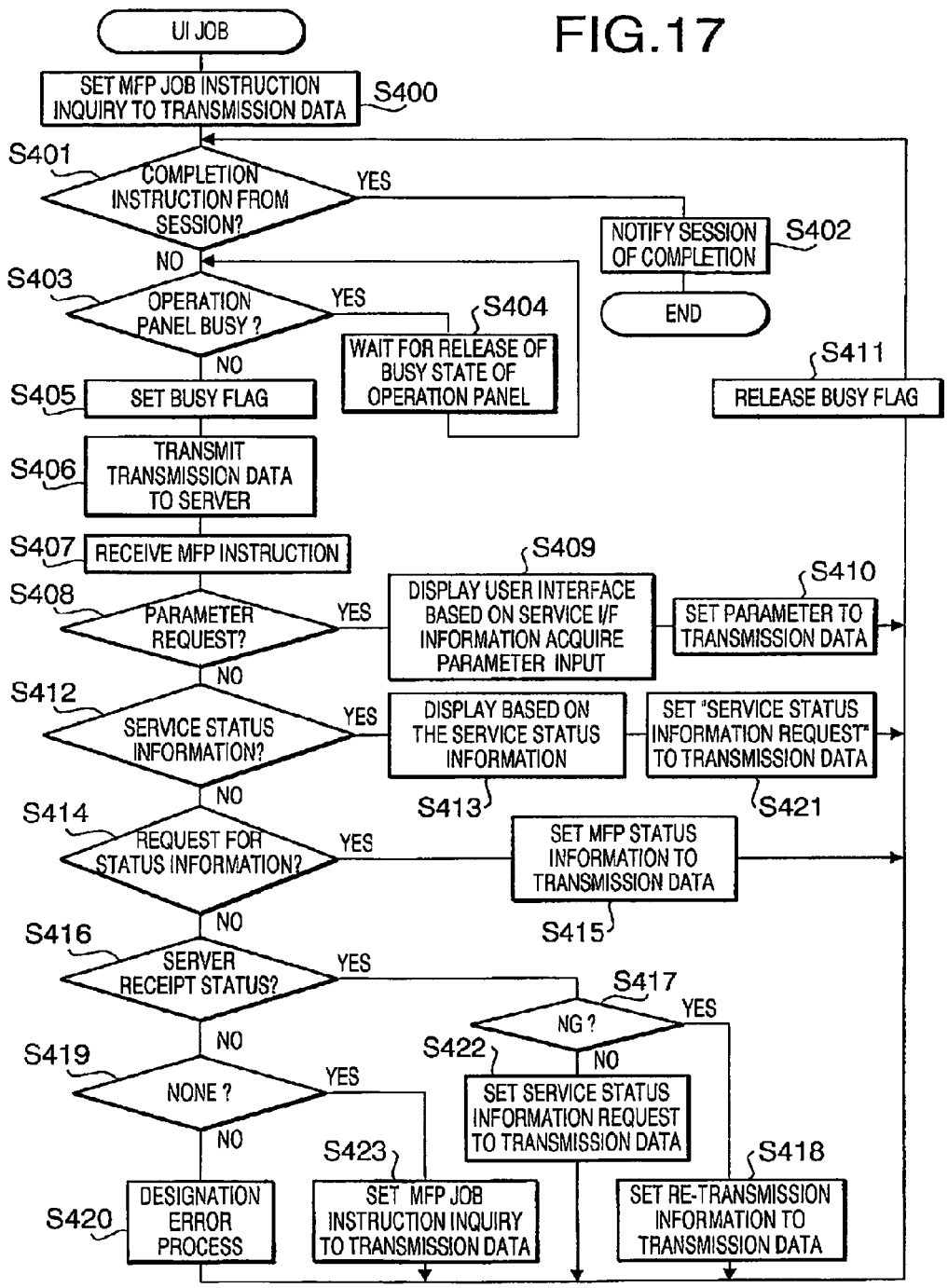
FIG. 17 shows a flowchart illustrating a UI job executed by the MFP according to aspects of the invention.

UI job activated such as to operate in parallel with the session process in S302 in the designated job startup process (FIG. 16) is explained below, using the flowchart in FIG. 17.

When the UI job is started, first, in S400, the process writes an MFP job instruction inquiry, which is an inquiry into instructions to the MFP 10, to a predetermined area as transmission data. This transmission data is information used in the process in S406, described hereafter, and the information written as this data is transmitted to the function server 30 with the session ID and the job ID. The storage area for the transmission data is provided in a predetermined area in the RAM, not shown, provided within the control unit in the MFP 10.

Next, the process determines in S401 whether there was a completion instruction from the session. The process outputs completion instruction from the session in S210 in the session process (FIG. 15) performed by the control unit 11 in the MFP 10.

If the process determines in S401 that there was a completion instruction from the session, the process proceeds to S402 and, after giving notification of completion to the session, completes this UI job.

On the other hand, if the process determines that there is no completion instruction from the session, the process proceeds to S403 and determines whether the operation panel 12*a* is busy. Specifically, based on the busy flag, FU, indicating whether the operation panel 12*a* is busy, the process determines that the operation panel 12*a* is busy if the busy flag FU is set and not busy if the busy flag Fu is released.

If the process determines in S403 that the operation panel 12*a* is busy, the process proceeds to S404 and, after waiting until the operation panel 12*a* is released from its busy state, returns to S403.

On the other hand, if the process determines that the operation panel 12*a* is not busy, the process proceeds to S405 and raises the busy flag FU.

Then, in S406, the process transmits the information written as the foregoing transmission data to the function server 30, along with the session ID and job ID.

Next, in S407, the process receives the MFP instruction which is returned in response to the information transmitted in S406.

Then, the process determines in S408 whether the MFP instruction received in S407 is a parameter request. The process transmits the parameter request in S1102 in the UI job process (FIG. 25), described hereafter, which is performed by the control unit in the function server 30. Further, when the parameter request is made, the service I/F information 36 is also transmitted.

If the process determines in S408 that the MFP instruction is a parameter request, the process proceeds to S409, and displays the parameter input screen on the display 52 of the operation unit 12a to allow the user to input the parameters. Then, the process proceeds to S410 and stores the input parameters, as the transmission data, in the transmission data storing area so as to transmit the input parameters to the function server 30. Then, the process proceeds to S411, where the process releases the busy flag Fu, and returns to S401. The parameters stored as the transmission data is transmitted to the function server 30 in S406, if there is no completion instruction from the session (S401: NO) and the operation panel is not in the busy state (S403: NO).

On the other hand, if the process determines in S408 that the MFP instruction is not a parameter request, the process proceeds to S412 and determines whether the MFP instruction received in S407 is a service status information. The process transmits the service status information in S1113 in the UI job process (FIG. 25), described hereafter, which is performed by the control unit 31 in the function server 30. Error code and service I/F information 36 are transmitted along with the service status information.

If the process determines in S412 that the MFP instruction is a service status information, the process proceeds to S413 and displays information based on this service status information in the display 52 of the operation panel 12a. Then, the process proceeds to S421 and writes the service status information request to the transmission data storage area as transmission data, in order to transmit service status information request, which is an instruction requesting for information on the operation status of service run by the function server 30, to the function server 30. Then, the process proceeds to S411 and, after releasing the busy flag FU, returns to S401. The process subsequently transmits the service status information request written as transmission data to the function server 30 in S406 when there is no completion instruction from the session (S401: NO) and the operation panel is not busy (S403: NO).

On the other hand, if the process determines in S412 that the MFP instruction is not a service status information, the process proceeds to S414 and determines whether the MFP instruction received in S407 is a status information request.

If the process determines in S414 that the MFP instruction is a status information request, the process proceeds to S415 and writes the MFP status information to the transmission data storage area as transmission data, in order to transmit MFP status information, which is information related to the status of the MFP 10, to the function server 30. Then, the process proceeds to S411 and, after the busy flag Fu is released, returns to S401. The process subsequently transmits the MFP status information written as transmission data to the function server 30 in S406 when there is no completion instruction from the session (S401: NO) and the operation panel is not busy (S403: NO).

On the other hand, if the process determines in S414 that the MFP instruction is not a status information request, the process proceeds to S416 and determines whether the MFP instruction received in S407 is a server reception status which is a notification indicating whether the function server 30 was able to receive information from the MFP 10 normally.

If the process determines in S416 that the MFP information is a server reception status, the process proceeds to S417 and determines whether the content of this server reception status indicates abnormal reception (NG).

Then, if the process determines in S417 that the content indicates abnormal reception (NG), the process proceeds to S418 and writes information to be re-transmitted to the transmission data storage area as transmission data, in order to transmit previously transmitted information again. Then, the process proceeds to S411 and, after the busy flag Fu is released, returns to S401.

On the other hand, if the process determines in S417 that the content does not indicate abnormal reception (NG), the process proceeds to S411 after writing service status information request the transmission data storage area as transmission data, in order to transmit the service status information request, which is an instruction requesting for information on the operation status of the service, in S422, and, after releasing the busy flag Fu, returns to S401.

The process subsequently transmits information to be re-transmitted, which is written as transmission data in S418 and S422, the service status information request, to the function server 30 in S406 when there is no completion instruction from the session (S401: NO) and the operation panel is not busy (S403: NO).

If the process determines in S416 that the MFP instruction is not a server reception status, the process proceeds to S419 and determines whether the MFO instruction received in S407 indicates "no instruction". In other words, the process determines whether the content returned in response to the "MFP instruction inquiry", transmitted in S406, indicates that there are no instructions.

If the process determines in S419 that the MFP instruction received in S407 indicates "no instructions", the process proceeds to S411 after writing MFP job instruction inquiry to the transmission data storage area as transmission data, in order to transmit the MFP job instruction inquiry, which is an inquiry into instructions to the MFP 10, in S422, and, after releasing the busy flag Fu, returns to S401. The process subsequently transmits the MFP job instruction inquiry written as transmission data to the function server 30 in S406 when there is no completion instruction from the session (S401: NO) and the operation panel is not busy (S403: NO).

On the other hand, if the process determines in S419 that the MFP instruction received in S407 does not indicate "no instruction", the process proceeds to S420 and performs a designation error process. Then, the process proceeds to S411 and, after releasing the busy flag Fu, returns to S401.

Input Job by MFP 10

Figure 18:
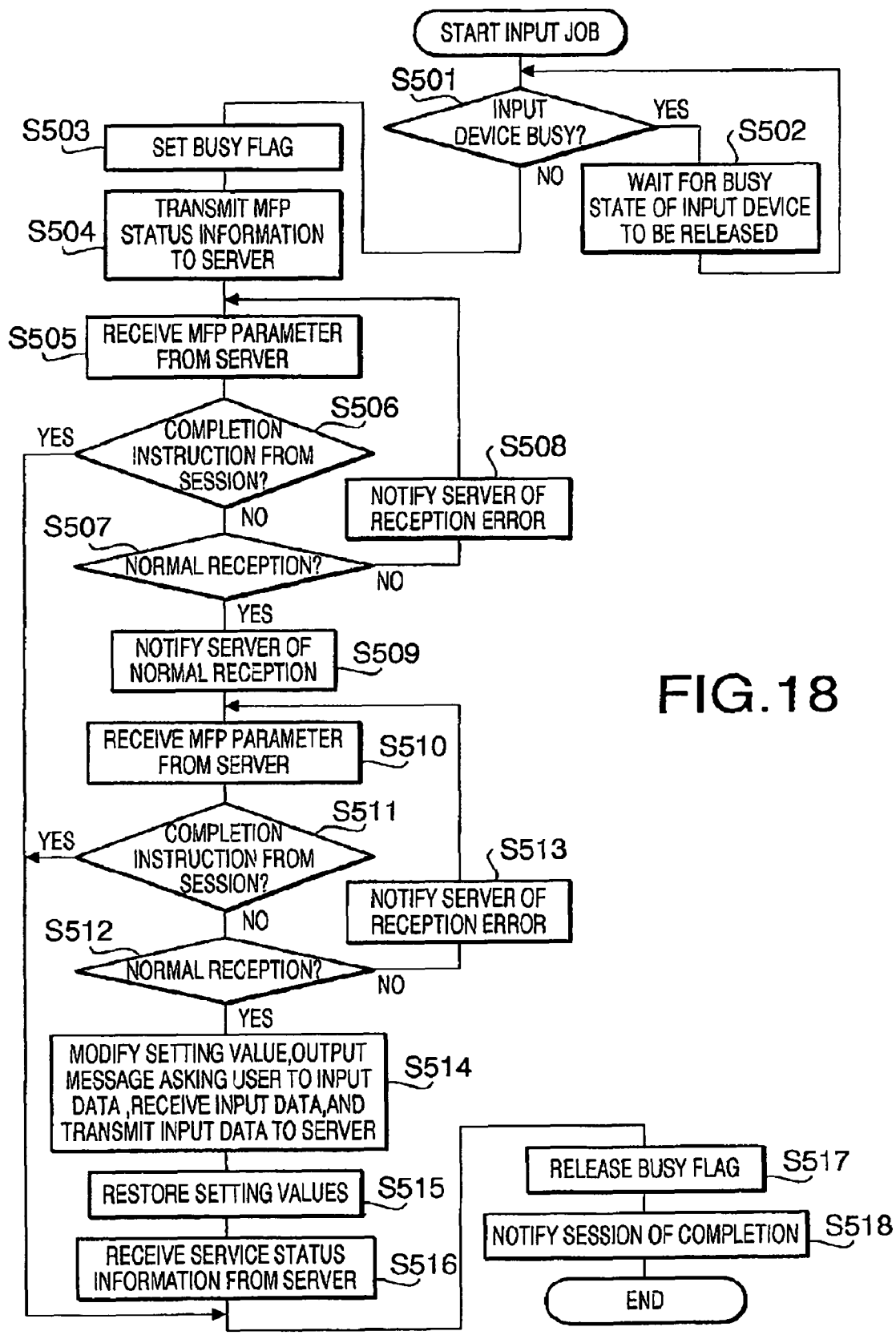
FIG. 18 shows a flowchart illustrating an input job executed by the MFP according to aspects of the invention.

Input job which is activated such as to operate in parallel with the session process and UI job process in S305 in the startup process of a designated job (FIG. 16) is explained below, with reference to the flowchart shown in FIG. 18.

When input job is started, first, the process determines in S501 whether the input device (the reading unit 13 when the service is related to image data generated by the reading unit 13, and sound input unit 17 when the service is related to sound data generated by the sound input unit 17) is busy. Specifically, the process determines the input device to be busy when the busy flag Fi is set and not busy when the busy flag Fi is released, based on the busy flag Fi which indicates whether the input device is in a busy state.

If the process determines in S501 that the input device is busy, the process proceeds to S502 and, after waiting until the input device is released from its busy state, returns to S501.

On the other hand, if the process determines in S502 that the input device is not busy, the process proceeds to S503 and sets the busy flag Fi.

Next, the process transmits MFP status information to the function server 30 in S504. Session ID, job ID, and error code are transmitted along with the MFP status information.

Then, in S505, the process receives the MFP parameters returned from the function server 30 in response to the "MFP status information", transmitted in S504. The process transmits MFP parameter in S1203 in the scan job process (FIG. 26), described hereafter, which is performed by the control unit 31 in the function server 30.

In S506, the process determines whether there was a completion instruction from the session. The process outputs the completion instruction from the session in S210 in the session process (FIG. 15) performed by the control unit 11 in the MFP 10.

If the process determines in S506 that there is no completion instruction from the session, the process proceeds to S507 and determines whether the MFP parameters were received normally in S505.

If the process determines in S507 that the MFP parameters were not received normally, the process proceeds to S508, notifies the function server 30 of abnormal reception (NG) as MFP reception status, which gives notification on whether the MFP 10 has received information from the function server 30 normally, and returns to S505. Session ID and job ID are transmitted along with the MFP reception status.

On the other hand, if the process determines in S507 that the MFP parameters were received normally, the process proceeds to S509 and notifies the function server 30 of normal reception (OK) as the MFP reception status.

Next, the process receives input data request from the function server 30 in S510. The process transmits input data request in S1209 in the scan job process (FIG. 26), described hereafter, which is performed by the control unit 31 in the function server 30.

Then, in S511, the process determines whether there was a completion instruction from the session, as in S506.

If the process determines that there was no completion instruction from the session, the process proceeds to S512 and determines whether the input data request was received normally in S510.

If the process determines in S512 that the input data request was not received normally, the process proceeds to S513, notifies the function server 30 of abnormal reception (NG), and returns to S510.

On the other hand, if the process determines in S512 that the input data request was received normally, the process proceeds to S514, sets parameters and performs an outputting operation asking the user to perform input operations (for example, display messages such as "Set manuscript and press OK key" and "Pick up receiver and speak" in the display 52 of the operation panel 12a), and transmits input data entered as such to the function server 30, sequentially. As the input data, data input by reading image data stored in a semi-conductor memory such as a memory card, input of image data stored in memory unit 16, etc. Session ID and job ID are transmitted as the data is input.

Then, in S515, the process returns the setting of the input device changed in S514 to the original values.

In S516, after receiving service status information from the function server 30, the process proceeds to S517. The process transmits the service status information in S1208 and S1212, respectively, in the scan job process (FIG. 29), described hereafter, which is performed by the control unit 31 in the function server 30.

On the other hand, if the process determines in S506 or S511 that there was a completion instruction from the session, the process proceeds directly to S517.

In S517, the process releases the busy flag Fi set in S503.

Then, after notifying the session of completion in S518, the process completes the input job.

Output Job by MFP 10

Figure 19:
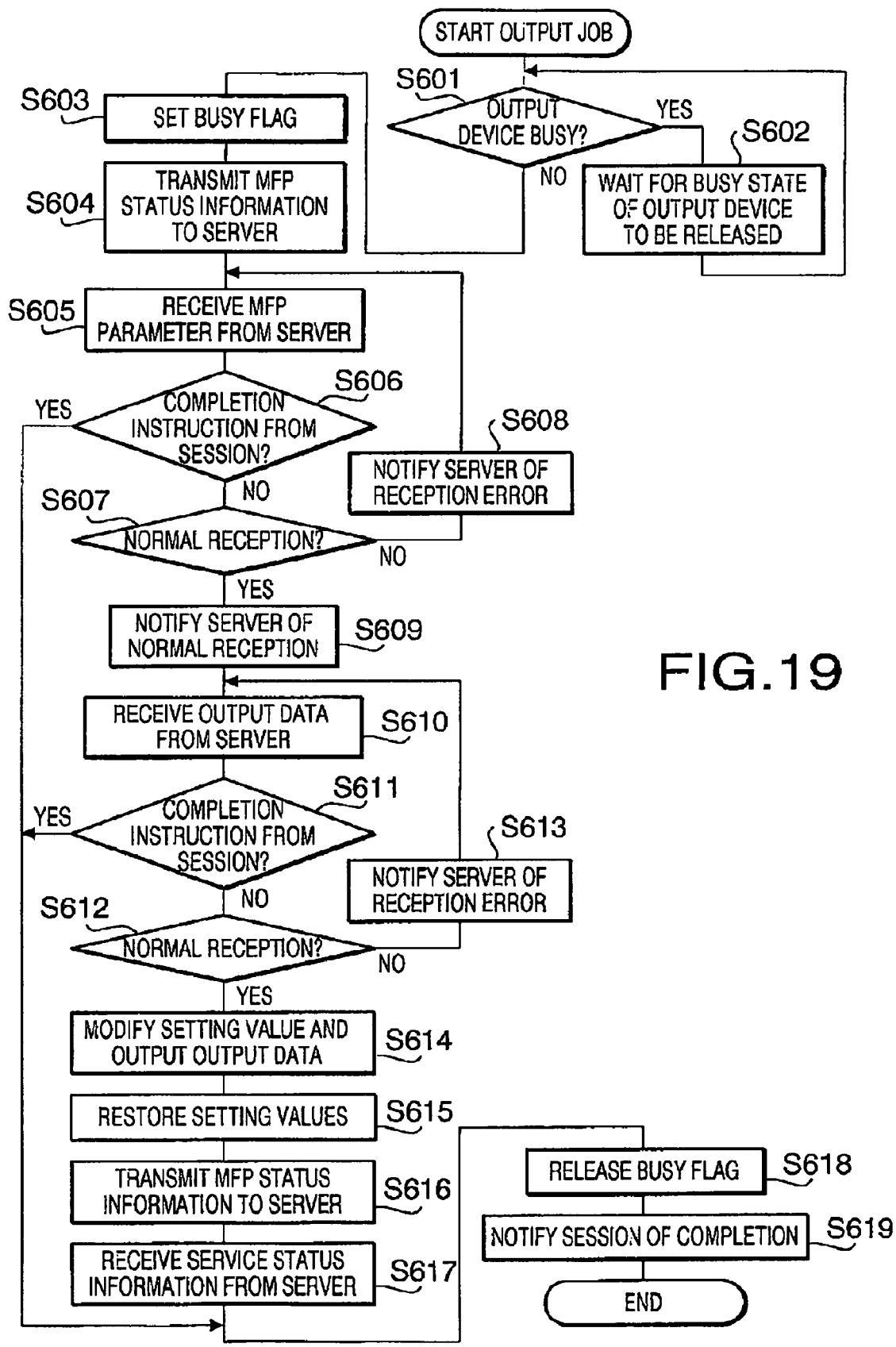
FIG. 19 shows a flowchart illustrating an output job executed by the MFP according to aspects of the invention.

Output job which is activated such as to operate in parallel with the session process and UI job process in S308 in the startup process of a designated job (FIG. 16) is explained below, using the flowchart in FIG. 19.

When output job is started, first, the process determines in S601 whether the output device (the recording unit 14 when the service is related to image data expressing image printed by the recording unit 13, and sound output unit 17 when the service is related to sound data output the sound output unit 17) is busy. Specifically, the process determines the output device to be busy when the busy flag Fo is set and not busy when the busy flag Fo is released, based on the busy flag Fo which indicates whether the output device is in a busy state.

If the process determines in S601 that the output device is busy, the process proceeds to S602 and, after waiting until the output device is released from its busy state, returns to S601.

On the other hand, if the process determines in S602 that the output device is not busy, the process proceeds to S603 and sets the busy flag Fo.

Next, the process transmits MFP status information to the function server 30 in S604. Session ID, job ID, and error code are transmitted along with the MFP status information.

Then, in S605, the process receives the MFP parameters returned from the function server 30 in response to the "MFP status information", transmitted in S604. The process transmits MFP parameter in S1303 in the print job process (FIG. 31), described hereafter, which is performed by the control unit 31 in the function server 30.

In S606, the process determines whether there was a completion instruction from the session. The process outputs the completion instruction from the session in S210 in the session process (FIG. 15) performed by the control unit 11 in the MFP 10.

If the process determines in S606 that there is no completion instruction from the session, the process proceeds to S607 and determines whether the MFP parameters were received normally in S605.

If the process determines in S607 that the MFP parameters were not received normally, the process proceeds to S608, notifies the function server 30 of abnormal reception (NG) as MFP reception status, which gives notification on whether the MFP 10 has received information from the function server 30 normally, and returns to S605. Session ID and job ID are transmitted along with the MFP reception status.

On the other hand, if the process determines in S607 that the MFP parameters were received normally, the process proceeds to S609 and notifies the function server 30 of normal reception (OK) as the MFP reception status.

Next, the process receives output data (for example, image data and sound data) from the function server 30 in S610. The process transmits output data in S1309 in the print job process (FIG. 27), described hereafter, which is performed by the control unit 31 in the function server 30.

Then, in S611, the process determines whether there was a completion instruction from the session, as in S606.

If the process determines in S611 that there was no completion instruction from the session, the process proceeds to S612 and determines whether the output data was received normally in S610.

If the process determines in S612 that the output data was not received normally, the process proceeds to S613, notifies the function server 30 of abnormal reception (NG), and returns to S610.

On the other hand, if the process determines in S612 that the output data was received normally, the process proceeds to S614, sets parameters and outputs output data (for example, print image expressed by image data and output voice expressed by sound data).

Then, in S615, the process returns the setting of the output device changed in S614 to the original values.

In S616, the process transmits MFP status information to the function server 30. Session ID, job ID and error code are transmitted along with the MFP status information.

Next, after receiving the service status information from the function server 30 in S617, the process proceeds to S618. The process transmits the service status information in S1308 and S1312, respectively, in the print job process (FIG. 27), described hereafter, which is performed by the control unit 31 in the function server 30.

On the other hand, if the process determines in S606 or S611 that there was a completion instruction from the session, the process proceeds directly to S618.

In S618, the process releases the busy flag Fo set in S603.

Then, after notifying the session of completion in S619, the process completes the output job.

Directory Server Process by Directory Server 20

Figure 20:
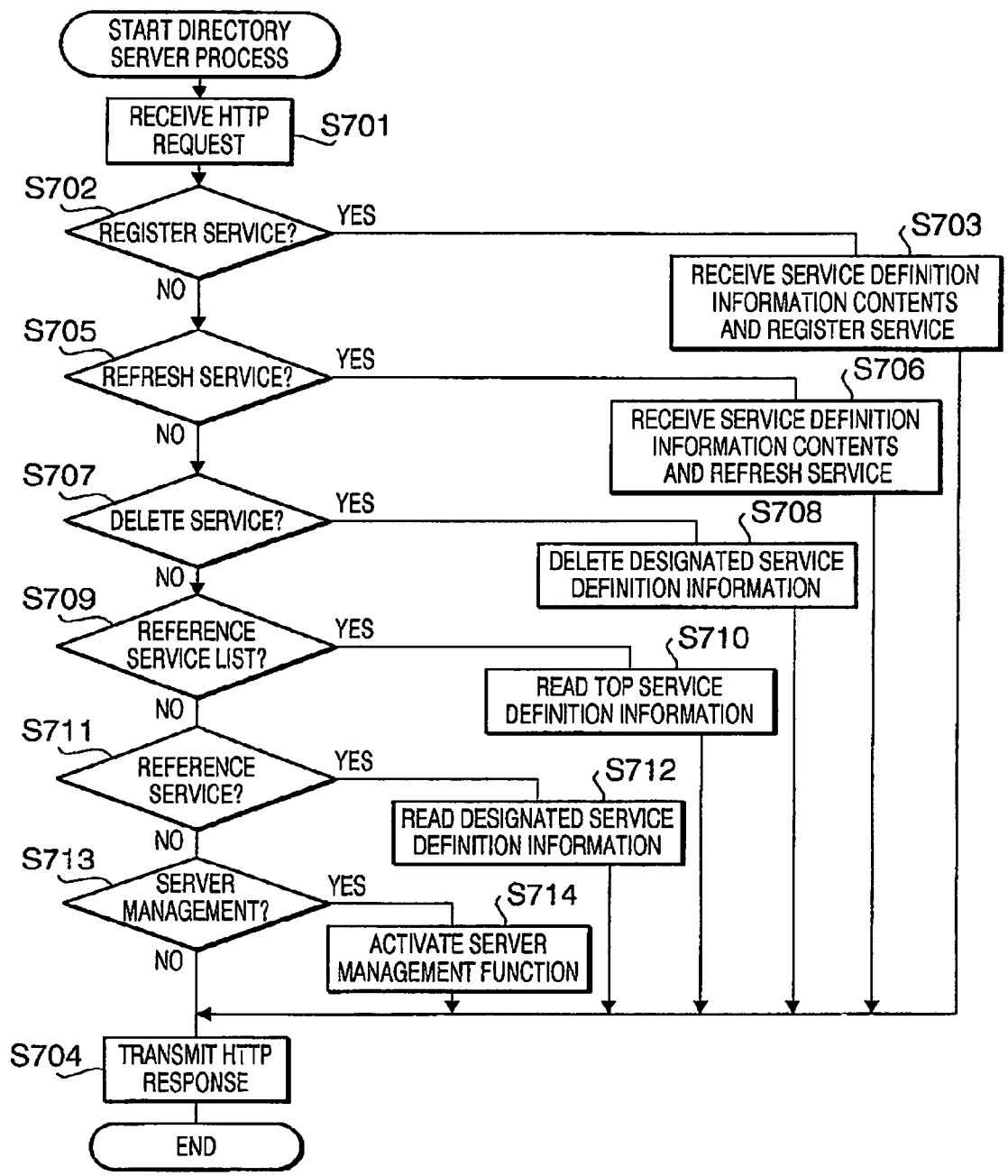
FIG. 20 shows a flowchart illustrating a directory server process executed by a directory server according to aspects of the invention.

Directory server process which is performed by the control unit 21 in the directory server 20 is explained below, with reference to the flowchart shown in FIG. 20. The directory server processing is started when the directory server 20 receives an HTTP request.

When the directory server process is started, first, the process receives the HTTP request in S701.

Next, the process determines in S702 whether the HTTP request received in S701 is a service registration instruction. The process transits the service registration instruction in S1406, in the service addition process (FIG. 28), described hereafter, which is performed by the control unit 31 in the function server 30.

If the process determines in S702 that the HTTP request is a service registration instruction, the process proceeds to S703, receives the contents of the service definition information 25, and registers the service. Specifically, information regarding a new service is registered to the service definition information 25, stored in the service definition information memory unit 24 of the memory unit 23. Then, the process proceeds to S704 and, after the HTTP response is transmitted, completes the directory server process.

On the other hand, if the process determines in S702 that the HTTP request is not a service registration instruction, the process proceeds to S705 and determines whether the HTTP request received in S701 is a service renewal instruction (for example, change in the service request destination URL). The process transmits the service renewal instruction in S1503 in the service alteration process (FIG. 29), described hereafter, which is performed by the control unit 31 in the function server 30.

If the process determines in S705 that the HTTP request is a service renewal instruction, the process proceeds to S706, receives the contents of the service definition information 25 and renews the service. Specifically, information regarding relevant services in the service definition information 25 which is stored in the service definition information memory unit 24 of the memory unit 23 is renewed. Then, the process proceeds to S704 and, after transmitting the HTTP response, completes the directory server process.

On the other hand, if the process determines in S705 that the HTTP request is not a service renewal instruction, the process proceeds to S707 and determines whether the HTTP request received in S701 is a service deletion instruction. The process transmits the service deletion instruction in S1602 in the service deletion process (FIG. 30), described hereafter, which is performed by the control unit 31 in the function server 30.

If the process determines in S707 that the HTTP request is a service deletion instruction, the process proceeds to S708 and deletes the designated service definition information 25. Specifically, information regarding relevant services in the service definition information 25 which is stored in the service definition information memory unit 24 of the memory unit 23 is deleted. Then, the process proceeds to S704 and, after the HTTP response is transmitted, completes the directory server process.

On the other hand, if the process determines in S707 that the HTTP request is not a service deletion instruction, the process proceeds to S709 and determines whether the HTTP request received in S701 is a service list reference request. The process transmits a service list reference request in S106 in the foregoing MFP process (FIG. 12) which is performed by the control unit 11 in the MFP 10.

If the process determines in S709 that the HTTP request is a service list reference request, the process proceeds to S710 and reads the top service definition information 25 from the service definition information memory unit 24 in the memory unit 23. Then, the process proceeds to S704 and, after transmitting the HTTP response which includes the read service definition information 25, completes the directory server process.

On the other hand, the process determines in S709 that the HTTP request is not a service list reference request, the process proceeds to S711 and determines whether the HTTP request received in S710 is a service reference request. The process transmits a service reference request in S115 in the foregoing MFP process (FIG. 12) which is performed by the control unit 11 in the MFP 10.

If the process determines in S711 that the HTTP request is a service reference request, the process proceeds to S712 and reads the service definition information 25 designated by the ID or URL from the service definition information memory in the memory unit 23. Then, the process proceeds to S704 and, after transmitting the HTTP response which includes the read service definition information 25, completes the directory server process.

On the other hand, if the process determines in S711 that the HTTP request is not a service reference request, the process proceeds to S713 and determines whether the HTTP request received in S701 is a server management instruction for managing the directory server 20. The explanation regarding the process for transmitting the server management instruction is omitted because it is not directly related to the present invention.

If the process determines in S713 that the HTTP request is a server management instruction, the process proceeds to S714 and boots the server management function. Then, the process proceeds to S704 and, after transmitting the HTTP response, completes the directory server process.

On the other hand, of the process determines in S713 that the HTTP request is not a server management instruction, the process proceeds directly to S704 and, after transmitting the HTTP response, completes the directory server process.

Function Server Process by the Function Server 30

Figure 21:
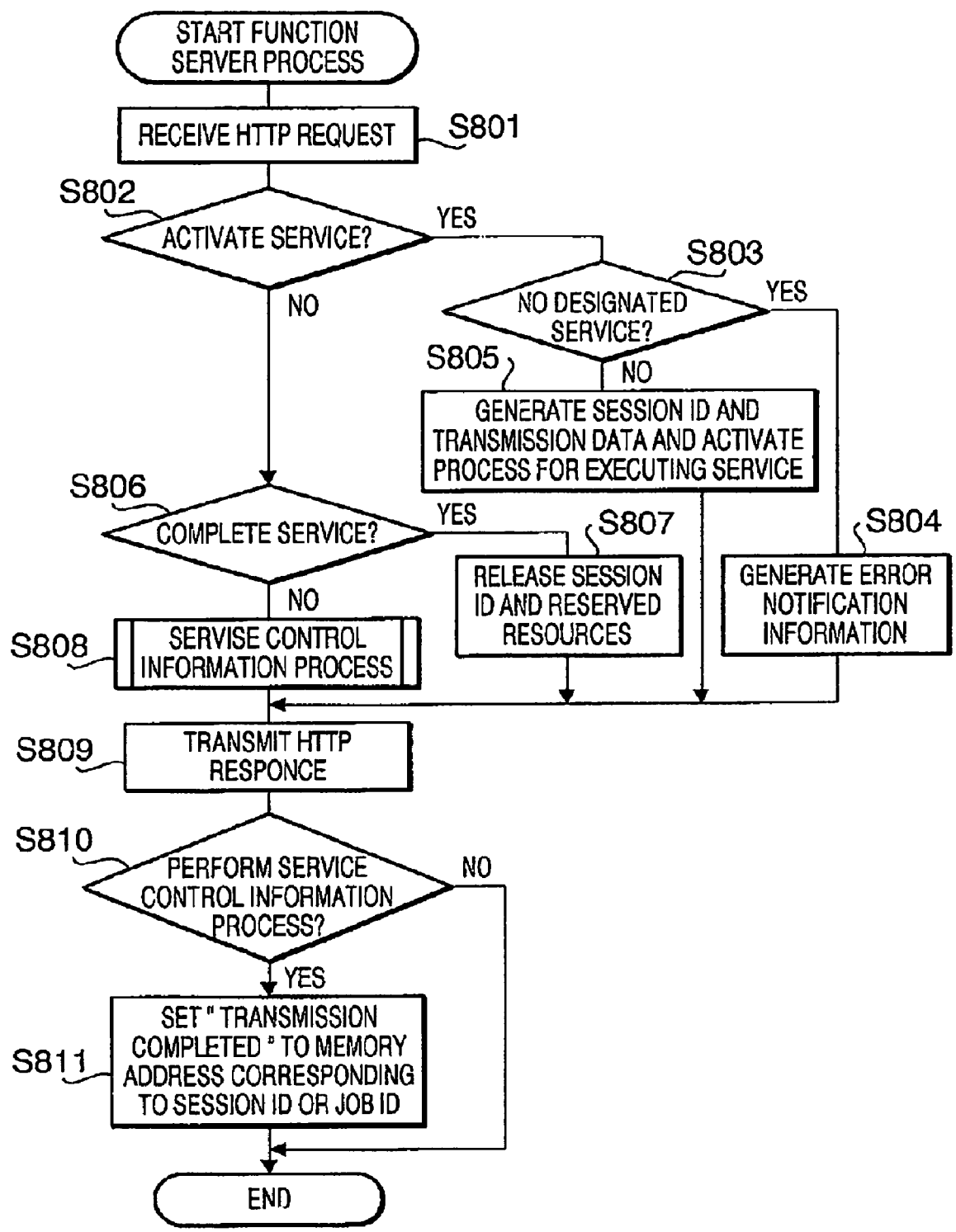
FIG. 21 shows a flowchart illustrating a function server process executed by a function server according to aspects of the invention.

Function server process which is performed by the control unit 31 in the function server 30 is explained below, using the flowchart in FIG. 21. The function server process is started when the function server 30 receives the HTTP request.

When the function server process is started, first, the process receives a HTTP request in S801.

Next, the process determines, in S802, whether the HTTP request received in S801 is a service boot instruction. The process transmits a service boot instruction in S201 in the foregoing session process (FIG. 14) which is performed by the control unit 11 in the MFP 10.

If the process determines that the instruction is the service startup instruction, the process proceeds to S805, generates the session ID and transmits the transmission data. Further, the process starts a process for performing the service (specifically, the session process (see FIG. 23) is started). Then, the process proceeds to S809.

If the process determines in S802 that the HTTP request is not a service boot instruction, the process proceeds to S806 and determines whether the HTTP request received in S801 is a service completion instruction. It should be noted that the service completion instruction is transmitted from the MFP 10 according to the termination instruction from the user (for example, pressing of the cancel key 51 when performing service), received by the MFP 10 by an interruption process.

If the process determines in S806 that the HTTP request is a service completion instruction, the process proceeds to S807, releases the session ID and the secured resources, and proceeds to S809.

Figure 22:
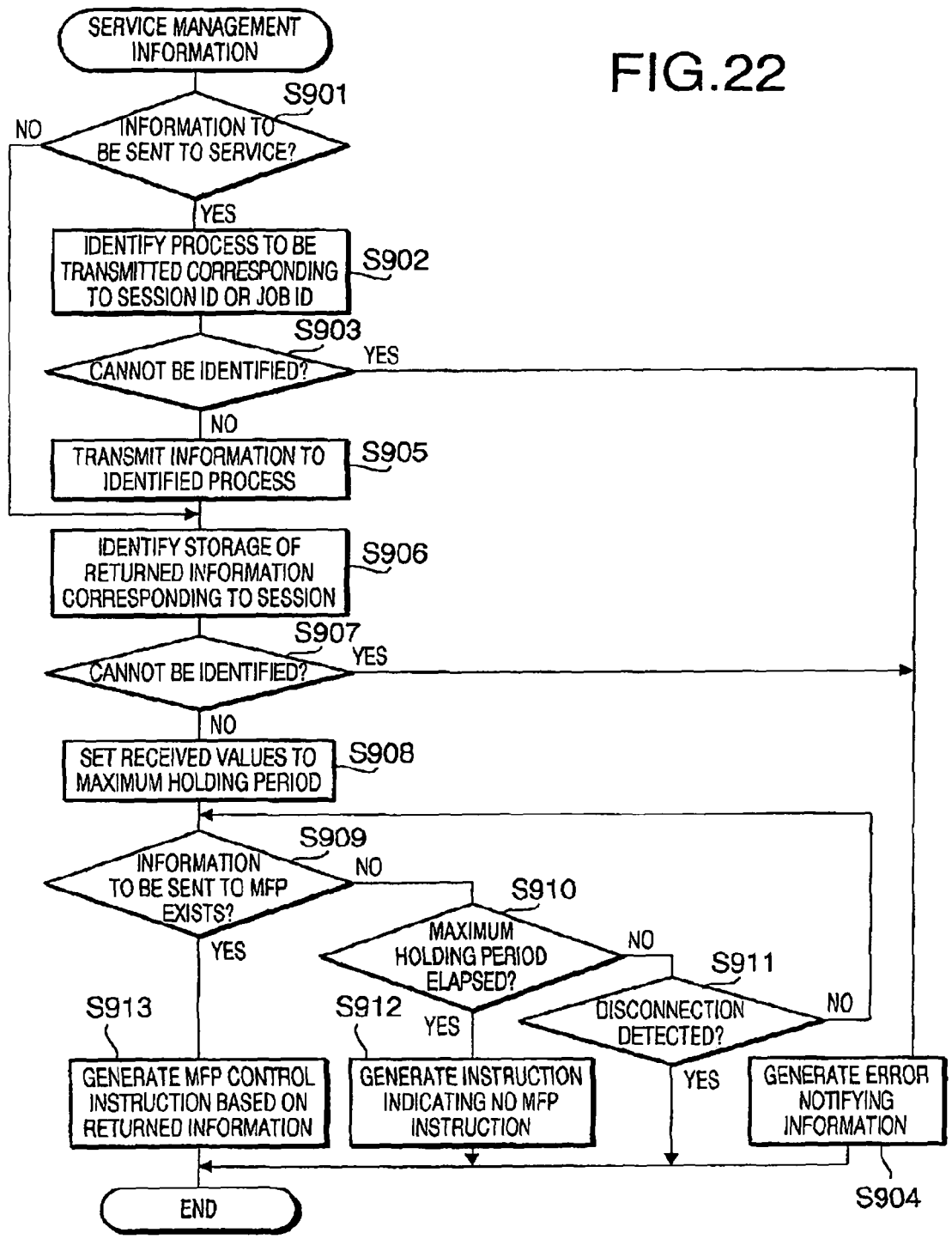
FIG. 22 shows a flowchart illustrating a service control information process executed by the function server according to aspects of the invention.

On the other hand, if the process determines in S806 that the HTTP request is not a service completion instruction, the process proceeds to S808 and, after performing the service control information process, proceeds to S809. The service control information process is explained in detail hereafter (FIG. 22).

In S809, a transmission process of HTTP response which includes the generated information is performed.

Then, the process determines, in S810, whether the service control information process in S808 was performed.

If the process determines in S810 that the service control information process has been performed, the process proceeds to S811 and, after setting "transmission completed" to the memory address corresponding to the session ID or job ID, completes the function server process.

On the other hand, if the process determines in S810 that the service control information process has not been performed, the function server process is immediately completed.

Service Control Information by the Function Server 30

The detailed contents of the service control information process performed in S808 in the function server process (FIG. 21) are explained below, using the flowchart in FIG. 22.

When the service control information process is started, first, the process determines in S901 whether information to be transmitted to the service exists. Specifically, the process determines whether the HTTP request received in S801 in the function server process (FIG. 21) includes information regarding service (session or job).

If the process determines in S901 that information to be transmitted to the service exists, the process proceeds to S902 and specifies a process to be transmitted which corresponds to the session ID or the job ID. In other words, the process which becomes the transmission destination of the information included in the received HTTP request is specified.

Next, the process determines in S903 whether the process can be specified.

If the process determines in S903 that the process cannot be specified due to some sort of abnormality, the process proceeds to S904 and, after generating error notification information, completed the service control information process.

On the other hand, if the process determines is S903 that the process can be specified, the process proceeds to S905 and, after transmitting information to the specified process, returns to S906.

If the process determines in S901 that there is no information to be transmitted to the service, the process proceeds directly to S906.

The storage memory for returned information corresponding to the session ID or the job ID is specified in S906.

Next, the process determines whether the storage memory can be specified.

If the process determines in S907 that the storage memory cannot be specified, the process proceeds to S904 and, after generating error notification information, completes the service control information process.

On the other hand, if the process determines in S907 that the storage memory can be specified, the process proceeds to S908. In S908, the process sets the maximum holding period to the value of the maximum holding period that is received from the MFP 10. It should be noted that the value of the maximum holding period is transmitted at S208 or S213 of the session process (FIG. 14) executed by the control unit 31 of the function server 30.

Next, in S909, the process judges whether there is information (i.e., command to be transmitted to the MFP 10) to be transmitted to the MFP 10. If it is determined that there is no information to be sent to the MFP 10, the process proceeds to S910, where the process receives the request from the MFP 10 and judges whether the maximum holding period (set in S908) has passed.

If it is determined that the maximum holding period has not elapsed (S910: NO), the process proceeds to S911 and judges whether disconnection is detected. It should be noted that whether the connection is cut or not is detected by using a program for monitoring connection/disconnection at an application level.

If the disconnection is detected (S911: YES), the process finishes the service control information process. If it is determined that the disconnection has not been detected, the process returns to S909.

In S910, if it is determined that the maximum holding period has elapsed, the process proceeds to S912, where the process generates information indicating that there is no MFP instruction, and finishes the service control information.

If it is determined that there is information to be transmitted to the MFP 10, the process proceeds to S913, where the process generates the MFP control instruction based on the return information, and then finishes the service control information process.

As above, in the service control information process, if there is no command to be transmitted to the MFP 10, the process does not transmit a response, in response to the request from the MFP 10, until the maximum holding period has elapsed. However, if a command is generated during the period, the response is made immediately.

Session Process by Function Server 30

Figure 23:
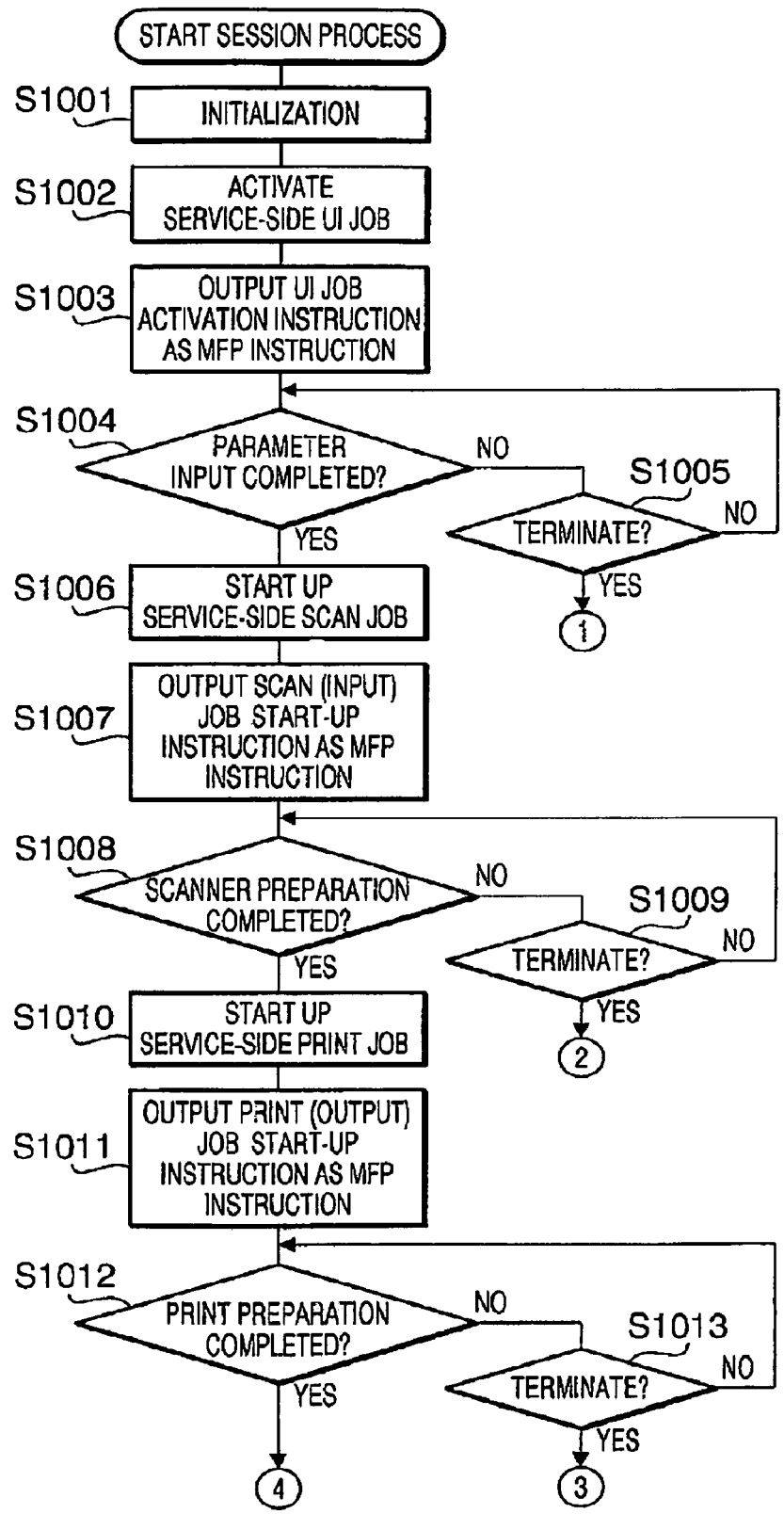
FIGS. 23 and 24 show a flowchart illustrating a session process executed by the function server according to aspects of the invention.
Figure 24:
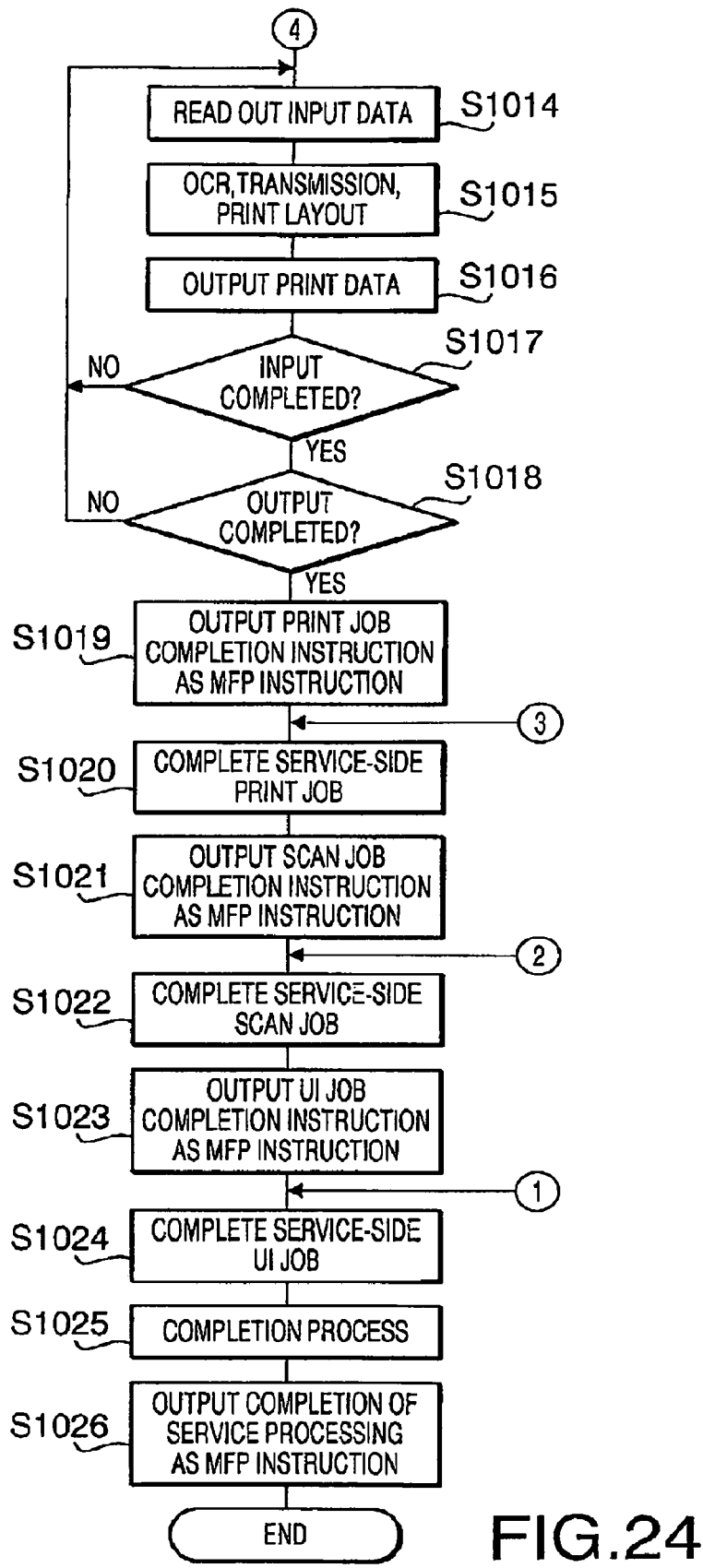

Session process which is performed by the control unit 31 in the function server 30 is explained below, using the flowcharts in FIG. 23 and FIG. 24. Because the content of the session process differs with the service type, the explanation herein takes the translation copy service as an example. This session process is started such as to operate in parallel with the foregoing function server process (FIG. 21) by in S805 in the function server process.

When the session process is started, first, the process performs initialization in S1001.

Figure 25:
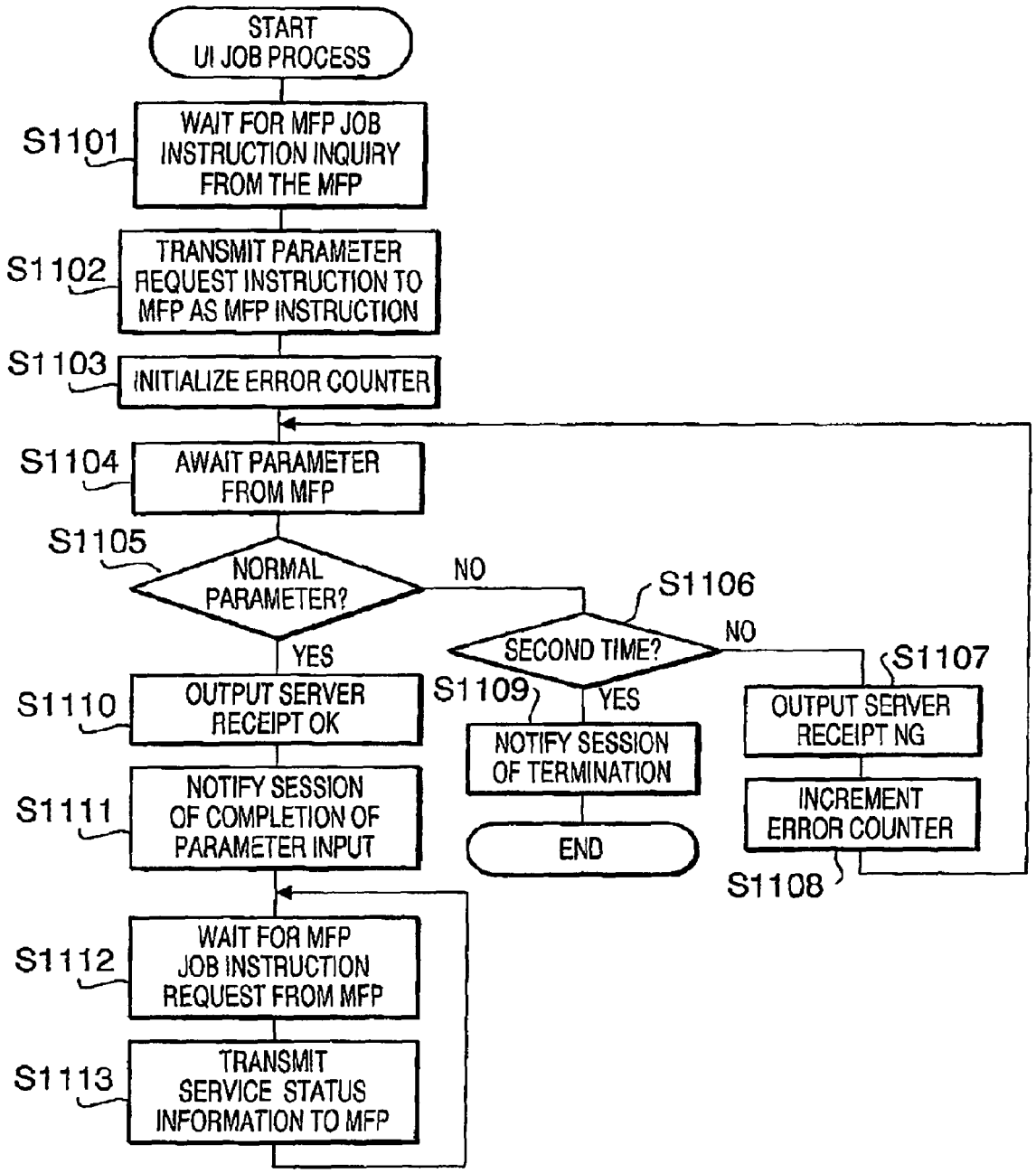
FIG. 25 shows a flowchart illustrating a UI job process executed by the function server according to aspects of the invention.

Then, the process activates the UI job on the service side in S1002. The UI job on the service side is explained in detail hereafter (FIG. 25).

Next, the process outputs UI job startup instruction as the MFP instruction in S1003. Specifically, the process writes the MFP instruction to the memory storing the returned information and subsequently verifies output when "transmission completed" is set in S811 in the foregoing function server process (FIG. 21). Job ID and job communication destination URL are output along with the UI job startup instruction. That is, the job ID is generated, and the job ID and the job communication destination URL are output as the UI job startup instruction is output.

The process determines whether parameter input has been completed in S1004. Whether parameter input has been completed is determined by whether notification of parameter input completion has been made in S1111 in the UI job process (FIG. 25), described hereafter.

If the process determines in S1004 that the parameter input has not been completed, the process proceeds to S1005 and determines whether notification of termination has been given. Notification of termination is given in S1109 in the UI job process (FIG. 25), described hereafter>

If the process determines in S1005 that notification of termination has not been given, the process returns to S1004.

On the other hand, if the process determines in S1005 that notification of termination has been given, the process proceeds to the process in S1024, described hereafter.

Figure 26:
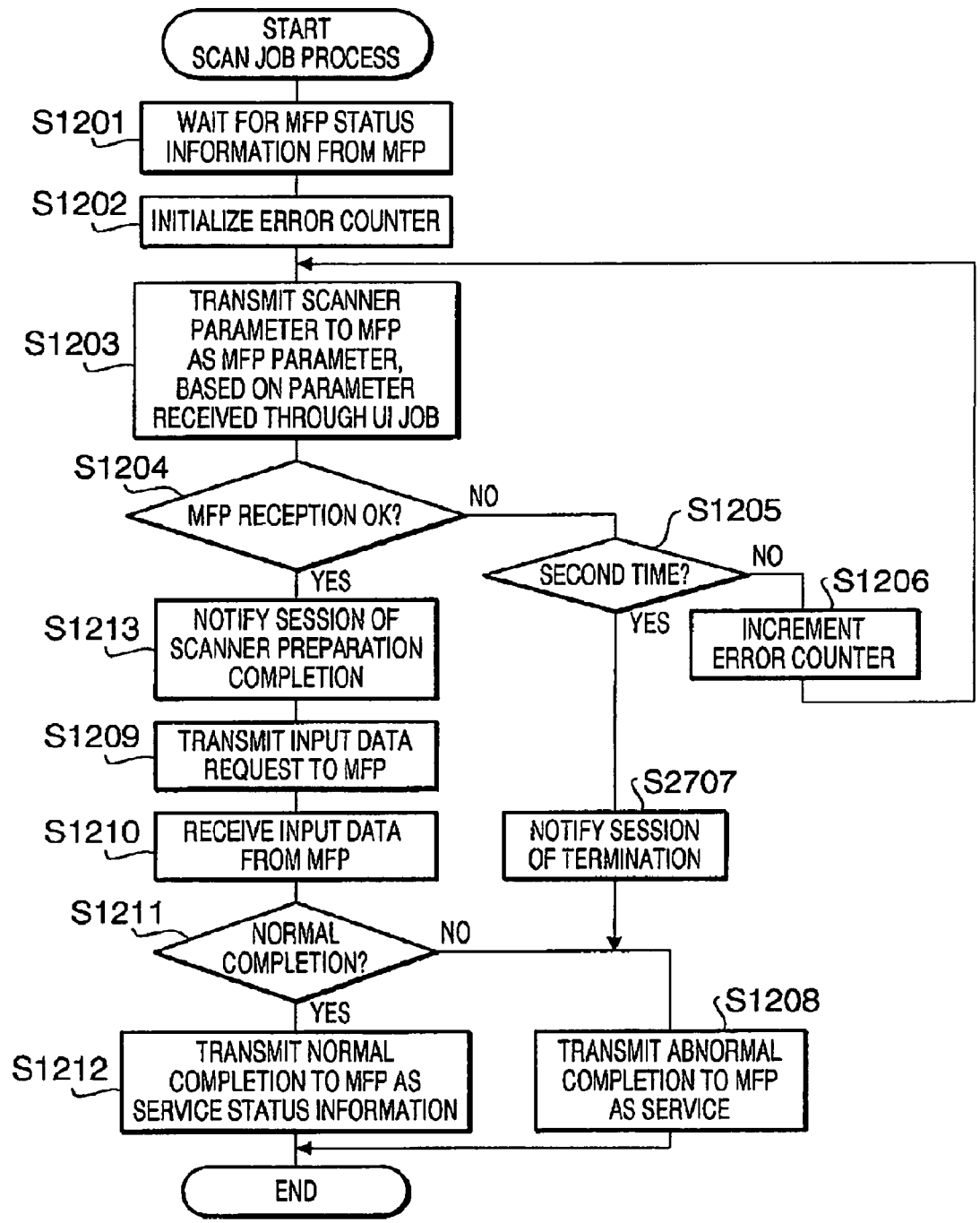
FIG. 26 shows a flowchart illustrating a scan job process executed by the function server according to aspects of the invention.

If the process determines in S1004 that parameter input is completed, the process proceeds to S1006 and activates the scan job on the service side. The detained contents of the scan job on the service side are explained hereafter (FIG. 26).

Next, the process outputs a scan job (input job) startup instruction as a MFP instruction in S1007. The job ID and job communication destination URL are output along with the scan job startup instruction. That is, the job ID is generated, and the job ID and the job communication destination URL are output as the scan job startup instruction is output.

Then, the process determines whether the scanner preparation is completed in S1008. The process determines whether the scanner preparation is completed be receiving notification from S1213 in the scan job process (FIG. 26), described hereafter.

If the process determines in S1008 that the scanner preparation has not been completed, the process proceeds to S1009 and determines whether notification of termination has been given. Notification of termination is given in S1207 in the scan job process (FIG. 26), described hereafter.

If the process determines in S1009 that there has been no notification of termination, the process returns to S1008.

On the other hand, if the process determines in S1009 that a notification of termination has been given, the process proceeds to S1022, described hereafter.

Figure 27:
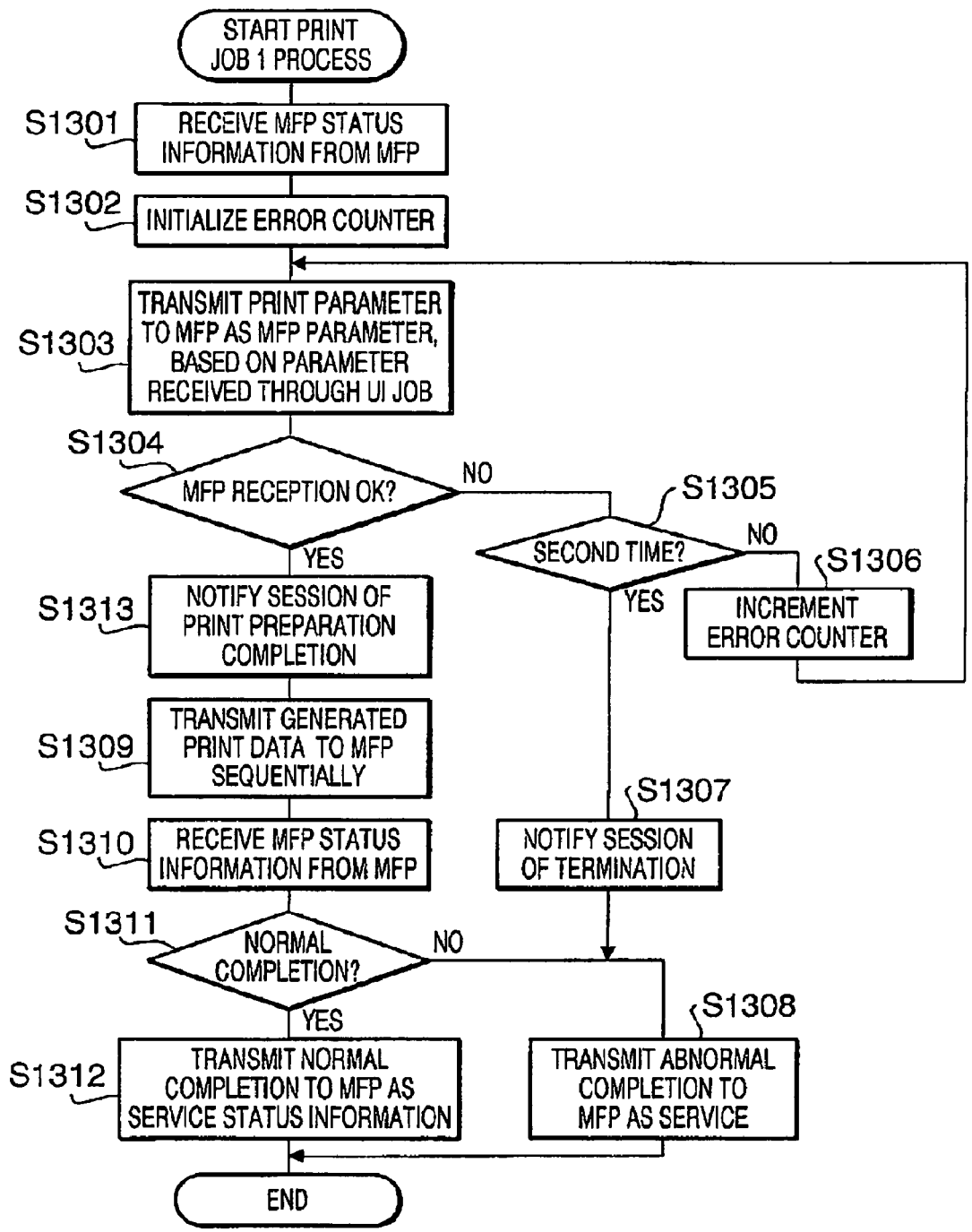
FIG. 27 shows a flowchart illustrating a print job process executed by the function server according to aspects of the invention.

If the process determines in S1008 that the scanner preparation is completed, the process proceeds to S1010 and activates the print job on the service side. The detained contents of the print job on the service side are explained hereafter (FIG. 27).

Next, the process outputs a print job (output job) startup instruction as the MFO instruction in S1011. Job ID and job communication URL are output along with the print job startup instruction. That is, the job ID is generated, and the job ID and the job communication destination URL are output as the print job startup instruction is output.

Then, the process determines in S1012 whether the print preparation has been completed. The process determines whether the print preparation is completed be receiving notification from S1313 in the print job process (FIG. 27), described hereafter.

If the process determines in S1012 that the print preparation has not been completed, the process proceeds to S1013 and determines whether notification of termination has been given. Notification of termination is given in S1307 in the print job process (FIG. 27), described hereafter.

If the process determines in S1013 that there has been no notification of termination, the process returns to S1012.

On the other hand, if the process determines in S1013 that a notification of termination has been given, the process proceeds to S1020, described hereafter.

If the process determines in S1012 that the print preparation is completed, the process proceeds to S1014 and reads input data (image data generated by the reading unit 13).

In S1015, the process acknowledges text included within the image by performing an OCR process on the image data read in S1014, translates the acknowledged text, and generates image data for printing by setting the print layout for the text after translation.

Next, in S1016, the process outputs the print image data generated in S1015.

Then, in S1017, the process determines whether input of all data is completed.

If the process determines in S1017 that the input has not been completed, the process returns to S1014.

On the other hand, if the process determines in S1017 that the input is completed, the process proceeds to S1018 and determines whether the output of all data is completed.

If the process determines in S1018 that the output has not been completed, the process returns to S1014.

However, if the process determines in S1018 that the output has been completed, the process proceeds to S1019 and outputs the print job completion instruction as MFP instruction. Job ID corresponding to the print job to be completed is output along with the print job completion instruction.

Next, in S1020, the process completes the print job on the service side.

In S1021, the process outputs a scan job completion instruction as the MFO instruction. Job ID corresponding to the scan job to be completed is output along with the scan job completion instruction.

Next, in S1022, the process completes the scan job on the service side.

In S1023, the process outputs a UI job completion instruction as the MFP instruction. Job ID corresponding to the UI job to be completed is output along with the UI job completion instruction.

Next, in S1024, the process completes the UI job on the service side.

Then, in S1025, the process performs a completion process (release of memory, etc.) and, after outputting service completion as the MFP instruction in S1026, completes the session process.

UI Job Process by Function Server 30

Function server process in S1002 in the session process (FIG. 23) and the UI job process activated such as to operate in parallel with the session process are explained below, using the flowchart in FIG. 25.

When the UI job process is started, first, the process receives an MFP job instruction inquiry from the MFP 10 in S1101. The MFP instruction inquiry is set as the transmission data in S400 or S423 of the UI job (FIG. 17) performed by the control unit 11 of the MFP 10 and then transmitted in S406.

Then, in S1102, the process transmits a parameter request instruction for setting the parameters necessary for performing the service to the MFP 10 as the MFP instruction. Service I/F information 36 (in this example, service I/F information 36 corresponding to the translation copy service) stored in the service I/F information memory unit 34 in the memory unit 33 is transmitted along with the parameter request.

Next, in S1103, the process initializes the error count.

Then, in S1104, the process receives the parameters from the MFP 10. The process transmits the parameters in S406 in FIG. 15 via S438 in the foregoing parameter setting process (FIG. 17) which is performed by the control unit 11 in the MFP 10.

Next, in S1105, the process determines whether the parameter received in S1104 is normal.

If the process determines in S1105 that the parameter is not normal, the process proceeds to S1106 and determines whether the parameter has been determined to be not normal twice. Specifically, the process determines this based on the error count initialized in S1103.

If the process determines in S1106 that it is not the second time (it is the first time), the process proceeds to S1107 and outputs server reception NG (abnormal reception) as the server reception status which notifies whether the function server 10 has received information from the MFP 10 normally. Furthermore, the process proceeds to S1108 and, after adding the error count, returns to S1104.

On the other hand, if the process determines in S1106 that it is the second time, the process proceeds to S1109 and, after notifying the session of termination, completes the UI job process.

If the process determines in S1105 that the parameters are normal, the process proceeds to S1110 and outputs server reception OK (normal reception) as the server reception status.

Next, in S1111, the process outputs parameter input completion to the session.

Then, in S1112, the process receives the service status information request from the MFP 10. The service status information request is set as the transmission data in S421 or S422 of the UI job (FIG. 17), and transmitted in S406.

Next, in S1113, the process transmits service status information to the MFP 10.

Subsequently, the process returns to S1112. In other words, the process repeatedly receives the MFP job instruction inquiry from the MFP 10 and returns service status information, until terminated by another process. Error code and service I/F information 36 are transmitted along with service status information.

Scan Job Process by Function Server 30

Function server process in S1006 in the session process (FIG. 23) and scan job process which is activated such as to operate in parallel with the session process and the UI job process are explained below, using the flowchart in FIG. 26.

When this scan job process is started, first, the process receives the MFP status information from the MFP 10 in S1201. The process transmits the MFP status information in S504 in the foregoing input job (FIG. 18) which is performed by the control unit 11 in the MFP 10.

Next, in S1202, the process initializes the error count.

Then, in S1203, the process transmits the parameters of the scanner 13 to the MFP 10 as the MFP parameter, based on the parameter received in S1104 in the UI job process (FIG. 25).

Next, in S1204, the parameter determines whether the MFP parameter has been received normally by the MFP 10.

Specifically, the process determines that the parameter has been received normally when notification of a normal reception is given as the MFP reception status, through the process in S509 in the foregoing input job (FIG. 18) which is performed by the control unit 11 in the MFP 10, and determines that the parameter was not received normally when notification of an abnormal reception is given as the MFP reception status.

If the process determines in S1204 that the MFP parameter has not been received normally, the process proceeds to S1205 and determines whether the parameter has been determined to be received abnormally twice. Specifically, the process determines this based on the error counter initialized in S1202.

If the process determines in S1205 that it is not the second time (it is the first time), the process proceeds to S1206 and, after adding to the error count, returns to S1203.

In the other hand, if the process determines in S1205 that it is the second time, the process proceeds to S1207 and notifies the session of termination. Furthermore, the process proceeds to S1208 and, after transmitting abnormal completion to the MFP 10 as the service status information, completes the scan job process.

If the process determines in S1204 that the MFP parameter has been received normally, the process proceeds to S1213 and, after notifying the session of the completion of scanner preparation, the process proceeds to S1209 and transmits input data request, which is an input request for the data type corresponding to the job, to the MFP 10.

Next, the process receives input data from the MFP 10 in S1210. The process transmits input data in S514 in the foregoing input job (FIG. 18) which is performed by the control unit 11 in the MFP 10.

Then, in S1211, the process determines whether the completion is normal.

If the process determines in S1211 that it is not a normal completion, the process proceeds to S1208 and, after transmitting abnormal completion to the MFP 10 as the service status information, completes the scan job process.

On the other hand, if the process determines in S1211 that it is a normal completion, the process proceeds to S1212 and, after transmitting normal completion to the MFP 10 as the service status information, completes the scan job process.

Print Job by Function Serer 30

Function server process in S1010 in the session process (FIG. 23) and print job process which is activated such as to operate in parallel with the session process and the UI job process are explained below, using the flowchart in FIG. 27.

When this print job process is started, first, the process receives the MFP status information from the MFP 10 in S1301. The process transmits the MFP status information in S604 in the foregoing output job (FIG. 19) which is performed by the control unit 11 in the MFP 10.

Next, in S1302, the process initializes the error count.

Then, in S1303, the process transmits the parameters of the printer to the MFP 10 as the MFP parameter, based on the parameter received in S1104 in the UI job process (FIG. 25).

Next, in S1304, the parameter determines whether the MFP parameter has been received normally by the MFP 10. Specifically, the process determines that the parameter has been received normally when notification of a normal reception is given as the MFP reception status, through the process in S609 in the foregoing output job (FIG. 19) which is performed by the control unit 11 in the MFP 10, and determines that the parameter was not received normally when notification of an abnormal reception is given as the MFP reception status.

If the process determines in S1304 that the MFP parameter has not been received normally, the process proceeds to S1305 and determines whether the parameter has been determined to be received abnormally twice. Specifically, the process determines this based on the error counter initialized in S1302.

If the process determines in S1305 that it is not the second time (it is the first time), the process proceeds to S1306 and, after adding to the error count, returns to S1303.

In the other hand, if the process determines in S1305 that it is the second time, the process proceeds to S1307 and notifies the session of termination. Furthermore, the process proceeds to S1308 and, after transmitting abnormal completion to the MFP 10 as the service status information, completes the print job process.

If the process determines in S1304 that the MFP parameter has been received normally, the process proceeds to S1313 and, after notifying the session of the completion of printer preparation, the process proceeds to S1309 and transmits the generated print data to the MFP 10, successively.

Next, the process receives MFP status information from the MFP 10 in S1310. The process transmits the MFP status information in S616 in the foregoing output job (FIG. 19) which is performed by the control unit 11 in the MFP 10.

Then, in S1311, the process determines whether the completion is normal.

If the process determines in S1311 that it is not a normal completion, the process proceeds to S1308 and, after transmitting abnormal completion to the MFP 10 as the service status information, completes the print job process.

On the other hand, if the process determines in S1311 that it is a normal completion, the process proceeds to S1312 and, after transmitting normal completion to the MFP 10 as the service status information, completes the print job process.

Service Addition Process by Function Server 30

Figure 28:
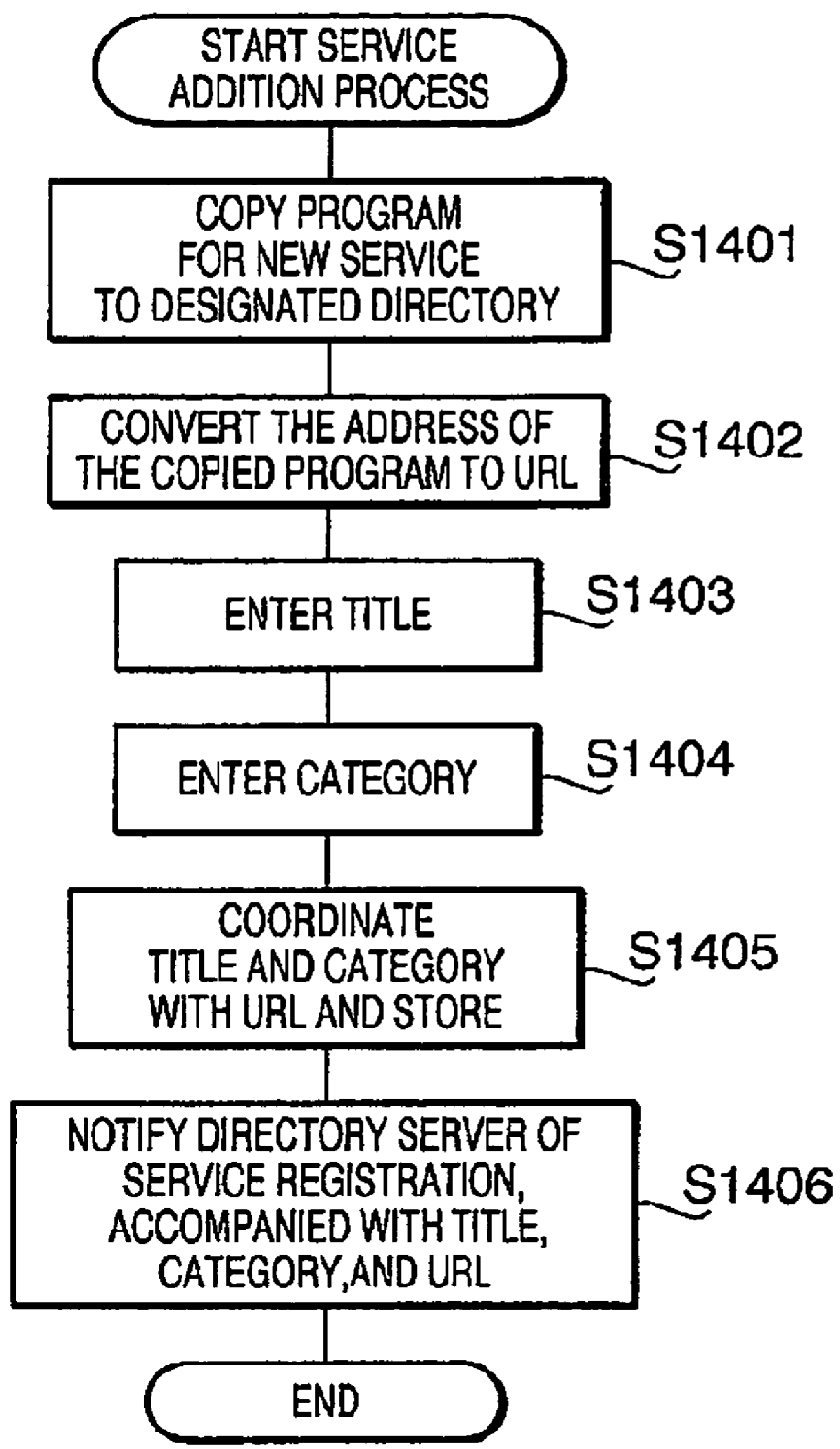
FIG. 28 shows a flowchart illustrating a service addition process executed by the function server according to aspects of the invention.

Service addition process performed by the control unit 31 in the function server 30 is explained below, using the flowchart in FIG. 28. This service addition process is starts when the administrator of the function server 30 performs predetermined operations.

When this service addition process is started, first, the process enables the administrator of the function server 30 perform operations for copying the program of the service to be added (service software 37) to the predetermined directory in S1401.

Next, in S1402, the process converts the address of the program copied in S1401 to URL.

Then, in S1403, the process enables the administrator of the function server 30 to enter the title of the added service (service name).

In S1404, the process enables the administrator of the function server 30 to enter the category of the added service. The category entered here can be any out of the three categories, "data storage service", "print service", and "copy service".

In S1405, the process stores the title entered in S1403 and the category entered in S1404 in correspondence with the URL generated by converting the address in S1402.

Then, the process notifies the directory server 20 of service registration, along with the title, category, and URL stored in S1405. Subsequently, the service addition process is completed.

Service Alteration Process by Function Server 30

Figure 29:
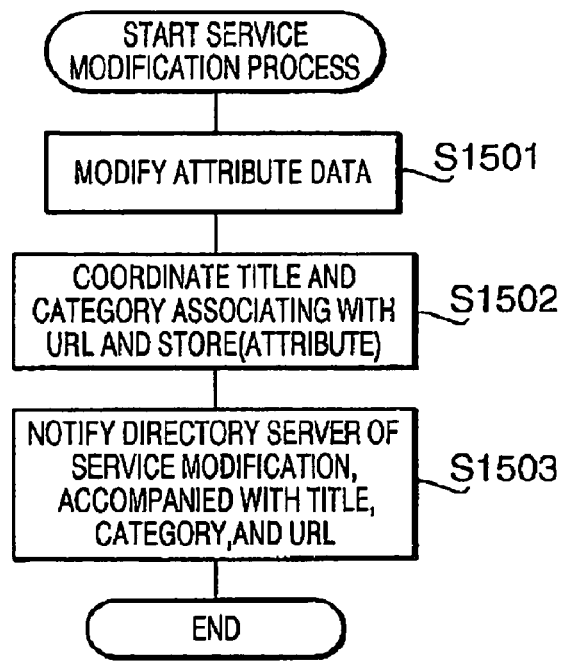
FIG. 29 shows a flowchart illustrating a service alteration process executed by the function server according to aspects of the invention.

Service alteration process performed by the control unit 31 in the function server 30 is explained below, using the flowchart in FIG. 29. The service alteration process is started when the administrator of the function server 39 performs predetermined operations.

When this service alteration process is started, first, the process enables the administrator of the function server 30 perform operations for the attribute data related to the service in S1501.

Next, in S1502, the process stores the title and category of the service after alteration, in correspondence to the URL.

Then, the process notifies the directory server 20 of service alteration, along with the title, category, and URL, in S1503. Subsequently, the service alteration process is completed.

Service Deletion Process by Function Server 30

Figure 30:
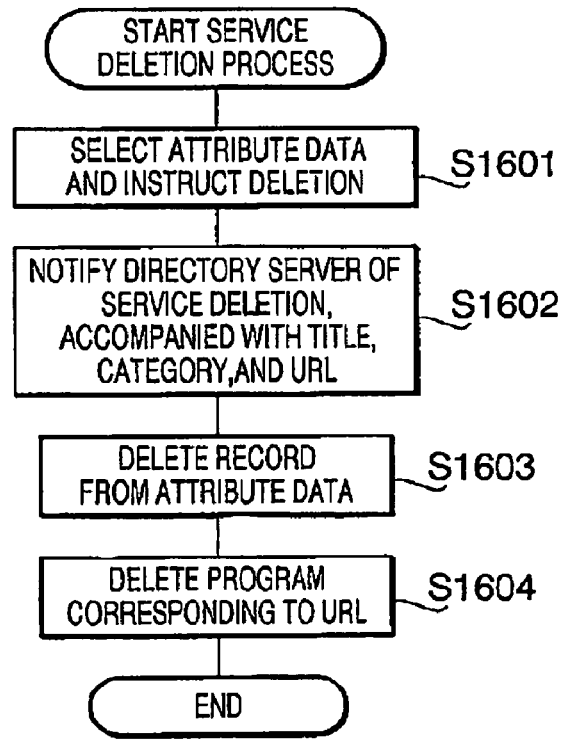
FIG. 30 shows a flowchart illustrating a service deletion process executed by the function server according to aspects of the invention.

Service deletion process performed by the control unit 31 in the function server 30 is explained below, using the flowchart in FIG. 30. The service deletion process is started when the administrator of the function server 39 performs predetermined operations.

When this service deletion process is started, first, the process enables the administrator of the function server 30 to indicate deletion by selecting attribute data, in S1601.

Then, the process notifies the directory server 20 of service deletion, along with the tide, category, and URL, in S1503.

In S1603, the attribute data is deleted from the record.

Then, in S1604, the program corresponding to the URL (service software 37) is deleted. Subsequently, the service deletion process is completed.

According to the image (data) processing system according to the first embodiment described above, there are provided the MFP 10, the function server 30 configured to execute the service in accordance with the request from the MFP 10, and the directory server 20 that provides information on the service to be executed by the function server 30 to the MFP 10. In the MFP 10, in accordance with the service definition information 25 transmitted by the directory server 20, the service the function server 30 is requested for is determined. Then, based on the service I/F information 36, the parameters necessary for execution of the requested service.

Therefore, the image (data) processing system according to aspects of the invention can be adapted to an environment where services are increased/decreased disorderly as in general servers on the Internet. That is, according to the image processing system, it is possible to know the type of the service and its requesting destination of the services the function server 30 can executed based on the service definition information 25 transmitted from the directory server 25. Therefore, it is unnecessary to register the type or request destination of the service. Therefore, in an environment where the services which can be executed by the function server 30 frequently increases/decreases, burden to the MFP 10 and its user can be suppressed. Further, even if the number of the usable services increases significantly, it is possible to suppress the burden to the storage area of the MFP 10. Further, there will not occur a problem that the information unnecessary for the MFP 10 is kept registered. Further, even if the specification of the parameters necessary for execution of the services is changed, burden to the MFP 10 can be suppressed.

In the image (data) processing system according to the first embodiment, the service definition information 25 the service I/F information 36 are transmitted as the response to the HTTP request from the MFP 10. Therefore, according to the image (data) processing system, the service definition information 25 and the service I/F information 36 can be received by the MFP 10 without changing the settings of the broadband router 2.

Further, according to the image (data) processing system, only when the MFP 10 request the function server 30 for the service, the service definition information 25 and the service I/F information 36 are transmitted. Therefore, according to the image (data) processing system, it is possible to prevent the service definition information 25 and the service I/F information 36 to the MFP 10 more than necessary. As a result, burden to the MFP 10 can be suppressed.

In the image (data) processing system according to aspects of the invention, information regarding the service definition information 25 and the service I/F information 36 is displayed on the display 52 of the operation panel 12a and allows the user of the MFP 10 to select a service requested to the function device 39 and to set the parameters regarding the selected service. Therefore, according to such an image (data) processing system, the service the user of the MFP 10 wishes can be executed.

Further, according to the image (data) processing system, when the services which can be executed by the function server 30 have been changed, the contents of the service are transmitted from the function server 30 to the directory server 20. Therefore, according to the image (data) processing system, it is unnecessary to perform a process to investigate the contents of the service, which the function server 30 can executed, at the directory server 20. As above, it is possible to collect necessary information, the thus to provide the latest information to the MFP 10. Such a configuration efficient particularly when the services are provided by a plurality of function servers, since in such a system, it is difficult for the directory server 20 to investigate all the services available.

Further, according to the image (data) processing system, the parameters which can be set using the service I/F information 36 are limited to part of the parameters that can be set in the MFP 10 in accordance with the contents of the services. Therefore, according to the image (data) processing system, it is possible to prevent undesirable parameters from being set automatically. As a result, the services can be executed efficiently.

Further, according to aspects of the invention, the following effect can be achieved. That is, in the image (data) processing system, as a response to the request received from the MFP 10, if there is a command to be transmitted to the MFP 10, the function server 30 immediately transmits the reply data including the command, while if there is not a command to be transmitted to the MFP 10, the function server transmits reply data without a command, when a no-command status has been kept for the maximum holding period, which is set based on the timeout period, since the receipt of the command request.

According to the image (data) processing system, it is possible to shorten the waiting time in which the MFP 10 waits for receipt of a command from the function server 30 without increasing network traffic. Further, even if no commands to be transmitted to the MFP 10 are generated, when the maximum holding period has lapsed, the return data indicating the no command status is transmitted, the communication error in the network can be avoided.

Further, according to the illustrative embodiment, the MFP 10 repeatedly transmits a command request to the function server 30. Therefore, it is ensured that the command is received from the function server 30.

Further, according to the embodiment, the MFP 10 automatically sets the maximum holding period. Therefore, even if the user of the MFP 10 does not know the timeout period set in the broadband router 2, the maximum holding period can be set to an appropriate value in accordance with the network environment. Further, when the function server 30 communicates with a plurality of MFPs 10, appropriate maximum holding periods can be used in the plurality of MFPs 10, respectively.

In the image (data) processing system according to the first embodiment, the MFP 10 sets the maximum holding period to a value that is calculated based on the timeout period To and the communication time T1, at the beginning of the session process. Thereafter, the communication between the MFP 10 and the function server 30 is controlled based on the thus determined maximum holding period. In practice, however, the appropriate maximum holding period changes depending on the congestion (traffic) of the network.

Second Embodiment

Next, a data processing system according to a second embodiment will be described. In the second embodiment, the maximum holding period is adjusted in accordance with the congestion of the network.

The configuration and processes to be executed of the second embodiment are substantially the same. It should be noted that the session process executed by the control unit 11 of the MFP 10 of the second embodiment is different from that of the first embodiment.

Figure 31:
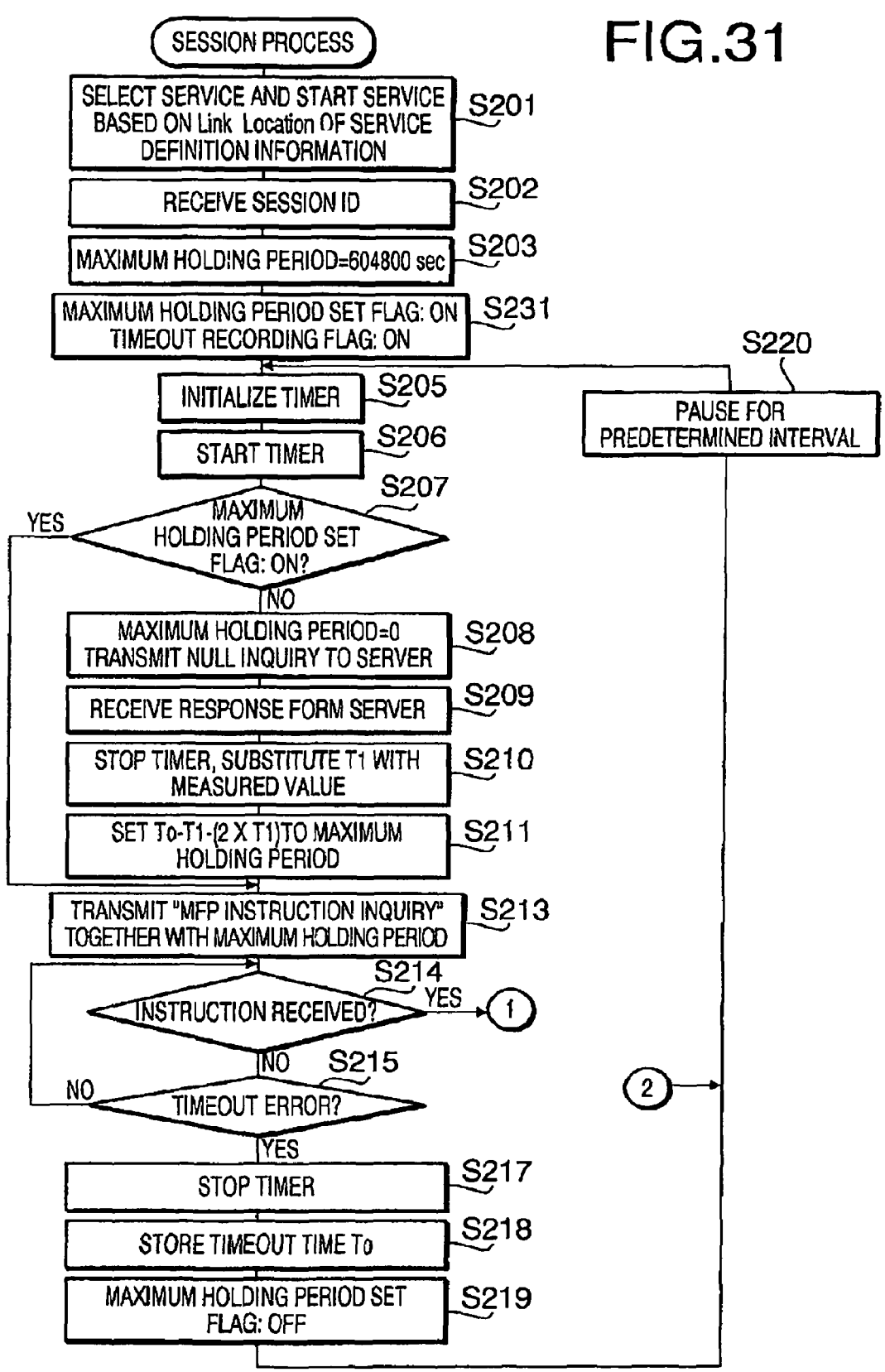
FIG. 31 shows a flowchart illustrating a session process executed by the MFP according to a second embodiment.

Hereinafter, the session process according to the second embodiment will be described with reference to FIG. 31. In comparison with the session process according to the session process (FIG. 14), S231 is executed instead of S204, and S212 and S216 are omitted. In FIG. 31, to the step similar to those of FIG. 14, the same step numbers are assigned and detailed description will not be repeated. Further, steps S221-S228 are identical to those in FIG. 15.

When the session process shown in FIG. 31 is started, the process selects the service to use in S201, and based on the service definition information 25, Link_Location (if the URL has directly input, based on the URL), the service is started.

Next, in S202, the process receives the session ID from the function server 30.

In S203, the maximum holding period is set to 604,800 seconds. Then, in S231, the maximum holding period set flag is set (on).

In S205, the process initialize a timer, and starts the timer in S206.

Then, in S207, the process judges whether the maximum holding period set flag has been set. It should be noted that the judgment in S207 is repeatedly executed during execution of the session process. When the timeout error has not been detected, at the judgment step, it is determined that the maximum holding flag is set (on). After the timeout error has been detected, at the judgment, it is determined that the maximum holding period flat is not set (on). The reason why such a determination is obtained is the on/off status of maximum holding period flag is switched in S231 and S219.

In order to clarify the flow of the session process, a flow after the judgment in S207 when the timeout error has not been detected, and the flow after the judgment in S207 when the timeout error ahs been detected will be described.

When Timeout Error Has Not Been Detected

In this case, since the maximum holding period set flag is set (on) in S231, it is determined that the maximum holding period set flag is set (S207: YES), the process proceeds to S213.

In S213, the process transmits the "MFP instruction inquiry" to the function server 30 together with the maximum holding period (604,800 seconds) set in S203. In the function server 30, a replying process is executed in accordance with the maximum holding period as transmitted.

In S214, the process judges whether an instruction to be returned in response to the "MFP instruction inquiry" transmitted in S213 has been received. If it is determined that the instruction has not been received (S214: NO), the process proceeds to S215, where it is judged whether a communication error has occurred as the response to the MFP instruction inquiry has not been issued and the timeout period has elapsed.

If it is determined in S215 that the communication error due to the timeout has not occurred (S215: NO), the process returns to S214. That is, until the communication error due to the timeout occur, the process waits for the response to the MFP instruction inquiry. It should be noted that the maximum holding period is set to a sufficiently large value (604,800 seconds) in comparison with the normally assumed timeout period. Therefore, if there has been no response transmitted from the function 30 for a relatively long period, the communication error will occur. As a result, in S215, the process judges that the timeout error has occurred, and the process proceeds to S217.

In S217, the process stops the timer which was started in S206. Then, in S218, the process stores the measured time of the timer stopped in S217 as the timeout period To.

In S219, the maximum holding period set flag is released. Then, the process proceeds to S220, pauses for a predetermined period, and returns to S205. In S205, the process initializes the timer, starts the timer in S206, and proceeds to S027.

Figure 15:
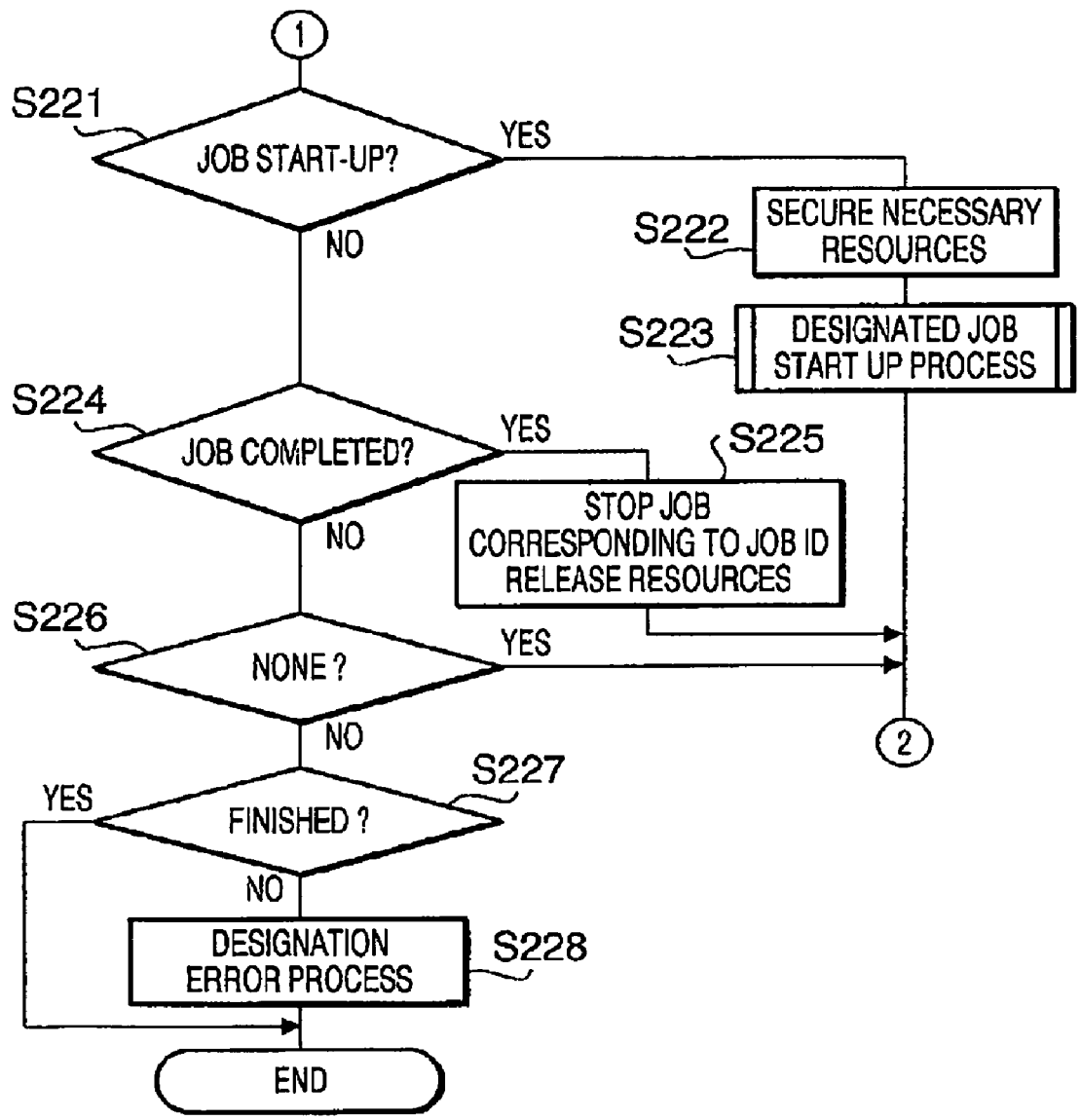

In S214, if it is determined that the instruction has been received, the process proceeds to S221 (see FIG. 15).

When Timeout Error Has Been Detected

In this case, it is determined that the maximum holding period is not set since the flag has been released in S219. Thus, the process proceeds to S208.

In S208, the process sets the maximum holding period to zero, and transmits the maximum holding period as set to the function server 30 together with a "null inquiry". Then, in S209, the process receives the response from the function server 30 regarding the inquiry transmitted in S208.

In S210, the process stops the timer started in S206, and sets the measured period to the communication period T1. In S211, the process subtracts the communication period T1 from the timeout period To stored in S218, and further subtract twice the communication period T1 therefrom. The resultant value is set to the maximum holding period.

In S213, the process transmits the "MFP instruction inquiry" to the function server 30 together with the maximum holding period set in S211. Then, in the function server 30, a responding operation based on the transmitted maximum holding period is executed. As above, in the session process according to the second embodiment, every time when the MFP instruction inquiry is transmitted, the maximum holding period is calculated based on the timeout period To and the communication period T1. It should be noted that the communication period T1 becomes longer as the congestion (traffic) in the network is greater. Therefore, in the calculated maximum holding period, the congestion (traffic) of the network is reflected. As a result, the value of the maximum holding period used in the function server 30 is adjusted in accordance with the congestion of the network.

Next, the process judges, in S214, whether the instruction to be transmitted in response to the "MFP instruction inquiry" transmitted in S214 has been received.

If it is determined that the instruction has not been received (S214: NO), the process proceeds to S215, where the process judges whether the communication error has occurred as the response to the MFD instruction inquiry transmitted in S213 has not been received within the timeout period.

If it is determined that the communication error due to the timeout is not occurred (S215: NO), the process returns to S214. That is, before the communication error occurs, the process waits for receipt of the response to the MFP instruction inquiry. It should be noted that, since the maximum holding period is set shorter than the timeout period To, and further, since the maximum holding period is calculated using the communication period T1 that varies depending on the congestion status of the network, the response is transmitted from the function server 30 before the timeout period has elapses, and thus, before the process judges in S215 that the communication error due to timeout has occurred, it is determined (in S214) that the instruction has been received.

If it is determined that the instruction has been received (S214: YES), the process proceeds to S221 (see FIG. 15).

As described above, with the data processing system according to the second embodiment of the invention, the maximum holding period can be adjusted to an appropriate value in accordance with the congestion of the network. As a result, the communication error can be avoided, and further, the waiting period during which the MFP 10 waits for receipt of the command from the function server can be effectively shortened.

In the data processing system according to the second embodiment, the maximum holding period is calculated using a calculation formula. However, aspects of the invention need not be limited to the configuration shown in the illustrative embodiment. For example, appropriate values of the maximum holding period can be stored as a table showing a relationship between the congestion status (e.g., communication speed) and optimum value of the maximum holding period, and the maximum holding period is determined by referring to the table (which can apply in a third embodiment described later).

In the second embodiment, the status of the congestion of the network is detected by the MFP 10 to adjust the maximum holding period. However, aspects of invention need not be limited to such a configuration, and, for example, the congestion status of the network may be detected by the function server 30 to adjust the maximum holding period.

As mentioned above, the data processing system according to the third embodiment will be described. In the third embodiment, the maximum holding period is adjusted by detecting the status of the congestion of the network.

The configuration and processes of the third embodiment are substantially the same as those of the first embodiment. In the third embodiment, the session process to be executed by the control unit 11 of the MFP 10, and the function server process and the service control information process executed by the control unit 31 of the function server 30 are different from those of the first embodiment.

Figure 32:
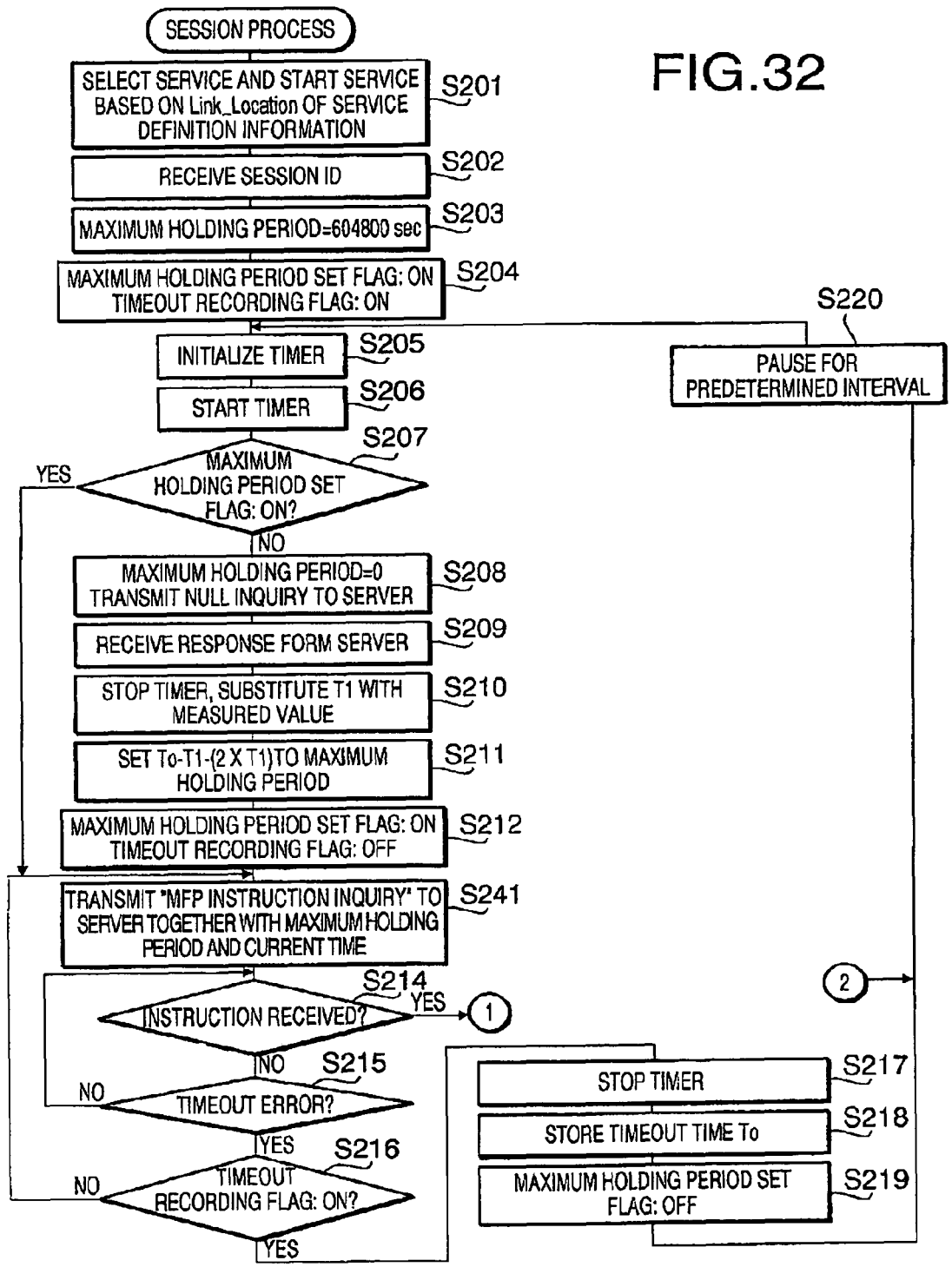
FIG. 32 shows a flowchart illustrating a session process executed by the MFP according to a third embodiment.

FIG. 32 shows flowchart illustrating the session process according to the third embodiment, executed by the control unit 11 of the MFP 10. The session process shown in FIG. 32 is different from that shown in FIG. 14 in that S241 is executed instead of S213 (see FIG. 14). The other steps are the same as those in FIG. 14. Further, S221-S228 of the session process according to the third embodiment are identical to those of the first embodiment, shown in FIG. 15.

When the session process is started, the service to be used in selected in S201, and then the process starts the selected service based on the service information 25, Link_Location (if the URL is directly input, the URL is referred to).

In S202, the process receives the session ID from the function server 30. Then, in S203, the process sets the maximum holding period to 604,800 seconds. In S204, the process sets the maximum holding period set flag, and also sets the timeout recording flag.

Next, in S205, the process initializes the timer, and in S206, the process starts the timer. In S207, the process judges whether the maximum holding period set flag is set (on). It should be noted that the judgment in S207 is repeatedly executed during the session process is executed. First time when S207 is executed after the session process is started, at S207, the process determines that the maximum holding period set flag is not set (on), while in other executions of S207 (when the timeout error has not been detected, or the maximum holding period has been set), the process determines that the maximum holding period set flag is set (on). It should be note that above result is obtained since, in S204, S212 and S219, the maximum holding period set flag is ON/OFF switched.

Third Embodiment

In order to clarify the session process according to the third embodiment, the flow after the judgment in S207 will be described in detail.
When Timeout Error Has Not Been Detected In this case, since the maximum holding period set flag is set (on) in S204, it is determined that the maximum holding period set flag is set (S207: YES), and the process proceeds to S241.

In S241, the process transmits the "MFP instruction inquiry" to the function server 30 together with the maximum holding period (604,800 seconds) set in S203 and current time (i.e., a transmission time).

In S214, the process judges whether an instruction to be returned in response to the "MFP instruction inquiry" transmitted in S241 has been received. If it is determined that the instruction has not been received (S214: NO), the process proceeds to S215, where it is judged whether a communication error has occurred as the response to the MFP instruction inquiry has not been issued and the timeout period has elapsed.

If it is determined in S215 that the communication error due to the timeout has not occurred (S215: NO), the process returns to S214. That is, until the communication error due to the timeout occur, the process waits for the response to the MFP instruction inquiry. It should be noted that the maximum holding period is set to a sufficiently large value (604,800 seconds) in comparison with the normally assumed timeout period. Therefore, if there has been no response transmitted from the function 30 for a relatively long period, the communication error will occur. As a result, in S215, the process judges that the timeout error has occurred, and the process proceeds to S216.

In S216, the process judges whether the timeout record flag is set (on). Since, in this case, the timeout record flag has been set in S204, it is determined that the timeout record flag is set and the process proceeds to S217.

In S217, the process stops the timer which was started in S206. Then, in S218, the process stores the measured time of the timer stopped in S217 as the timeout period To.

In S219, the maximum holding period set flag is released. Then, the process proceeds to S220, pauses for a predetermined period, and returns to S205. Then, the process proceeds to S220, where the process pauses for a predetermined period, and then returns to S205. In S205, the process initializes the timer, starts the timer in S206, and proceeds to S027.

In S214, if it is determined that the instruction has been received, the process proceeds to S221 (see FIG. 15).

When Timeout Error Has Been Detected

If S207 is executed immediately after the first detection of the timeout error, it is determined that the maximum holding period is not set since the flag has been released in S219. Thus, the process proceeds to S208.

In S208, the process sets the maximum holding period to zero, and transmits the maximum holding period as set to the function server 30 together with a "null inquiry". Then, in S209, the process receives the response from the function server 30 regarding the inquiry transmitted in S208.

In S210, the process stops the timer started in S206, and sets the measured period to the communication period T1. In S211, the process subtracts the communication period T1 from the timeout period To stored in S218, and further subtracts twice the communication period T1 therefrom. The resultant value is set to the maximum holding period.

In S212, the process sets the maximum holding period, and releases the timeout record flag. Then, in S241, the process transmits the "MFP instruction inquiry" to the function server together with the maximum holding period set in S211 and the current time (i.e., the transmission time).

Next, the process judges, in S214, whether the instruction to be transmitted in response to the "MFP instruction inquiry" transmitted in S214 has been received.

If it is determined that the instruction has not been received (S214: NO), the process proceeds to S215, where the process judges whether the communication error has occurred as the response to the MFD instruction inquiry transmitted in S213 has not been received within the timeout period.

If it is determined that the communication error due to the timeout is not occurred (S215: NO), the process returns to S214. That is, before the communication error occurs, the process waits for receipt of the response to the MFP instruction inquiry. It should be noted that, since the maximum holding period is set shorter than the timeout period To, and further, since the maximum holding period is calculated using the communication period T1 that varies depending on the congestion status of the network, the response is transmitted from the function server 30 before the timeout period has elapses. If the communication has occurred, the process judges so in S215, and proceeds to S216.

In S216, the process judges whether the timeout record flag is set. Since the timeout record flag has been released in S212, the process judges that the timeout record flag is not set (S212: NO), and proceeds to S241. Thus, if the communication error has occurred due to the timeout error, the process transmits the "MFP instruction inquiry" to the function server 30.

If the process judges that the instruction has been received (S214: YES), the process proceeds to S221 (FIG. 25).
When the Maximum Holding Period Has Been Set If S207 is executed after the maximum holding period has been set, the process judges that the maximum holding period has been set, and proceeds to S241.

In S241, the process transmits the "MFP instruction inquiry" to the function server 30 together with the maximum holding period (the same value as previously transmitted) set in S211. The above steps are similar to those of the flow when the first timeout error has been detected.

Figure 33:
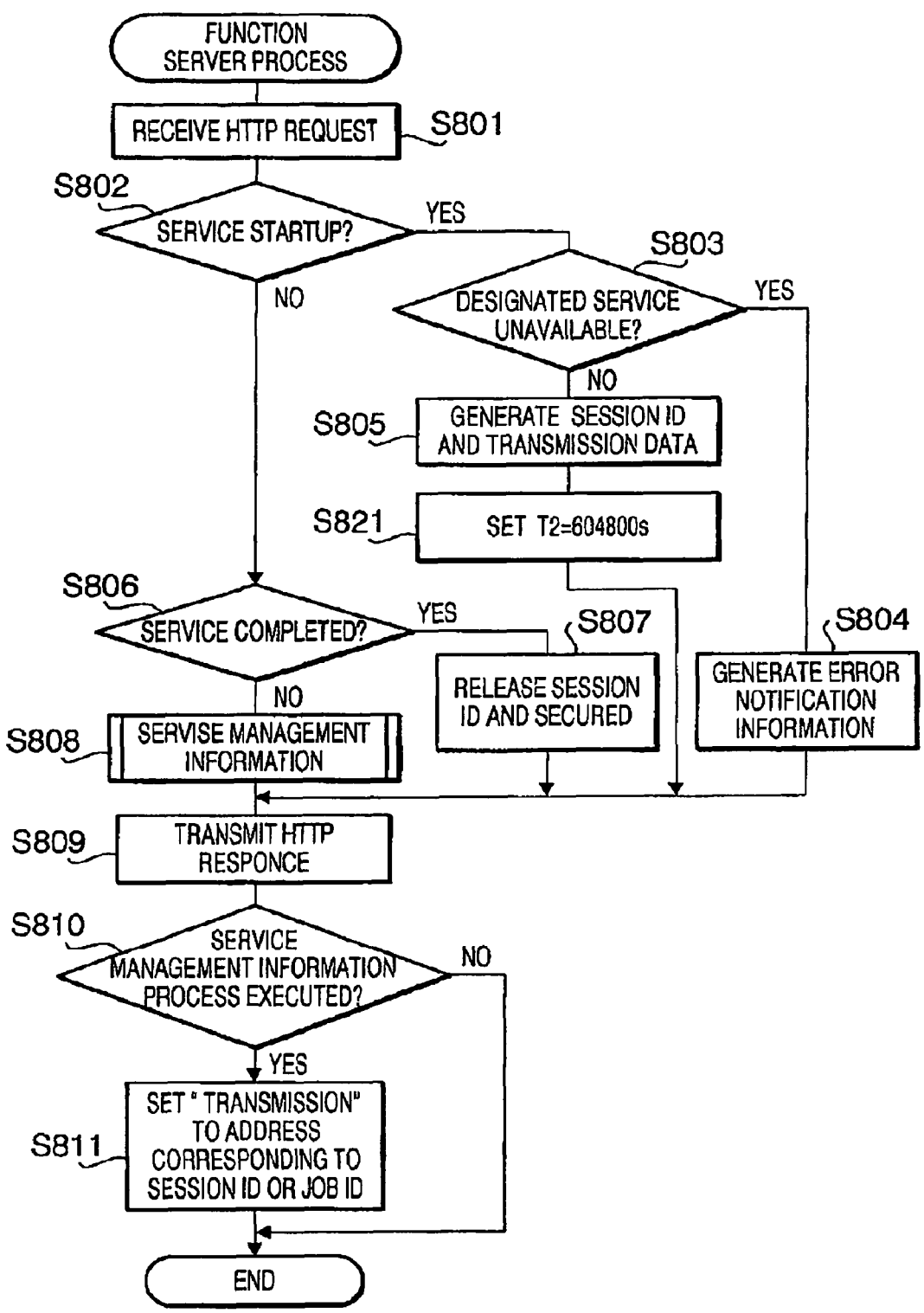
FIG. 33 shows a flowchart illustrating a function server process executed by the function server according to the third embodiment.

Next, the function server process executed by the control unit 31 of the function server 30 will be described, referring to FIG. 33.

The function server according to the third embodiment is substantially similar to the function server process according to the first embodiment (FIG. 21) except that step S821 has been added after S805.

When the function server process according to the third embodiment is started, in S801, the HTTP request is received. Then, in S802, the process judges whether the HTTP request received in S801 is the instruction to start the service.

If it is determined that the received instruction is to start the service (S802: YES), the process proceeds to S803, where the process judges whether the designated service exists. If, for some reason, it is determined that the designated service does not exist (S803: NO), the process proceeds to S804, where an error notification information is generated and the process proceeds to S809.

If it is determined that the service is available, the process proceeds to S805, where the process generates the session ID and then generates the transmission data. Further, the process starts the process executing the service.

Then, S821, the process sets the initial value of a variable T2, which represents a reference communication time period between the MFP 10 and the function server 30, to 604,800 seconds (i.e., one week). Then, the process proceeds to S809. It should be noted that the value 604,800 seconds is an example representing a sufficiently long period, and need not be same as the value set to the maximum holding period.

If it is determined that the instruction is not for startup of the service (S802: NO), the process proceeds to S8806, and judges whether the HTTP request received in S801 is the instruction for completion of the service.

If it is determined that the instruction is for completion of the service (S806: YES), the process proceeds to S807, and releases the session ID and secured resources. Then, the process proceeds to S809.

If it is determined that the instruction is not for completion of the service (S806: NO), the process executes the service control information process (see FIG. 34), and proceeds to S809.

In S809, the HTTP response including the generated information is transmitted. Then, in S810, the process judges whether the service control information process in S808 has been executed.

If it is determined that the service control information process has been executed (S810: YES), the process proceeds to S911, where the memory address corresponding to the session ID or the job ID is set to "transmission finished", and the process finishes the function server process.

If it is determined that the service control information process has not been executed (S810: NO), the process finishes the function server process.

Next, the above-mentioned service control information process executed in S808 will be described with reference to FIG. 34.

The service control information process according to the third embodiment is different from the process shown in FIG. 22 in that steps S921-s925 have been added. The other steps are similar to those in the service control information process according to the first embodiment shown in FIG. 22.

Figure 34:
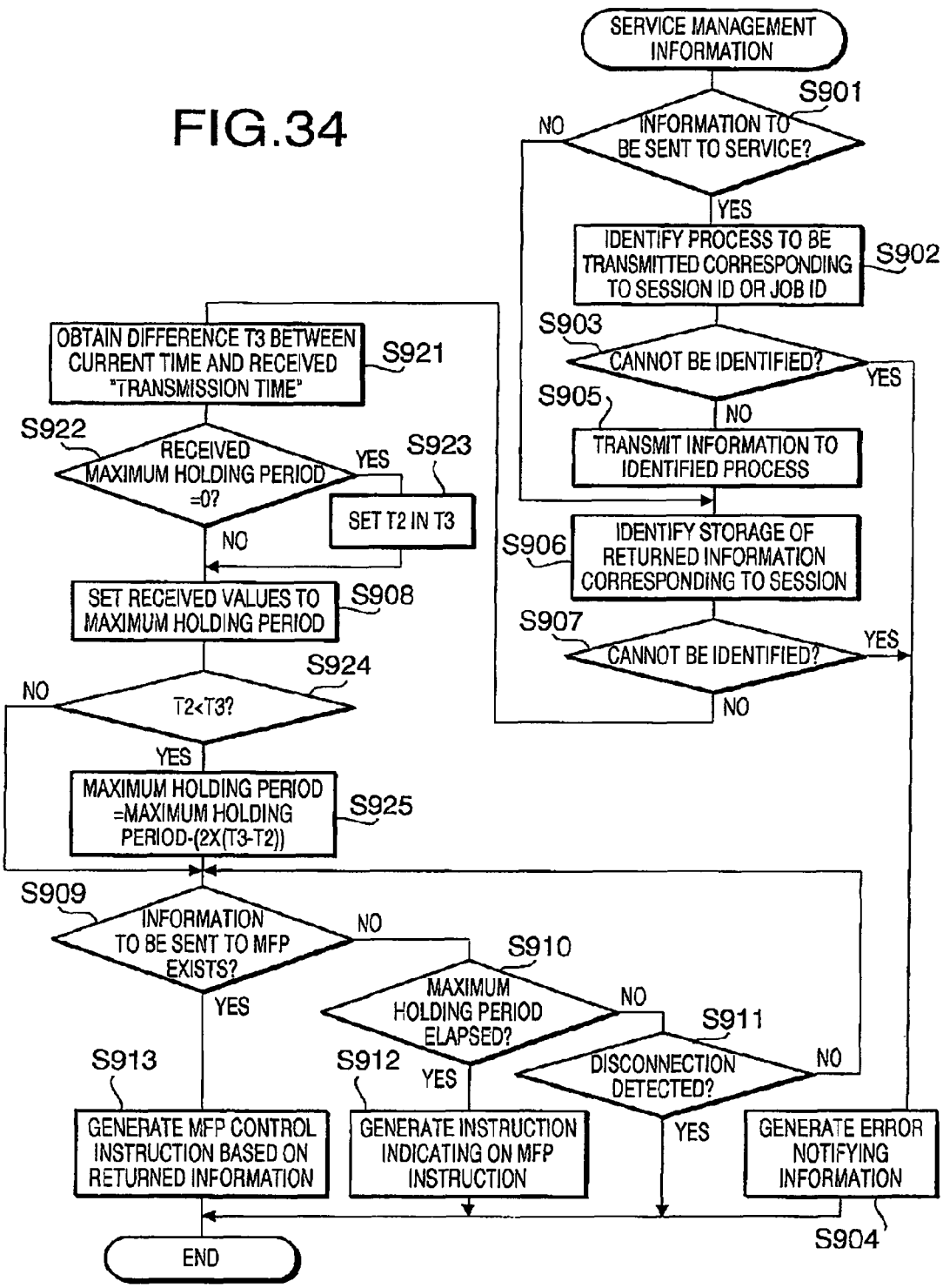
FIG. 34 shows a flowchart illustrating a service control information process executed by the function server according to the third embodiment.

When the process shown in FIG. 34 is started, in S901, the process judges whether there is information to be transmitted to the service. If it is determined that there is information to be transmitted to the service (S901: YES), the process proceeds to S902, where a transmission process corresponding to the session ID or the job ID is specified.

Next, in S903, the process judges whether the process has been specified. If, for some abnormal reason, the process has not been specified (S903: NO), the process proceeds to S904, where the process generates error notification information and finishes the service control information process.

If it is determined that the process can be specified (S903: YES), the process proceeds to S904, and transmits the information to the specified process. Then, the process proceeds to S906.

If it is determined that there is no information to be transmitted to the service (S901: NO), the process proceeds to S906.

In S906, the process specifies a storage memory of the return information corresponding to the session ID or job ID. Then, in S907, the process judges whether the storage memory has been specified.

If the storage memory has not been specified (S907: NO), the process proceeds to S904, where the error notification information is generated and the service control information process is finished.

If the storage memory has been specified (S907: YES), the process proceeds to S921, where a difference T3 between the current time (i.e., the received time) and the "transmission time" received from the MFP 10 is obtained. That is, in this step, the communication time period T3 from the MFP 10 to the function server 30 is calculated.

Then, in S922, the process judges whether the received maximum holding period is zero. It should be note that the maximum holding period having a value of zero is transmitted in S208 of the session process (FIG. 32).

If the received maximum holding period is zero (S922: YES), the process proceeds to S923. In S923, the process sets the reference communication period T2 between the MFP 01 and the function server 30 to the value of the communication period T3 calculated in S921. Then, the process proceeds to S908. Thus, the communication period T3 when the process receives the maximum holding period having a value of zero is set as the reference communication period T2. It should be noted that the maximum holding period having a value of zero is received only once, and thereafter the value of the reference communication period T2 is used.

If it is determined that the received maximum holding period is not zero (S922: NO), the process proceeds to S908. In S908, the process sets the maximum holding period to a value thereof received from the MFP 10.

Next, it is judged whether the communication period T3 calculated in S921 is longer than the reference communication period T2 (S924). If it is determined that the communication period T3 is longer than the reference communication period T3 (S924: YES), the process proceeds to S925. In S925, the process adjusts the maximum holding period by subtracting twice the difference between the communication period T3 and the reference communication period T2 from the maximum holding period. Then, the process proceeds to S909. That is, in S925, the maximum holding period is calculated such that:

$$\text{Maximum Holding Period} = \text{Maximum Holding Period} - (2 \times (T3 - T2)).$$

As above, if the current communication period T3 is longer (i.e., the congestion is higher) than the reference communication period T2, which is the communication period when the maximum holding period was set by the MFP 10, the maximum holding period is shortened so that the error due to the timeout is avoided.

If it is determined that the communication period T3 is not longer than the reference communication period T2 (i.e., the communication period T3 is equal to or less than the reference communication period T2) (S924: NO), the process proceeds to S909. Then, in S909, the process judges whether the are information (commands) to be transmitted to the MFP 10.

If there is no information (command) to be transmitted to the MFP 10 (S909: NO), the process proceeds to S910. In S910, the process judges whether the maximum holding period (which is the maximum holding period set in S908, and has been modified if the process has executed S925) has elapsed since the request from the MFP 10 was received.

If it is determined that the maximum holding period has not elapsed (S910: NO), the process proceeds to S911, and judges whether a disconnection is detected.

If it is determined that the disconnection is detected (S911: YES), the process finishes the service control information process.

If it is determined that the disconnection has not been detected (S911: NO), the process proceeds to S909. If it is determined that the maximum holding period has elapsed (S910: YES), the process proceeds to S912, generates information indicating "no MFP instruction" and finishes the service control information process.

If it is determined that there is information to be transmitted to the MFP 10 (S909: YES), the process proceeds to S913, generates the MFP control instruction based on the return information and then finishes the service control information process.

As described above, with the image data processing system according to the third embodiment, similar to the second embodiment, the maximum holding period can be adjusted to be an appropriate value in accordance with the congestion status of the network. As a result, the waiting time period for which the MFP 10 waits for receipt of the command from the function server can be effectively reduced with avoiding the communication error.

It should be noted that the image data processing system according to the illustrative third embodiment can be modified in various ways without departing from aspects of the invention.

For example, in the above-described embodiment, the maximum holding period is automatically set. Aspects of the invention may modify the system such that that the maximum holding period may be set in accordance with a value input externally with an inputting operation. That is, if the user of the MFP 10 knows the timeout period in advance, the process may ask the user to input a desired maximum holding period through the operation panel 12*a* of the MFP 10, and transmit the input value to the function server 30 so that the maximum holding period is set in accordance with the transmitted value. Further, for example, the process may ask the user to input a timeout period instead of the maximum holding period, and calculate the maximum holding period based on the input timeout period. Then, by transmitting the thus calculated value to the function server 30, it becomes possible to have the function serer 30 set the maximum holding period.

In the above-described embodiment, the MFP 10 first receives the top item of the service definition information 25 from among the plurality of pieces of service definition information stored in the service definition information storage unit 24 of the directory server 20. Then, after a category is selected, the MFP 10 further receives the service definition information 25 corresponding to the selected category so that the service is elected. This configuration is only an illustrative one, and the invention need not be limited to this configuration. For example, the above configuration may be modified such that all the pieces of service definition information stored in the service definition information storage unit 24 of the directory server 20 is received at a time.

Further, as a parameter the service I/F information 36 requires to be set is not limited to the exemplified above (e.g., the resolution), and various parameters may be required depending on the contents of the service. For example, a selection of monochromatic/color, a selection of toner thickness (i.e., print thickness), and volume of the sound.

Further, the parameter which cannot be set by the service I/F information 36 may not be limited to one of the higher and lower parameters. That is, when the reading resolution can be set to 200 dpi, 300 dpi or 600 dpi, the parameter which cannot set by the service I/F information 36 may be 300 dip.

Fourth Embodiment

Next, the data processing system according to a fourth embodiment will be described. The configuration and processes of the fourth embodiment are substantially similar to the first embodiment. It should be noted that the session process and service control information process (FIGS. 14 and 22) have been replaces with the processes shown in FIGS. 35 and 36.

Session Process by MFP 10

Figure 35:
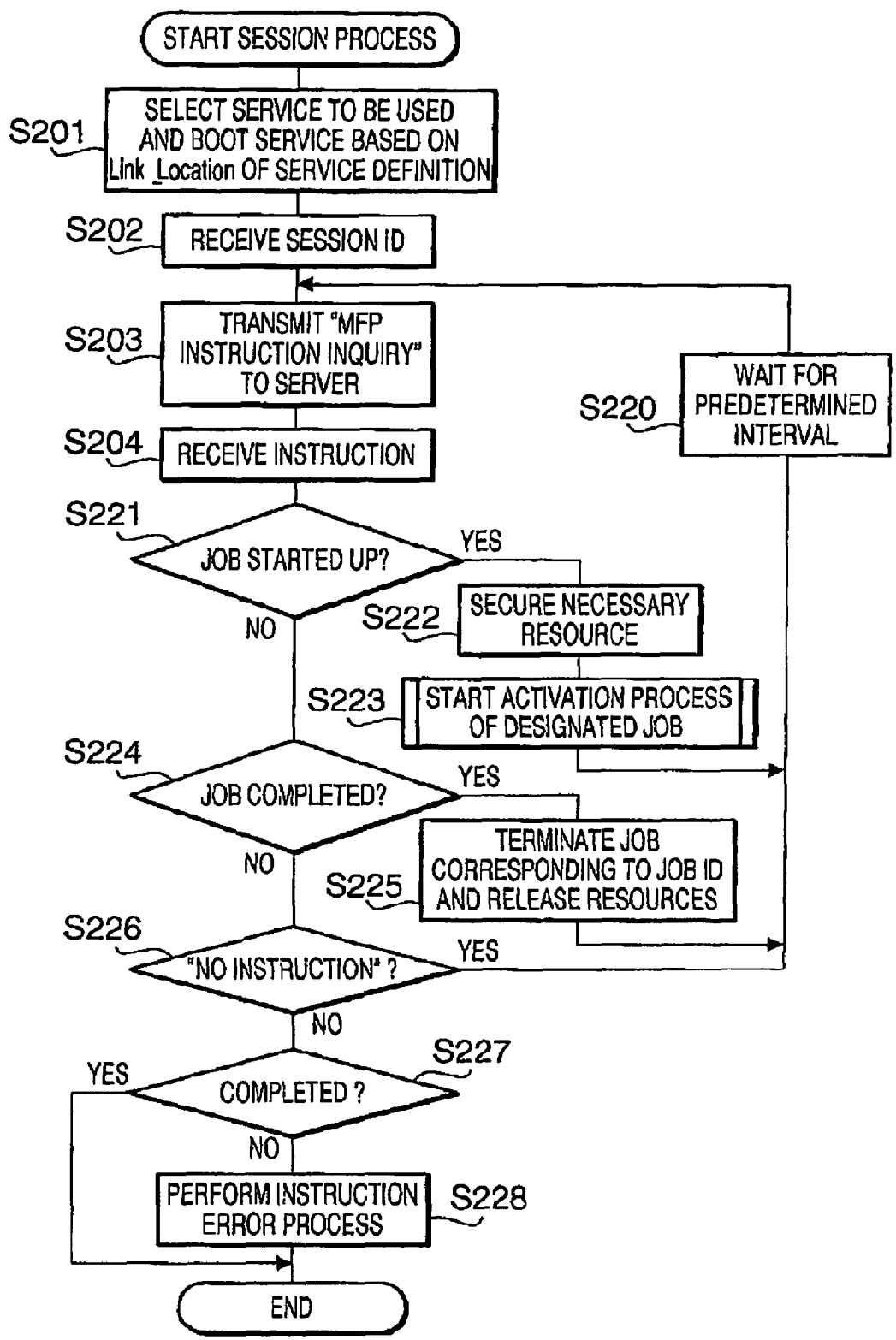
FIG. 35 shows a flowchart illustrating a session process executed by the MFP according to a fourth embodiment.

Referring to FIG. 35, the session process performed in S116 in the MFP process (FIG. 11) is explained below.

When this session process is started in S201, the process selects a service to be used, and activates the service, based on the Link_Location of the service definition information 25 (the URL, if URL has been entered directly). In other words, the process activates the service selected by the user by transmitting a service activation instruction to the service URL.

Next, the process receives a session ID from the function server 30 in S202. The session ID is generated in S805, in the function server process (FIG. 20), which is performed by the control unit 31 of the function server 30, and transmits the generated session ID in S809.

In S203, the process transmits an "MFP instruction inquiry", which refers to an inquiry into instructions to the MFP, to the function server 30. The session ID received in S202 is transmitted along with the MFP instruction inquiry.

Then, in S204, the process receives an instruction in response to the "MFP instruction inquiry" received in S203.

In S221 (FIG. 35), the process judges whether the instruction received in S204 is a job activation instruction. The process transmits job activation instructions respectively in S1003, S1007, and S1011, in the session process (FIG. 23), performed by the control unit 31 of the function server 30. The job ID and the job communication destination URL are transmitted along with the job activation instruction.

If the process determines in S221 that the instruction is a job activation instruction, the process proceeds to S222, reserves resources required for job activation, and proceeds to S223, then starts the activation process of the designated job. Then, the process proceeds to S220, and after waiting for a predetermined interval, returns to S203.

If the process determines in S221 that the instruction is not a job activation instruction, the process proceeds to S224, and judges whether the instruction received in S204 is a job completion instruction. The process transmits a job termination instructions respectively in S1019, S1021, and S1023, in the session process (FIG. 24), performed by the control unit 31 of the function server 30. The job ID that corresponds to the job to be terminated is transmitted along with the job activation instruction.

If the process determines in S224 that the instruction is a job termination instruction, the process proceeds to S225, terminates the job corresponding to the job ID, and releases the resources. Then, the process proceeds to S208 and, after waiting for a predetermined interval, returns to S203.

If the process determines in S224 that the instruction is not a job termination instruction, the process proceeds to S211, and judges whether the instruction received in S204 indicates "no instructions". In other words, the process judges whether the content transmitted in response to the "MFP instruction inquiry", transmitted in S203, indicates that there is no instruction.

If the process determines in S226 that the instruction received in S204 indicates "no instruction", the process proceeds to S220, and after waiting for a predetermined interval, returns to S203.

If the process determines in S226 that the instruction received in S204 does not indicate "no instruction", the process proceeds to S227, and judges whether the instruction received in S204 is a session termination instruction. It should be noted that when the MFP 10 receives the termination operation (e.g., depression of cancel key 51 during the execution of the service) by the user as an interruption process, the MFP 10 transmits the service termination instruction in response to the termination operation as above.

If, in S227, if it is determined that the instruction is not the termination instruction, that is, the instruction received in S204 is one of the job start instruction job completion instruction, "no instruction" and session completion instruction, the process proceeds to S228, and performs an instruction error process (e.g., a process for displaying an error message on the display 52 of the operation panel 12a). Thereafter, the session process is finished.

Service Control Information by the Function Server 30

Figure 36:
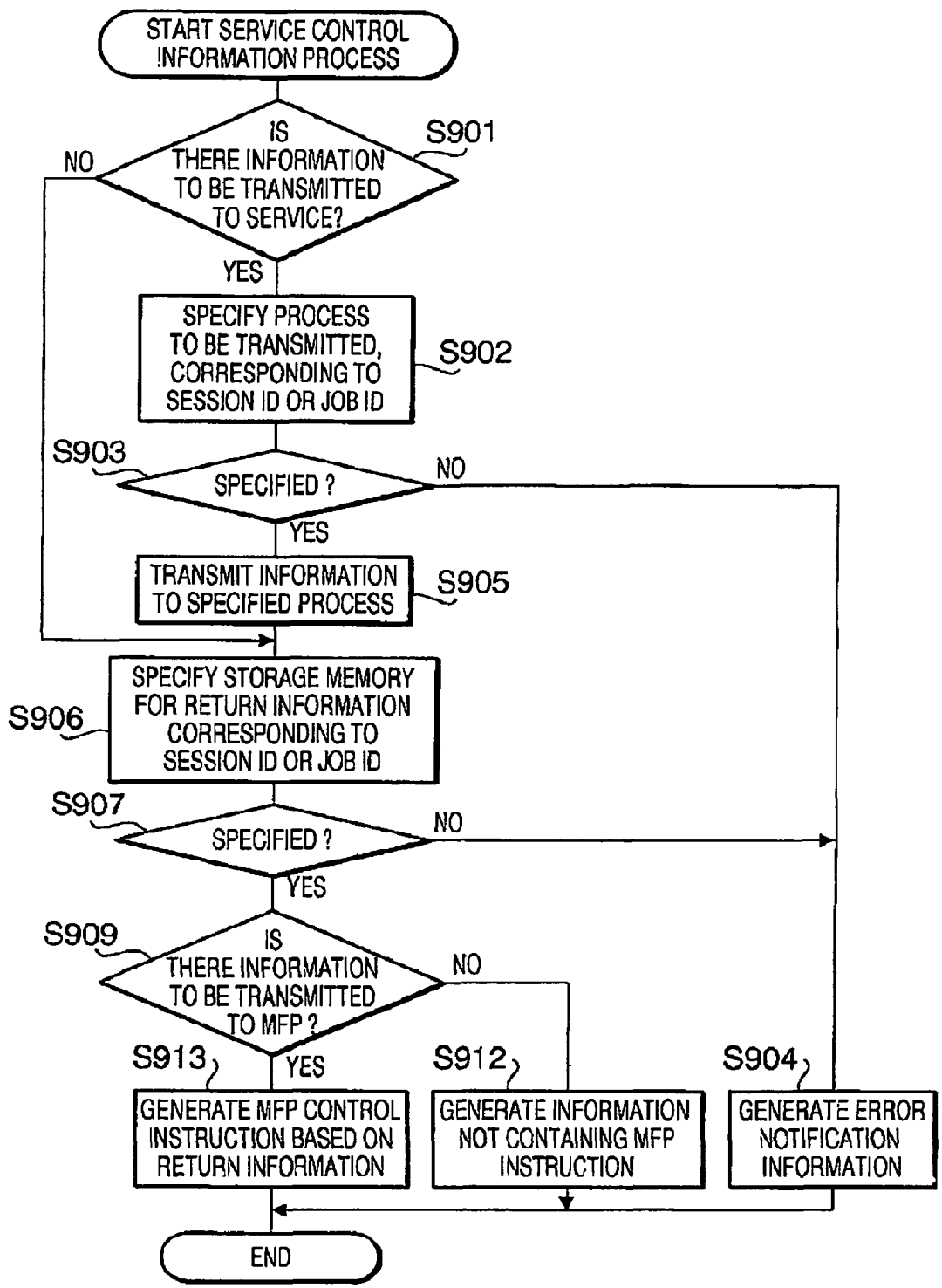
FIG. 36 shows a flowchart illustrating a service control information process executed by the function server according to the fourth embodiment.

Referring to FIG. 36, the service control information process performed in S808 in the function server process (FIG. 21) according to the fourth embodiment is explained in detail below.

When the service control information process is started, the process judges in S901 whether information to be transmitted to the service exists. Specifically, the process judges whether the HTTP request received in S801 in the function server process (FIG. 21) includes information regarding service (a session or a job).

If the process determines in S901 that information to be transmitted to the service exists, the process proceeds to S902 and specifies a process to be transmitted, which corresponds to the session ID or the job ID. In other words, the process that becomes the transmission destination of the information included in the received HTTP request is specified.

Next, the process judges in S903 whether the process can be specified.

If the process judges in S903 that the process cannot be specified due to an erroneous condition, the process proceeds to S904 and, after generating error notification information, completed the service control information process.

If the process judges is S903 that the process can be specified, the process proceeds to S905 and, after transmitting information to the specified process, returns to S906.

If the process judges in S901 that there is no information to be transmitted to the service, the process proceeds directly to S906.

The storage memory for returned information corresponding to the session ID or the job ID is specified in S906.

Next, the process judges whether the storage memory can be specified.

If the process determines in S907 that the storage memory cannot be specified, the process proceeds to S904 and, after generating error notification information, completed the service control information process.

If the process determines in S907 that the storage memory can be specified, the process proceeds to S908 and judges whether information to be transmitted to the MFP 10 exists.

If the process determines in S909 that these is information to be transmitted to the MFP 10, the process proceeds to S913 and, after generating an MFP control instruction based on the returned information, completes the service control information process.

If the process determines in S909 that these is no information to be transmitted to the MFP 10, the process proceeds to S912 and, after generating information without the MFP instruction, completes the service control information process.

With the image processing system according to the fourth embodiment, the control instruction for controlling the MFP 10 from the function server 10 is transmitted as the HTTP response in response to the HTTP request from the MFP 10. Therefore, even when a global network such as the Internet is used, services can be performed via the network without modifying the settings of the broadband router 2. Since the MFP 10 is connected to the network via the broadband router, the user can use the MFP 10 under a secure environment.

In the predetermined HTTP request transmitted from the MFP 10, a session ID intrinsic to each HTTP request is associated, and thus, the function server 30 can identify each session based on the session ID. Therefore, even if a plurality of MFPs 10 access the same service provided by the function server 30, and a plurality of sessions are executed substantially simultaneously, the sessions will not be mixed up, and the sessions are executed distinctively. Further, since the session ID and the job ID are generated in the function server 30, it is unnecessary to execute a process to prevent duplication of the session ID and job ID, and they can be assigned to the MFP 10 quickly. Further, since the HTTP response associating the control instruction for controlling the MFP 10 to finish a job executed thereby is transmitted together with the job ID, in the MFP 10, even if a plurality of jobs are executed in parallel, they will not be confused and the designated job can be terminated.

As described above, the MFP 10 judges whether a device that operates in accordance with the control instruction information associated with the HTTP response transmitted from the function server 30 can be used (i.e., whether the device is available or busy). If the device is not busy, the MFP 10 transmits the HTTP request associated with the control instruction request information to the function server 30. Therefore, it is not necessary to temporarily store the received control instruction information in the memory until the device becomes available. Accordingly, the memory resources can be saved, and further, a data reception error due to insufficient memory can be avoided.

In the foregoing description, the data (e.g., the image data) processing systems according to embodiments of the invention are described. It should be noted that the invention needs not be limited to the above described configurations of the illustrative embodiments, and various other configuration may also be possible without depart from aspects of the invention.

For example, the data processing system shown in FIG. 1 includes only one MFP 10, one directory server 20 and one function server 30. This configuration is mainly for simplifying the description and more than one MFPs 10, more than one directory servers 20 and/or more than one function servers 30 can be employed in the data processing system.

That is, for example, the data processing system may employ more than one MFPs 10. In such a case, the plurality of MFPs 10 may receive the service definition information 25 from the same directory server 20, and request for the common function server 30 for the service.

Further, for example, the data processing system may employ more than one directory servers 20. In such case, different directory servers 20 may be used for transmitting the top item of the service definition information 25 and each category data of the service definition information 25, respectively.

Furthermore, the data processing system may employ a plurality of function servers 30. In such a case, different function servers 30 may used for transmitting the service I/F information 36 and the executing the services, respectively. Further, different function servers 30 may be used for executing the session process and for executing the job service, respectively.

On the other hand, it may also be possible that, for example, a service A is executed by a first function server 30, services B-D are executed by a second function server 30, and service C is executed by a third function server 30. That is, each of the plurality of function servers 30 may execute the service(s) assigned thereto. In such a case, the service I/F information 36 may be transmitted by the function server 30 that executes the service(s) corresponding to the service I/F information. Alternatively, the service I/F information 36 may be transmitted by the function server 30 other than the function server that executes the service(s) corresponding to the service I/F information.

Further, in the above-described data processing system, the directory server 20 and the function server 30 may be implemented in a common computer.

Furthermore, the directory server 20 and/or the function server 30 may be built in one of the plurality of MFPs constituting the data processing system.

Various System Configurations

Hereinafter, various system configurations of the data (or image data) processing system will be described, referring to the drawings. In the drawings showing the system configurations, a symbol "R" represents a router, as in FIG. 1.

Configuration 1

Figure 37:
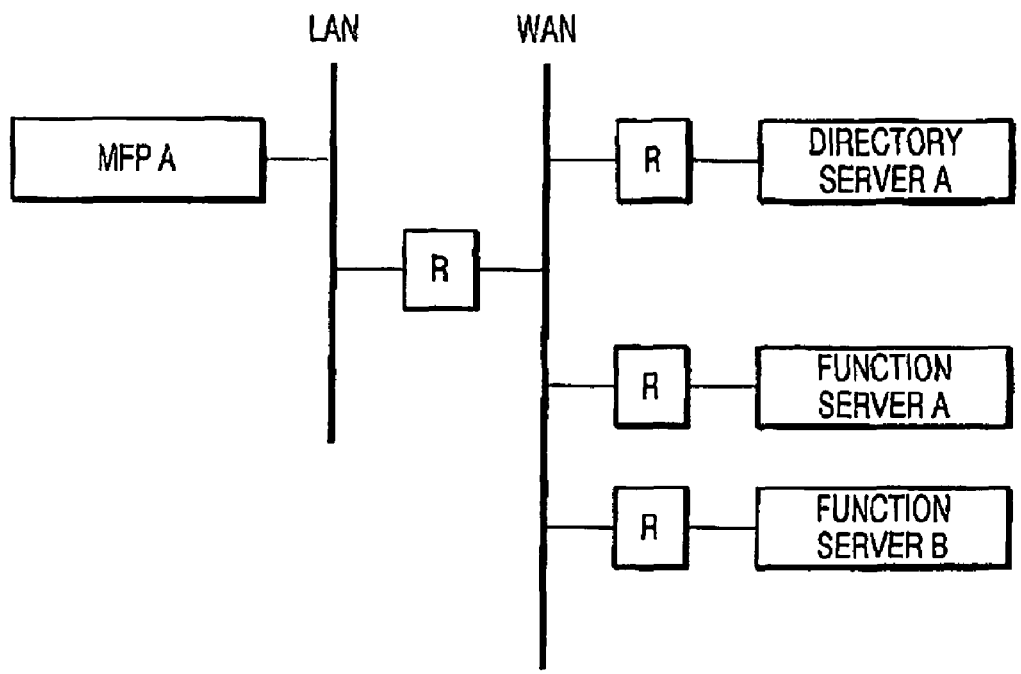
FIGS. 37 through 49 show first through thirteenth configurations of the image processing system, respectively.

FIG. 37 shows a first configuration of the data processing system.

As shown in FIG. 37, the image processing system includes an MFP A, a directory server A, a function server A and a function server B. The MFP A is connected to a LAN that is connected to a WAN via a router (broadband router) R. The directory server and the function servers A and B are also connected to the WAN via routers R, respectively.

Thus, the image processing system shown in FIG. 37 includes a plurality of function servers. In this system, each of the function servers A and B is configured to execute one or more services. Further, the each of the function servers A and B is configured to transmit the service I/F information 36 corresponding to the service each of the function servers A and B provides. Further, the directory server A is configured to transmit the service definition information 25 regarding the services the function servers A and B can execute to the MFP A. The MFP A request one of the function servers A and B for a service to be provided. The function servers A and B transmits the service I/F information 36 corresponding to the requested service, and the MFP A transmits input parameters to the function servers A and B.

The image processing system as above is convenient especially when a plurality of service providers provide services independently.

Configuration 2

Figure 38:
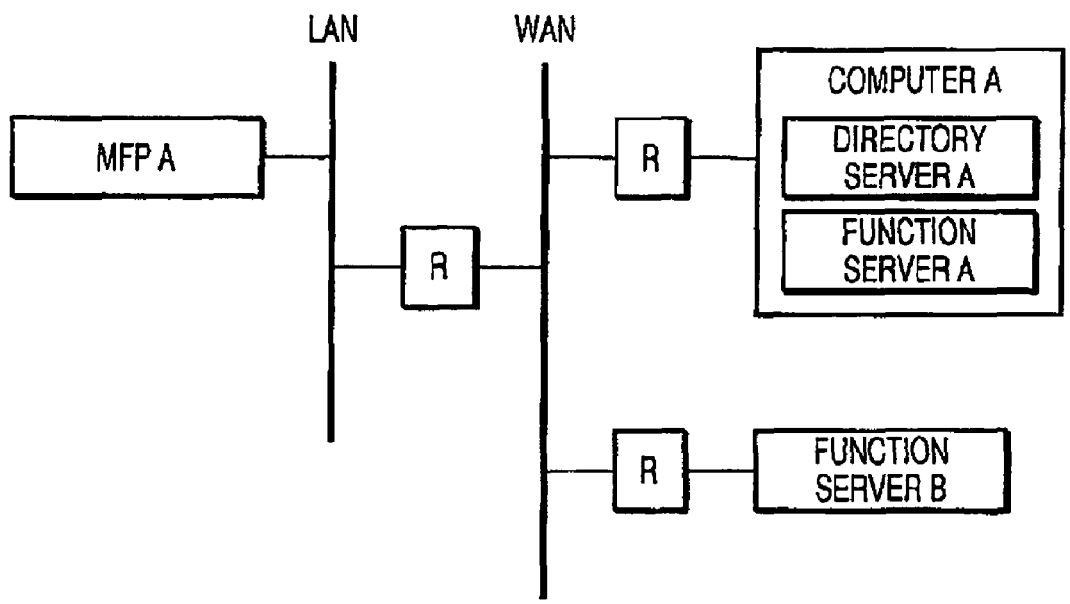

FIG. 38 shows a second configuration of the data processing system.

As shown in FIG. 38, the image processing system includes an MFP A, a computer A having functions of a directory server A and a function server A, and another function server B. The MFP A is connected to a LAN that is connected to a WAN via a router (broadband router) R. The computer A and the function server B are also connected to the WAN via routers R, respectively.

Thus, the image processing system shown in FIG. 38 is configured such that the directory server A and the function server A are constituted by the same computer A, and further the system includes a plurality of function servers.

In this system, each of the function servers A and B is configured to execute one or more services. Further, the each of the function servers A and B is configured to transmit the service I/F information 36 corresponding to the service each of the function servers A and B provides. Further, the directory server A is configured to transmit the service definition information 25 regarding the services the function servers A and B can execute to the MFP A. The MFP A request one of the function servers A and B for a service to be provided. The function servers A and B transmits the service I/F information 36 corresponding to the requested service, and the MFP A transmits input parameters to the function servers A and B.

The image processing system as above is convenient especially when a plurality of service providers provide services independently.

Configuration 3

Figure 39:
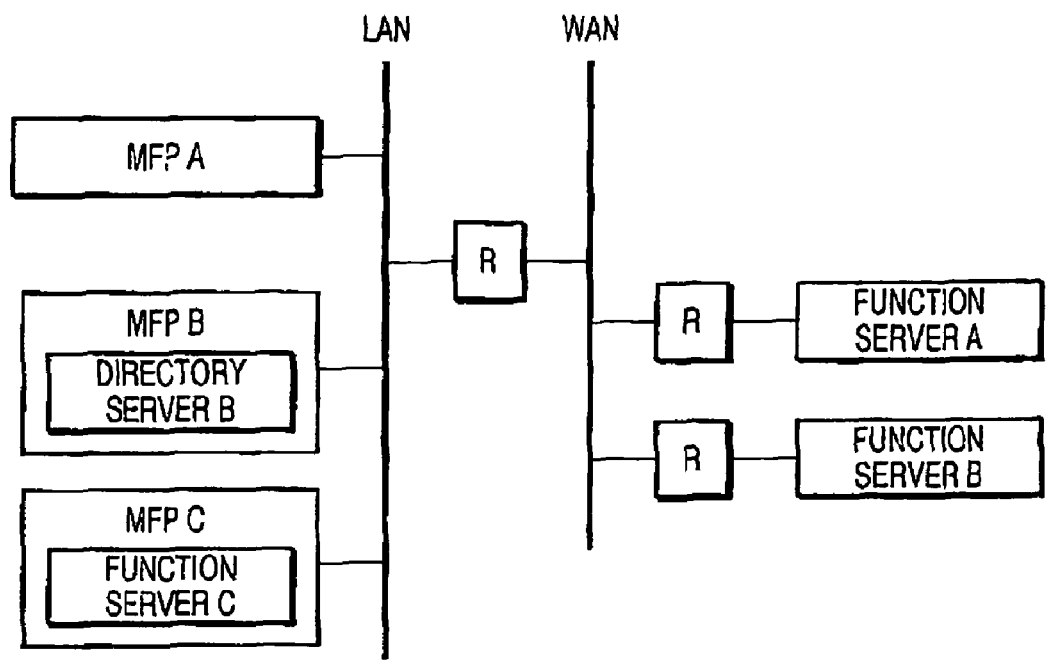

FIG. 39 shows a third configuration of the data processing system.

As shown in FIG. 39, the image processing system includes an MFP A, another MFP B that includes a directory server B and a function server A, another function server B, an MFP C, an MFP C having a function server C therein and function servers A and B. The MFP A, the MFP B and the MFP C are connected to a LAN that is connected to a WAN via a router (broadband router) R. The function server A and the function server B are also connected to the WAN via routers R, respectively.

Thus, the image processing system shown in FIG. 39 is configured such that a plurality of MFPs are provided, the directory serer B is built in the MFP B, the function server C is built in the function server C, and a plurality of function servers are provided.

In this system, each of the function servers A, B and C is configured to execute one or more services. Further, the each of the function servers A, B and C is configured to transmit the service I/F information 36 corresponding to the service each of the function servers A, B and C provides. Further, the directory server B is configured to transmit the service definition information 25 regarding the services of the function servers A, B and C to the MFPs A, B and C. The MFPs A, B and C request one of the function servers A, B and C for the service, in accordance with the contents of the service. Further, the function servers A, B and C transmit the service I/F information 36 corresponding to the requested service to the MFPs A, B and C. The MFPs A, B and C transmit the input parameters to the function servers A, B and C.

According to such an image processing system, it is unnecessary to use computers for constituting the directory server B and/or the function server C. Therefore, it is possible to configure the system in an inexpensive manner.

Configuration 4

Figure 40:
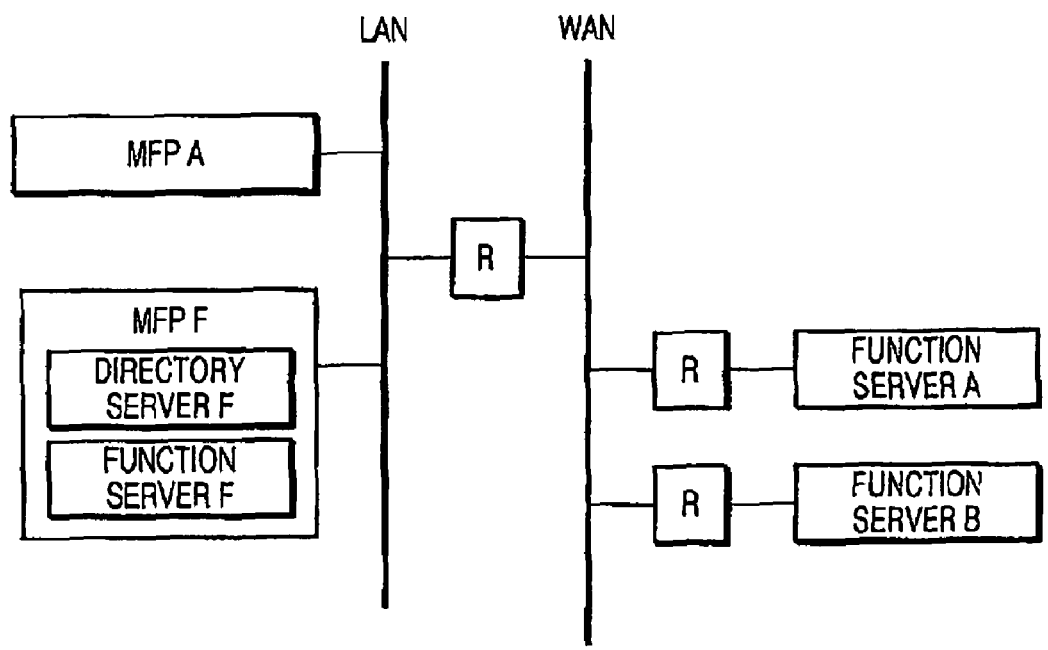

FIG. 40 shows a fourth configuration of an image processing system. As shown in FIG. 40, the image processing system includes an MFP A, another MFP F having built-in directory server F and the function server F, a function server A, and another function server B. The MFP A and the MFP F are connected to the LAN, respectively, and the LAN is connected to the WAN via a router R, which is a broadband router in this example. The function servers A and B are connected to the WAN via routers R, respectively.

The image processing system shown in FIG. 40 has a plurality of MFPs, and the directory server F and the function server F are included in the MFP F. Further, the system includes a plurality of function servers.

In this image processing system, each of the function servers A, B and F is configured to provide one or more services, and is capable of transmitting the service I/F information 36 corresponding to the service available. Further, the directory server F is capable of transmitting service definition information 25 regarding the services executable in the function servers A, B and F to the MFPs A and F. The MFPs A and F are configured to request one of the function servers A, B and F for a service. Further, the MFPs A and F transmit input parameters to the function servers A and F.

With the image processing system as described above, a computer that constitutes the directory server F or the function server F becomes unnecessary. Therefore, the system can be configured inexpensively.

Configuration 5

Figure 41:
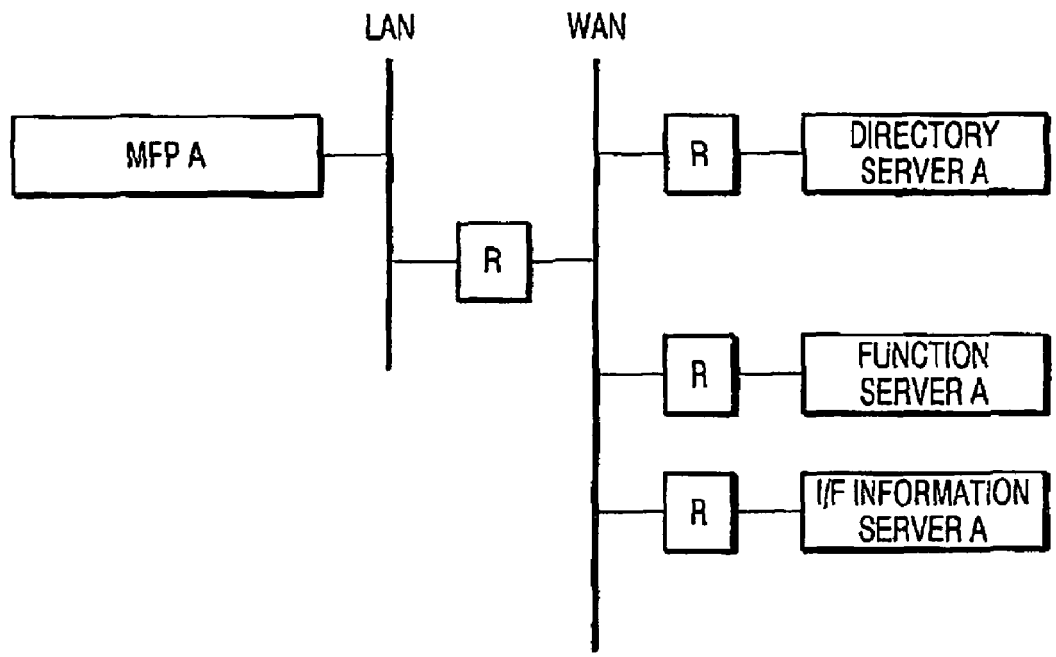

FIG. 41 shows a fourth system configuration of the image processing system. As shown in FIG. 41, the image processing system includes an MFP A, a directory server A, a function server A and an I/F information server A. The MFP A is connected to the LAN, and the LAN is connected to the WAN via a router (broadband router) R directory server A, the function server A and the I/F information server A are connected to the WAN via routers R, respectively. It should be noted that in the foregoing description a server having a function of executing a service, and a function of transmitting the service I/F information 36 is referred to as a function server. In the following description, a server executing a service will be referred to as the function server, and a server that transmits the service I/F information 36 will be referred to as the I/F information server.

In the fifth configuration, the server executing the service and the server for transmitting the service I/F information 36 are different.

The directory server A transmits the service definition information 25 regarding the services executable by the function server A to the MFP A, while the MFP A requests the I/F information server A to transmit the service I/F information corresponding to a requesting service. The I/F information server A transmits the service I/F information 36 to the MFP A, the MFP A transmits the input parameter to the function server A, thereby requesting for the service.

Configuration 6

Figure 42:
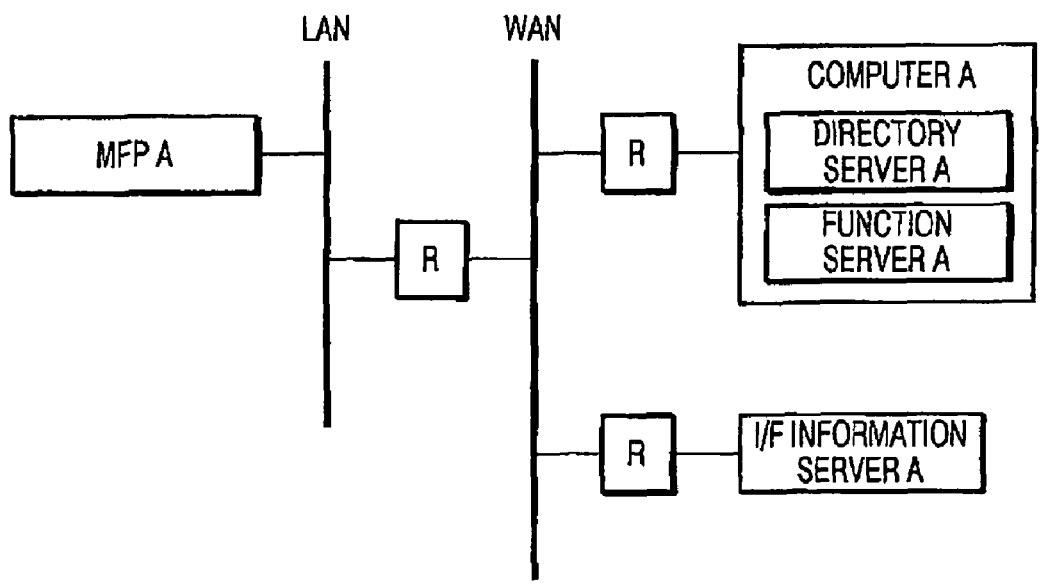

FIG. 42 shows a sixth configuration of the image processing system. As shown in FIG. 42, the image configuration system has an MFP A, a computer A including a directory server A and a function server A, and an I/F information server A. The MFP A is connected to a LAN, which is connected to a WAN via a router (broadband router) R. The computer A and the I/F information server A are connected to the WAN via routers R, respectively.

Thus, in the image processing system, the server for executing the service and the server for transmitting the I/F information 36 are different. Further, the directory server A and the function server A are composed of the same computer A.

In the image processing system configure as above, the directory server A transmits the service definition information 25 regarding the services executable by the function server A to the MFP A, which requests the I/F information server to transmit the I/F information 36 corresponding to a requesting service. The I/F information server A transmits the service I/F information 36 to the MFP A. Then, the MFP A transmits the input parameter to the function server to request for the service.

The above-described image processing system is configured such that the directory server A and the function server A are constituted by the same computer A. Therefore, an inexpensive image processing system can be configured.

Configuration 7

Figure 43:
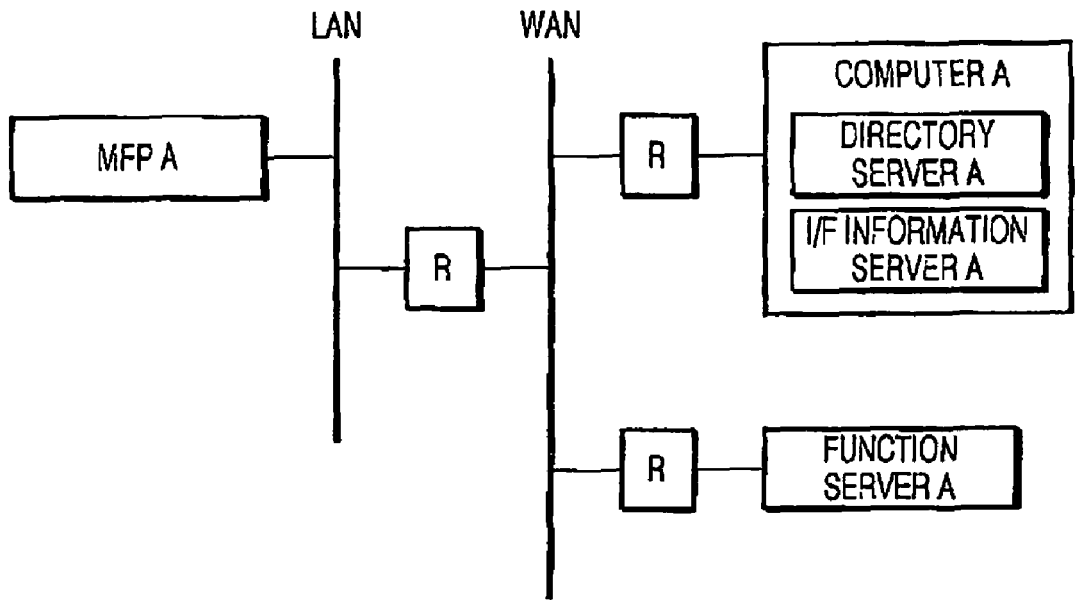

FIG. 43 shows a seventh configuration of the image processing system. As shown in FIG. 43, the image processing system includes an MFP A, a computer A including a directory server A and an I/F information server A, and a function server A. The MFP A is connected to a LAN, and the LAN is connected to a WAN via a router (broadband router) R. The computer A and the function server A are connected to the WAN via routers R, respectively.

Thus, the image processing system is configured such that the server executing the service and the server for transmitting the service I/F information are provided separately. Further, the directory server A and the I/F information server are provided in the same computer A.

In the image processing system configured as above, the directory server A transmits the service definition information 25 regarding the services executable in the function server A to the MFP A. The MFP A request the I/F information server A for the service I/F information 36 corresponding to a requesting service. The I/F information server A transmit the service I/F information 36 to the MFP A. Then, the MPF A transmits the input parameters to the function server A to request for the service.

Configuration 8

Figure 44:
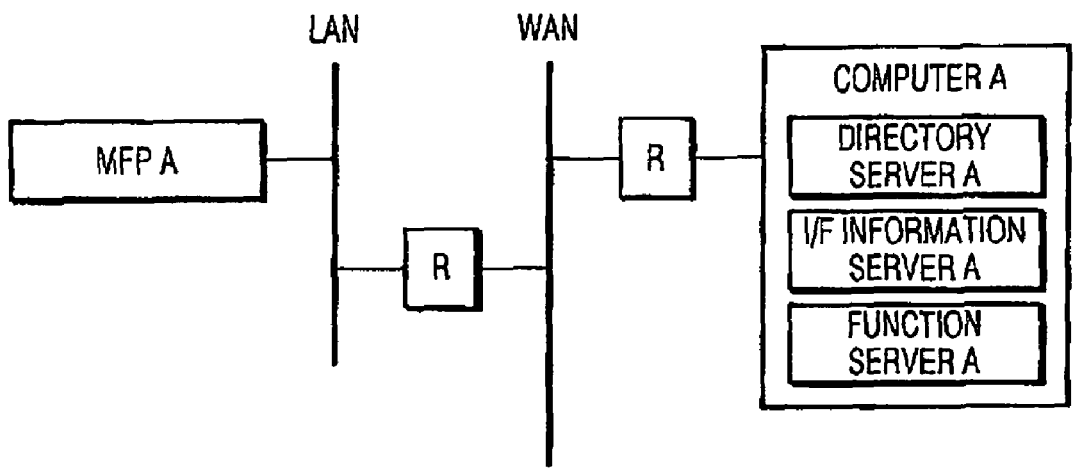

FIG. 44 shows an eighth configuration of the image processing system. As shown in FIG. 44, the image processing system includes an MFP A, and a computer A including a directory server A, an I/F information server A and a function server A. The MFP A is connected to a LAN, and the LAN in connected to a WAN via a router (broadband router) R. The computer A is connected to the WAN via a router R.

Thus, the image processing system is configured such that the server executing the service and server for transmitting the service I/F information 36 are provided separately, and the directory server A and the I/F information server A are composed of the same computer AS.

In this image processing system, the directory server A transmits the service definition information 25 regarding the services executable by the function server A to the MFP A. The MFP A requests the I/F information server to transmit the service I/F information 36 corresponding to a requesting service. The I/F information server A transmits the service I/F information 36 to the MFP A. Then, the MFP A transmits the input parameter to the function server A to request for the service.

With this configuration, since the directory server A, I/F information server A and the function server A are constituted by the same computer, an inexpensive system can be configured.

Configuration 9

Figure 45:
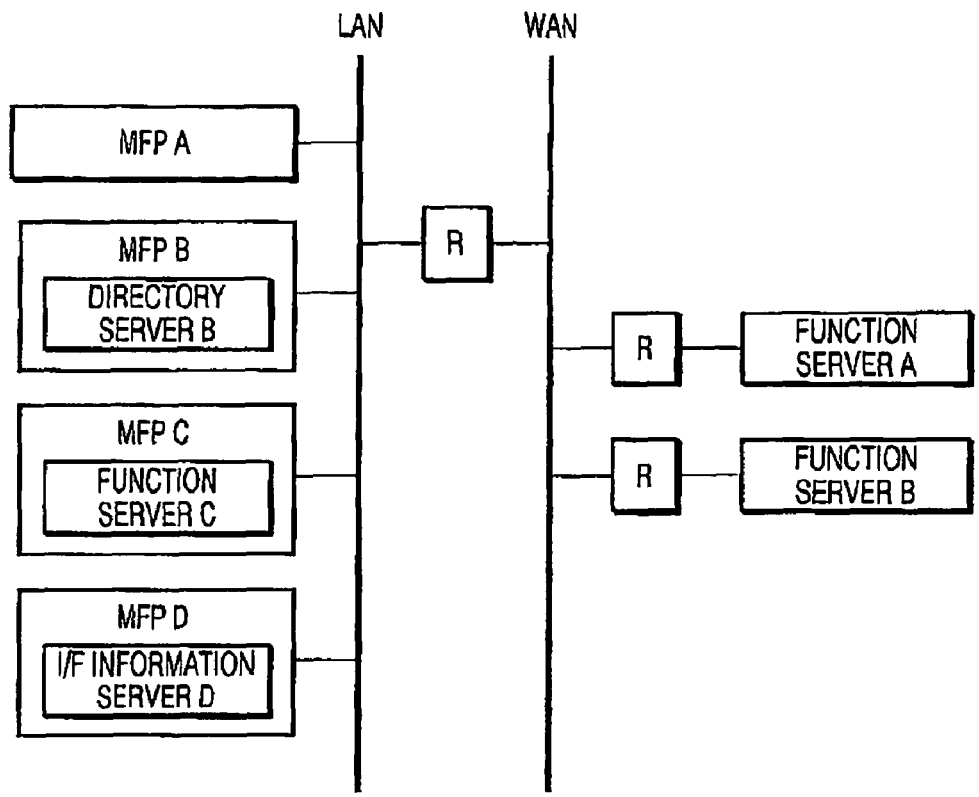

FIG. 45 shows a ninth configuration of the image processing system. In this configuration, the image processing device has an MFP A, another MFP B including a directory server B, an MFP C including a function server C, another MFP D including an I/F information server D, a function server A and a function server B. The MFPs A-D are connected to a LAN, and the LAN is connected to a WAN via a router (broadband router) R. The function servers A and B are connected to the WAN via routers R, respectively.

As above, the image processing system includes a plurality of MFPs. Further, a server for executing the service and a server for transmitting the service I/F information 36 are provided separately. Furthermore, the image processing system includes a plurality of function servers. As described above, the directory server B, the function server C and the I/F information server D are built in the MFPs B, C and D, respectively.

In the image processing system configured as above, the directory server B transmits the service definition information 25 regarding services executable by the function servers A, B and C to the MFPs A, B, C and D the MFPs A-D each requests the I/F information server D to transmit the service I/F information 36 corresponding to requesting services. The I/F information server D transmits the service I/F information 36 to the MFPs A-D, and the MFPs A-D transmit the input parameters to function servers A, B and/or C corresponding to the requesting service to request for the service.

The image processing system above can be configured in inexpensively since computers functioning as the directory server B, function server B and/or I/F information server D are unnecessary.

Configuration 10

Figure 46:
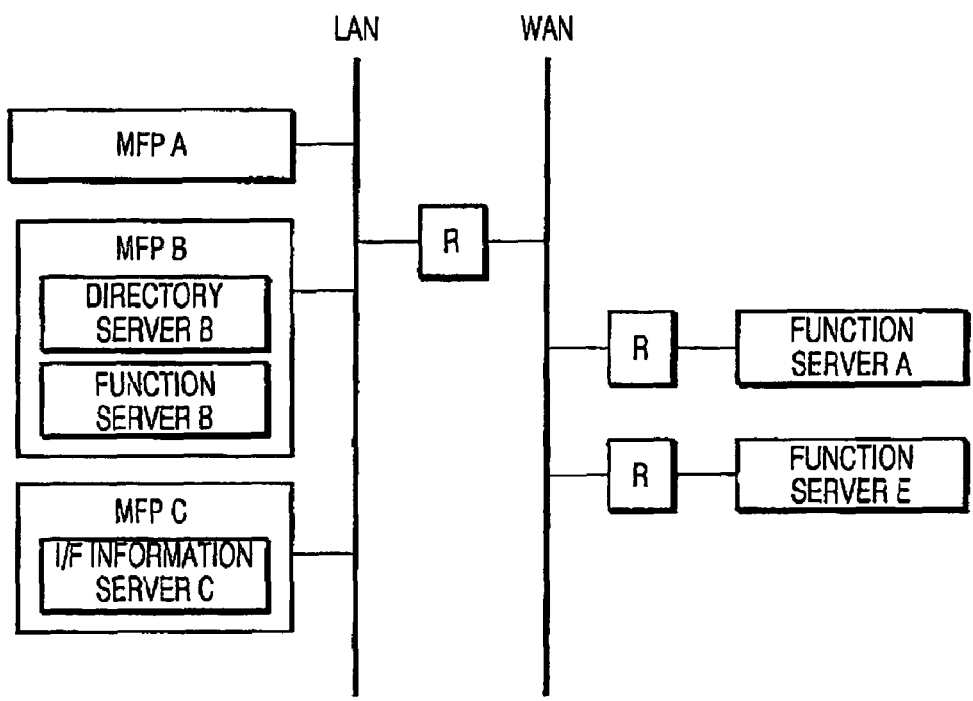

FIG. 46 shows a tenth configuration of the image processing system. According to this configuration, the image processing system includes an MFP A, an MFP B including a directory server B and a function server B, an MFP C including an I/F information server C, a function server A and a function server E. The MFPs A-C are connected to a LAN, and the LAN is connected to a WAN via a router (broadband router) R. Further, the function servers A and E are connected to the WAN via routers R, respectively.

Thus, it is characteristic that the image processing system includes a plurality of MFPs, a server for executing the service and a server for transmitting the service I/F information 36 are provided separately, a plurality of function servers are provided, the directory server B and the function server B are built in the MFP B, and the I/F information server C is built in the MFP C.

In the image processing system described above, the directory server B transmit the service definition information 25 regarding the services executable by the function servers A, B and E to the MFPs A, B and C. The MFPs A, B and C request the I/F information server C to transmit the service I/F information 36 corresponding to requesting services. Then, the I/F information server C transmit the service I/F information 36 to the MFPs A, B and C. The MFPs A, B and C transmit the parameters to the function servers A, B and/or C corresponding to the requested service, and finishes the service.

With this configuration, the image processing system can be configured inexpensively since the computers functioning as the directory server B and/or the I/F information server C are unnecessary.

Configuration 11

Figure 47:
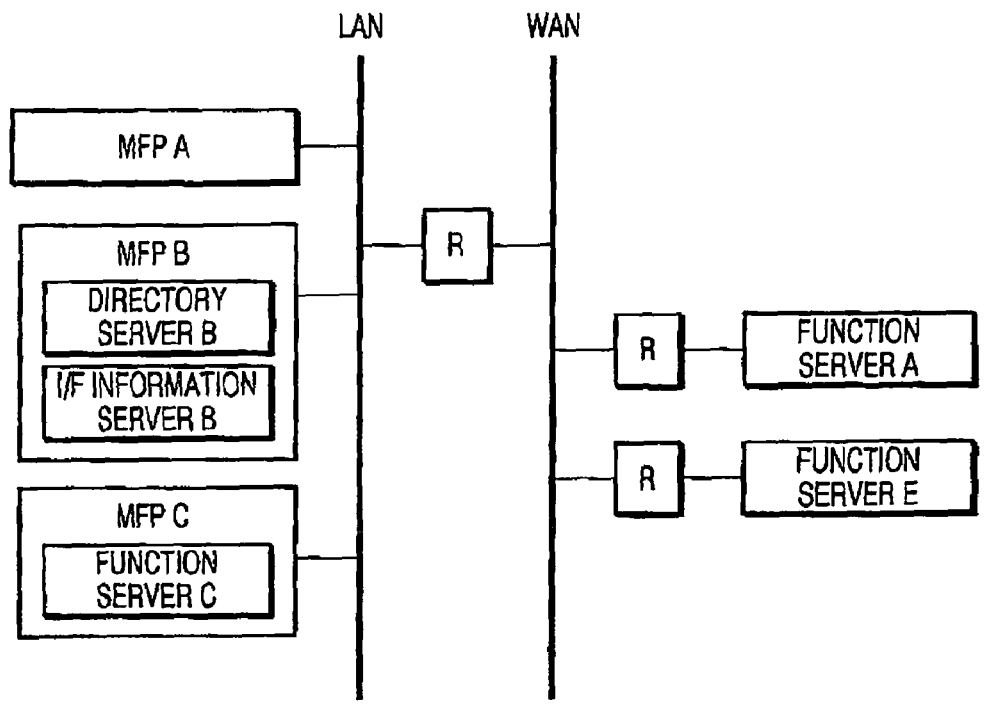

FIG. 47 shows an eleventh configuration of the image processing system. According to this configuration, the image processing system includes an MFP A, an MFP B including a directory server B and an I/F information server B, an MFP C including a function server C, a function server A and a function server E. The MFPs A-C are connected to a LAN, and the LAN is connected to a WAN via a router (broadband router) R. Further, the function servers A and E are connected to the WAN via routers R, respectively.

Thus, it is characteristic that the image processing system includes a plurality of MFPs, a server for executing the service and a server for transmitting the service I/F information 36 are provided separately, a plurality of function servers are provided, the directory server B and the I/F information server B are built in the MFP B, and the function server C is built in the MFP C.

In the image processing system described above, the directory server B transmits the service definition information 25 regarding the services executable by the function servers A, C and E to the MFPs A, B and C. The MFPs A, B and C request the I/F information server B to transmit the service I/F information 36 corresponding to requesting services. Then, the I/F information server B transmits the service I/F information 36 to the MFPs A, B and C. The MFPs A, B and C transmit the input parameters to the function servers A, B and/or E corresponding to the requested service, and finishes the service.

With this configuration, the image processing system can be configured inexpensively since the computers functioning as the directory server B, I/F information server B and/or the function server C are unnecessary.

Configuration 12

Figure 48:
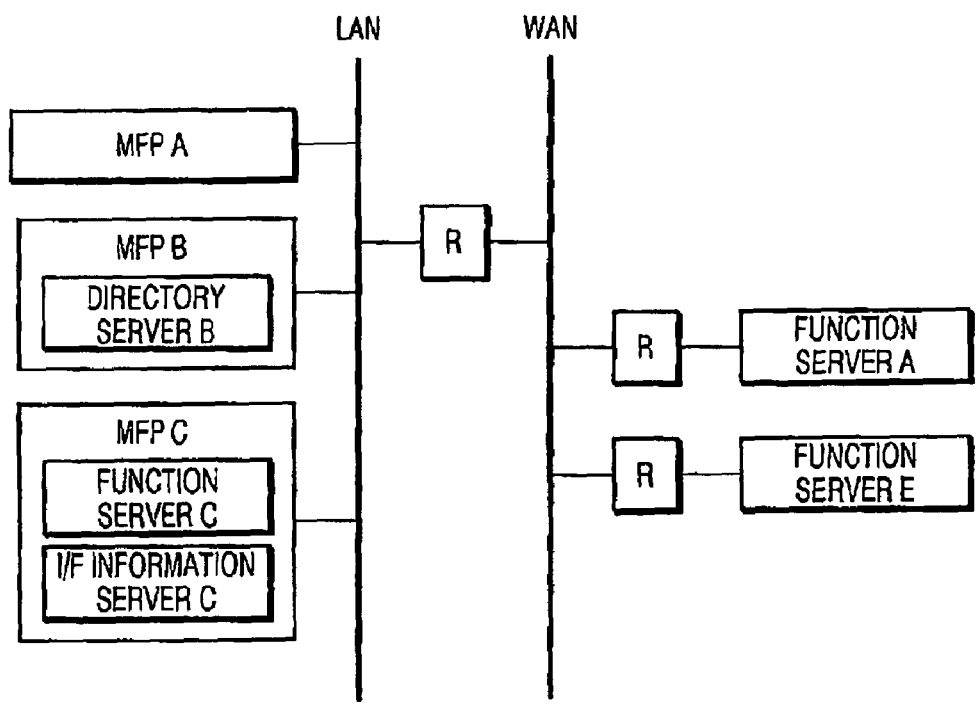

FIG. 48 shows a twelfth configuration of the image processing system. According to this configuration, the image processing system includes an MFP A, an MFP B including a directory server B, an MFP C including a function server C and an I/F information server C, a function server A and a function server E. The MFPs A-C are connected to a LAN, and the LAN is connected to a WAN via a router (broadband router) R. Further, the function servers A and E are connected to the WAN via routers R, respectively.

Thus, it is characteristic that the image processing system includes a plurality of MFPs, a server for executing the service and a server for transmitting the service I/F information 36 are provided separately, a plurality of function servers are provided, the directory server B is built in the MFP B, and the function server C and the I/F information server C are built in the MFP C.

In the image processing system configured above, the directory server B transmits the service definition information 25 regarding the services executable by the function servers A, C and E to the MFPs A, B and C. The MFPs A, B and C request the I/F information server C to transmit the service I/F information 36 corresponding to requesting services. Then, the I/F information server C transmits the service I/F information 36 to the MFPs A, B and C. The MFPs A, B and C transmit the input parameters to the function servers A, C and/or E corresponding to the requested service, and finishes the service.

With this configuration, the image processing system can be configured inexpensively since the computers functioning as the directory server B, function server C and/or the I/F information server C are unnecessary.

Configuration 13

Figure 49:
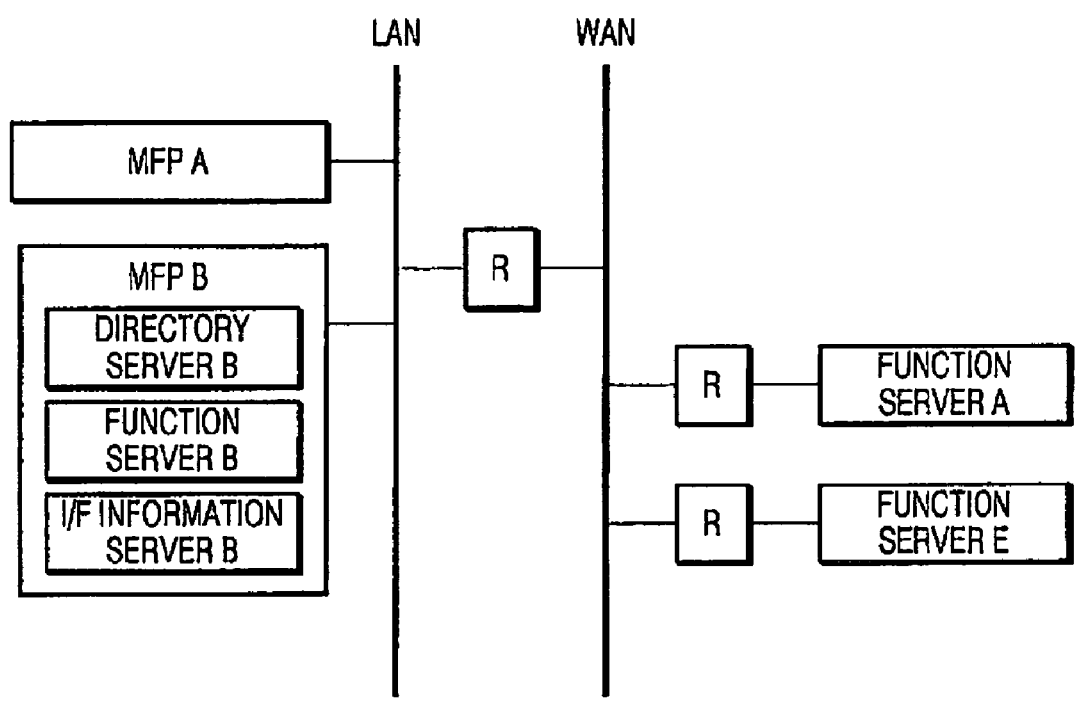

FIG. 49 shows a twelfth configuration of the image processing system. According to this configuration, the image processing system includes an MFP A, an MFP B including a directory server B, a function server B and an I/F information server B, a function server A and a function server E. The MFPs A and B are connected to a LAN, and the LAN is connected to a WAN via a router (broadband router) R. Further, the function servers A and E are connected to the WAN via routers R, respectively.

Thus, it is characteristic that the image processing system includes a plurality of MFPs, a server for executing the service and a server for transmitting the service I/F information 36 are provided separately, a plurality of function servers are provided, the directory server B, function server B and I/F information server B are built in the MFP B.

In the image processing system configured above, the directory server B transmits the service definition information 25 regarding the services executable by the function servers A, B and E to the MFPs A and B. The MFPs A and B request the I/F information server B to transmit the service I/F information 36 corresponding to requesting services. Then, the I/F information server B transmits the service I/F information 36 to the MFPs A and B. The MFPs A and B transmit the input parameters to the function servers A, B and/or E corresponding to the requested service, and finishes the service.

With this configuration, the image processing system can be configured inexpensively since the computers functioning as the directory server B, function server B and/or the I/F information server B are unnecessary.

What is claimed is:

1. An image processing system, comprising:
   an image processing device having at least one of (a) an image reading unit configured to read an image and generate image data, and (b) an image forming unit that forms an image represented by the image data; and
   a service providing device configured to execute a service regarding at least one of (a) image data generated by the image reading unit, and (b) image data representing an image to be formed by the image forming unit,
   the image processing device and the service providing device being connected to a network so as to communicate with each other,
   the image processing device being configured to transmit request information to the service providing device,
   the service providing device being configured to transmit response information to the image processing device as a response to the request information,
   the image processing device and the service providing device exchanging control information with each other using messages respectively associated with the request information and the response information,
   wherein the image processing device includes:
   a command requesting unit that transmits control command request information to the service providing device by incorporating, as the control information, the control command request information into the message associated with the request information, the control command request information being for requesting the service providing device to transmit, when the service is executed, control command information which is a control instruction for controlling the image processing device; and
   a command executing unit that executes a predetermined process in accordance with the control command information,
   wherein the service providing device includes:
   a service executing unit that executes the service; and
   a command transmitting unit that transmits the control command information to the image processing device by incorporating the control command information, as the control information, into the message associated with the response information, and
   wherein the command executing unit executes a predetermined process in accordance with the control command information associated with the response information and transmitted from the service providing device,
   wherein the image processing device is connected to the network via security system which is configured such that, among pieces of data transmitted from the network to the image processing device, the response information which is a response to the request information transmitted from the image processing device to the network is allowed to be transmitted, while the other data is shielded,
   wherein the image processing device and the service providing device execute therebetween a session which is a series of communicating procedures from the start of the service to the end thereof,
   wherein the command requesting unit of the image processing device transmits at least one of (a) a session ID which is identification information for identifying the session, and (b) a job ID which is identification information for identifying a job executed by the image processing device in the session, in association with the predetermined request information to be transmitted in the session to the service providing device,
   wherein the service executing unit provided to the service providing device identifies the session based on at least one of the session ID transmitted in association with the request information as transmitted and the job ID transmitted in association with the request information as transmitted, the service executing unit executing a process corresponding to the identified one of the session and job in accordance with the control command request information associated with the request information,
   wherein the command transmitting unit transmits the control command information and the job ID by incorporating the control command information and the job ID into the message associated with the response information, and
   wherein, when the image processing device receives the response information associating the control command information and the job ID, the command executing unit executes a process in accordance with the control command information and the job ID associated with the response information.

2. The image processing system according to claim 1,
   wherein the service executing unit generates the session ID corresponding to the service and assigns the session ID to the image processing device.

3. The image processing system according to claim 1,
   wherein the command transmitting unit generates the job ID and assigns the job ID to the image processing device by transmitting the job ID to the image processing device.

4. The image processing system according to claim 1,
   wherein the command transmitting unit transmits the response information associating the control command information for finishing the job to the image processing device together with the job ID, and
   wherein the command executing unit finishes the job corresponding to the job ID transmitted to the image processing device.

5. The image processing system according to claim 1,
   wherein the image processing device includes a transmission judging unit configured to judge whether the control command request information is to be transmitted to the service providing device based on a status of the image processing device, and
   wherein the command requesting unit transmits the control command request information to the service providing device when the transmission judging unit determines that the image processing device is in a status where the request information associated with the control command request information is to be transmitted.

6. The image processing system according to claim 1,
   wherein the image processing device is provided with at least one of (a) a sound input unit that receives sound and generates sound data representing the received sound, and (b) a sound output unit configured to output sound represented by the sound data, and wherein the service providing device executes a service related to at least one of the sound data generated by the sound input unit and sound data transmitted to the sound output unit in response to the request by the image processing device.

7. The image processing system according to claim 6, wherein the control command information associated with the response information transmitted by the command transmitting unit provided to the service providing device includes a command for controlling one of the sound input unit and the sound output unit provided to the image processing device.

8. The image processing system according to claim 1, wherein the control command information associated with the response information transmitted by the command transmitting unit includes a command for controlling one of the image reading unit and the image forming unit provided the image processing device.

9. The image processing system according to claim 1, wherein the image processing device includes an operation unit configured to notify a user of information and to accept an operation of the image processing device by the user, and wherein the control command information associated with the response information transmitted by the command transmitting unit includes a command for controlling the operation unit.

10. An image processing device for an image processing system, the image processing device having at least one of (a) an image reading unit configured to read an image and generate image data, and (b) an image forming unit that forms an image represented by the image data, the image processing system further including:

a service providing device configured to execute a service regarding at least one of (a) image data generated by the image reading unit, and (b) image data representing an image to be formed by the image forming unit, the image processing device and the service providing device being connected to a network so as to communicate with each other, the image processing device being configured to transmit request information to the service providing device, the service providing device being configured to transmit response information to the image processing device as a response to the request information, the image processing device and the service providing device exchanging control information with each other using messages respectively associated with the request information and the response information, wherein the image processing device includes:

a command requesting unit that transmits control command request information to the service providing device by incorporating, as the control information, the control command request information into the message associated with the request information, the control command request information being for requesting the service providing device to transmit, when the service is executed, control command information which is a control instruction for controlling the image processing device; and a command executing unit that executes a predetermined process in accordance with the control command information, wherein the service providing device includes:

a service executing unit that executes the service;

a command transmitting unit that transmits the control command information to the image processing device by incorporating the control command information, as the control information, into the message associated with the response information, and wherein the command executing unit executes a predetermined process in accordance with the control command information associated with the response information and transmitted from the service providing device, wherein the image processing device is connected to the network via security system which is configured such that, among pieces of data transmitted from the network to the image processing device, the response information which is a response to the request information transmitted from the image processing device to the network is allowed to be transmitted, while the other data is shielded, wherein the image processing device and the service providing device execute therebetween a session which is a series of communicating procedures from the start of the service to the end thereof, wherein the command requesting unit of the image processing device transmits at least one of (a) a session ID which is identification information for identifying the session, and (b) a job ID which is identification information for identifying a job executed by the image processing device in the session, in association with the predetermined request information to be transmitted in the session to the service providing device, wherein the service executing unit provided to the service providing device identifies the session based on at least one of the session ID transmitted in association with the request information as transmitted and the job ID transmitted in association with the request information as transmitted, the service executing unit executing a process corresponding to the identified one of the session and job in accordance with the control command request information associated with the request information, wherein the command transmitting unit transmits the control command information and the job ID by incorporating the control command information and the job ID into the message associated with the response information, and wherein, when the image processing device receives the response information associating the control command information and the job ID, the command executing unit executes a process in accordance with the control command information and the job ID associated with the response information.

11. A server functioning as a service providing device for an image processing system, the image processing system including:

an image processing device having at least one of (a) an image reading unit configured to read an image and generate image data, and (b) an image forming unit that forms an image represented by the image data, wherein the service providing device is configured to execute a service regarding at least one of (a) image data generated by the image reading unit, and (b) image data representing an image to be formed by the image forming unit, the image processing device and the service providing device being connected to a network so as to communicate with each other, the image processing device being configured to transmit request information to the service providing device, the service providing device being configured to transmit response information to the image processing device as a response to the request information, the image processing device and the service providing device exchanging control information with each other using messages respectively associated with the request information and the response information, wherein the image processing device includes:

a command requesting unit that transmits control command request information to the service providing device by incorporating, as the control information, the control command request information into the message associated with the request information, the control command request information being for requesting the service providing device to transmit, when the service is executed, control command information which is a control instruction for controlling the image processing device; and a command executing unit that executes a predetermined process in accordance with the control command information, wherein the service providing device includes:

a service executing unit that executes the service;

a command transmitting unit that transmits the control command information to the image processing device by incorporating the control command information, as the control information, into the message associated with the response information, and wherein the command executing unit executes a predetermined process in accordance with the control command information associated with the response information and transmitted from the service providing device, wherein the image processing device is connected to the network via security system which is configured such that, among pieces of data transmitted from the network to the image processing device, the response information which is a response to the request information transmitted from the image processing device to the network is allowed to be transmitted, while the other data is shielded, wherein the image processing device and the service providing device execute therebetween a session which is a series of communicating procedures from the start of the service to the end thereof, wherein the command requesting unit of the image processing device transmits at least one of (a) a session ID which is identification information for identifying the session, and (b) a job ID which is identification information for identifying a job executed by the image processing device in the session, in association with the predetermined request information to be transmitted in the session to the service providing device, wherein the service executing unit provided to the service providing device identifies the session based on at least one of the session ID transmitted in association with the request information as transmitted and the job ID transmitted in association with the request information as transmitted, the service executing unit executing a process corresponding to the identified one of the session and job in accordance with the control command request information associated with the request information, wherein the command transmitting unit transmits the control command information and the job ID by incorporating the control command information and the job ID into the message associated with the response information, and wherein, when the image processing device receives the response information associating the control command information and the job ID, the command executing unit executes a process in accordance with the control command information and the job ID associated with the response information.

12. A non-transitory computer-readable medium having a program stored thereon, said program comprising computer readable instructions which cause a computer to function as an image processing device for an image processing system, the image processing device having at least one of (a) an image reading unit configured to read an image and generate image data, and (b) an image forming unit that forms an image represented by the image data, the image processing system further including:

a service providing device configured to execute a service regarding at least one of (a) image data generated by the image reading unit, and (b) image data representing an image to be formed by the image forming unit, the image processing device and the service providing device being connected to a network so as to communicate with each other, the image processing device being configured to transmit request information to the service providing device, the service providing device being configured to transmit response information to the image processing device as a response to the request information, the image processing device and the service providing device exchanging control information with each other using messages respectively associated with the request information and the response information, wherein the image processing device includes:

a command requesting unit that transmits control command request information to the service providing device by incorporating, as the control information, the control command request information into the message associated with the request information, the control command request information being for requesting the service providing device to transmit, when the service is executed, control command information which is a control instruction for controlling the image processing device; and a command executing unit that executes a predetermined process in accordance with the control command information, wherein the service providing device includes:

a service executing unit that executes the service;

a command transmitting unit that transmits the control command information to the image processing device by incorporating the control command information, as the control information, into the message associated with the response information, and wherein the command executing unit executes a predetermined process in accordance with the control command information associated with the response information and transmitted from the service providing device, wherein the image processing device is connected to the network via security system which is configured such that, among pieces of data transmitted from the network to the image processing device, the response information which is a response to the request information transmitted from the image processing device to the network is allowed to be transmitted, while the other data is shielded, wherein the image processing device and the service providing device execute therebetween a session which is a series of communicating procedures from the start of the service to the end thereof, wherein the command requesting unit of the image processing device transmits at least one of (a) a session ID which is identification information for identifying the session, and (b) a job ID which is identification information for identifying a job executed by the image processing device in the session, in association with the predetermined request information to be transmitted in the session to the service providing device, wherein the service executing unit provided to the service providing device identifies the session based on at least one of the session ID transmitted in association with the request information as transmitted and the job ID transmitted in association with the request information as transmitted, the service executing unit executing a process corresponding to the identified one of the session and job in accordance with the control command request information associated with the request information, wherein the command transmitting unit transmits the control command information and the job ID by incorporating the control command information and the job ID into the message associated with the response information, and wherein, when the image processing device receives the response information associating the control command information and the job ID, the command executing unit executes a process in accordance with the control command information and the job ID associated with the response information.

13. A non-transitory computer-readable medium having computer readable instructions stored thereon that cause a computer to function as a server having a function of a service providing device for an image processing system, the image processing system including:

an image processing device having at least one of (a) an image reading unit configured to read an image and generate image data, and (b) an image forming unit that forms an image represented by the image data, wherein the service providing device is configured to execute a service regarding at least one of (a) image data generated by the image reading unit, and (b) image data representing an image to be formed by the image forming unit, the image processing device and the service providing device being connected to a network so as to communicate with each other, the image processing device being configured to transmit request information to the service providing device, the service providing device being configured to transmit response information to the image processing device as a response to the request information, the image processing device and the service providing device exchanging control information with each other using messages respectively associated with the request information and the response information, wherein the image processing device includes:

a command requesting unit that transmits control command request information to the service providing device by incorporating, as the control information, the control command request information into the message associated with the request information, the control command request information being for requesting the service providing device to transmit, when the service is executed, control command information which is a control instruction for controlling the image processing device; and a command executing unit that executes a predetermined process in accordance with the control command information, wherein the service providing device includes:

a service executing unit that executes the service;

a command transmitting unit that transmits the control command information to the image processing device by incorporating the control command information, as the control information, into the message associated with the response information, and wherein the command executing unit executes a predetermined process in accordance with the control command information associated with the response information and transmitted from the service providing device, wherein the image processing device is connected to the network via security system which is configured such that, among pieces of data transmitted from the network to the image processing device, the response information which is a response to the request information transmitted from the image processing device to the network is allowed to be transmitted, while the other data is shielded, wherein the image processing device and the service providing device execute therebetween a session which is a series of communicating procedures from the start of the service to the end thereof, wherein the command requesting unit of the image processing device transmits at least one of (a) a session ID which is identification information for identifying the session, and (b) a job ID which is identification information for identifying a job executed by the image processing device in the session, in association with the predetermined request information to be transmitted in the session to the service providing device, wherein the service executing unit provided to the service providing device identifies the session based on at least one of the session ID transmitted in association with the request information as transmitted and the job ID transmitted in association with the request information as transmitted, the service executing unit executing a process corresponding to the identified one of the session and job in accordance with the control command request information associated with the request information, wherein the command transmitting unit transmits the control command information and the job ID by incorporating the control command information and the job ID into the message associated with the response information, and wherein, when the image processing device receives the response information associating the control command information and the job ID, the command executing unit executes a process in accordance with the control command information and the job ID associated with the response information.

14. A non-transitory computer-readable medium having computer readable instructions stored thereon that cause a computer to function as a service executing unit and a command transmitting unit for an image processing device, the image processing device including:

at least one of (a) an image reading unit configured to read an image and generate image data, and (b) an image forming unit that forms an image represented by the image data, the image processing system further including:
a service providing device configured to execute a service regarding at least one of (a) image data generated by the image reading unit, and (b) image data representing an image to be formed by the image forming unit,
the image processing device and the service providing device being connected to a network so as to communicate with each other,
the image processing device being configured to transmit request information to the service providing device,
the service providing device being configured to transmit response information to the image processing device as a response to the request information,
the image processing device and the service providing device exchanging control information with each other using messages respectively associated with the request information and the response information,
wherein the image processing device includes:
a command requesting unit that transmits control command request information to the service providing device by incorporating, as the control information, the control command request information into the message associated with the request information, the control command request information being for requesting the service providing device to transmit, when the service is executed, control command information which is a control instruction for controlling the image processing device; and
a command executing unit that executes a predetermined process in accordance with the control command information,
wherein the service executing unit and the command transmitting unit are included in the service providing device, the service executing unit executing the service, the command transmitting unit transmitting the control command information to the image processing device by incorporating the control command information, as the control information, into the message associated with the response information, and
wherein the command executing unit executes a predetermined process in accordance with the control command information associated with the response information and transmitted from the service providing device,
wherein the image processing device is connected to the network via security system which is configured such that, among pieces of data transmitted from the network to the image processing device, the response information which is a response to the request information transmitted from the image processing device to the network is allowed to be transmitted, while the other data is shielded,
wherein the image processing device and the service providing device execute therebetween a session which is a series of communicating procedures from the start of the service to the end thereof,
wherein the command requesting unit of the image processing device transmits at least one of (a) a session ID which is identification information for identifying the session, and (b) a job ID which is identification information for identifying a job executed by the image processing device in the session, in association with the predetermined request information to be transmitted in the session to the service providing device,
wherein the service executing unit provided to the service providing device identifies the session based on at least one of the session ID transmitted in association with the request information as transmitted and the job ID transmitted in association with the request information as transmitted, the service executing unit executing a process corresponding to the identified one of the session and job in accordance with the control command request information associated with the request information,
wherein the command transmitting unit transmits the control command information and the job ID by incorporating the control command information and the job ID into the message associated with the response information, and
wherein, when the image processing device receives the response information associating the control command information and the job ID, the command executing unit executes a process in accordance with the control command information and the job ID associated with the response information.

15. An image processing system, comprising:
an image processing device having an image reading unit configured to read an image and generate image data; and
a service providing device configured to execute a service regarding image data generated by the image reading unit,
the image processing device and the service providing device being connected to a network so as to communicate with each other,
the image processing device being configured to transmit request information to the service providing device,
the service providing device being configured to transmit response information to the image processing device as a response to the request information,
the image processing device and the service providing device exchanging control information with each other using messages respectively associated with the request information and the response information,
wherein the image processing device includes:
a command requesting unit that transmits control command request information to the service providing device by incorporating, as the control information, the control command request information into the message associated with the request information, the control command request information being for requesting the service providing device to transmit, when the service is executed, control command information which is a control instruction for controlling the image processing device; and
a command executing unit that executes a predetermined process in accordance with the control command information,
wherein the service providing device includes:
a service executing unit that executes the service;
a command transmitting unit that transmits the control command information to the image processing device by incorporating the control command information, as the control information, into the message associated with the response information, and
wherein the command executing unit executes a predetermined process in accordance with the control command information associated with the response information and transmitted from the service providing device,
wherein the image processing device is connected to the network via security system which is configured such that, among pieces of data transmitted from the network to the image processing device, the response information which is a response to the request information transmitted from the image processing device to the network is allowed to be transmitted, while the other data is shielded, wherein the image processing device and the service providing device execute therebetween a session which is a series of communicating procedures from the start of the service to the end thereof, wherein the command requesting unit of the image processing device transmits at least one of (a) a session ID which is identification information for identifying the session, and (b) a job ID which is identification information for identifying a job executed by the image processing device in the session, in association with the predetermined request information to be transmitted in the session to the service providing device, wherein the service executing unit provided to the service providing device identifies the session based on at least one of the session ID transmitted in association with the request information as transmitted and the job ID transmitted in association with the request information as transmitted, the service executing unit executing a process corresponding to the identified one of the session and job in accordance with the control command request information associated with the request information, wherein the command transmitting unit transmits the control command information and the job ID by incorporating the control command information and the job ID into the message associated with the response information, and wherein, when the image processing device receives the response information associating the control command information and the job ID, the command executing unit executes a process in accordance with the control command information and the job ID associated with the response information.

\* \* \* \* \*